(12) United States Patent
Lee et al.

(10) Patent No.: US 10,986,144 B1
(45) Date of Patent: Apr. 20, 2021

(54) SYSTEM AND METHOD FOR COLLABORATION OVER A NETWORK

(71) Applicant: HealthLinx Technologies, Inc., Menlo Park, CA (US)

(72) Inventors: Kijoon Lee, San Mateo, CA (US); Maksim Ustinov, Fremont, CA (US)

(73) Assignee: HealthLinx Technologies, Inc., Menlo Park, CA (US)

( * ) Notice: Subject to any disclaimer, the term of this patent is extended or adjusted under 35 U.S.C. 154(b) by 500 days.

(21) Appl. No.: 15/279,400

(22) Filed: Sep. 28, 2016

Related U.S. Application Data

(60) Provisional application No. 62/233,920, filed on Sep. 28, 2015.

(51) Int. Cl.
*H04L 29/06* (2006.01)

(52) U.S. Cl.
CPC .................. *H04L 65/4015* (2013.01)

(58) Field of Classification Search
CPC .................. G06F 19/324; H04L 65/4015
See application file for complete search history.

(56) References Cited

U.S. PATENT DOCUMENTS

| | | | | |
|---|---|---|---|---|
| 5,548,506 A * | 8/1996 | Srinivasan | ..... | G06Q 10/063114 700/95 |
| 5,772,585 A * | 6/1998 | Lavin | ..... | G06F 19/322 128/920 |
| 8,239,218 B1 * | 8/2012 | Madras | ..... | G16H 10/20 705/3 |
| 8,788,284 B2 * | 7/2014 | Smith | ..... | G16H 10/60 705/3 |
| 2002/0170565 A1 * | 11/2002 | Walker | ..... | G16H 15/00 702/19 |
| 2003/0023459 A1 * | 1/2003 | Shipon | ..... | G06Q 30/06 705/2 |
| 2003/0177132 A1 * | 9/2003 | Thomas | ..... | G06Q 10/10 |
| 2005/0060187 A1 * | 3/2005 | Gottesman | ..... | G16H 70/00 705/2 |
| 2007/0162308 A1 * | 7/2007 | Peters | ..... | G06F 19/328 705/2 |
| 2007/0168223 A1 * | 7/2007 | Fors | ..... | G06Q 10/10 705/2 |
| 2009/0177495 A1 * | 7/2009 | Abousy | ..... | G16H 50/20 705/3 |
| 2009/0177754 A1 * | 7/2009 | Brezina | ..... | G06Q 10/107 709/206 |
| 2013/0191161 A1 * | 7/2013 | Churchwell | ..... | G16H 15/00 705/3 |

(Continued)

*Primary Examiner* — Backhean Tiv
*Assistant Examiner* — Jonathan A Sparks
(74) *Attorney, Agent, or Firm* — Schwegman Lundberg & Woessner, P.A.

(57) ABSTRACT

A system to support collaboration among client devices on a network comprising: a storage device that includes a class data structure to associate a message object, a file object, and a task object; a message bus module to communicate over the network; a file module configured to associate a message a file object instance with at least one of a message object instance and a task object instance; a task module configured to associate a task object instance with at least one of a message object instance and a file object instance; and a message module configured to associate a message with at least one of a file object instance, and a task object instance.

10 Claims, 44 Drawing Sheets

(56) References Cited

U.S. PATENT DOCUMENTS

| | | | | |
|---|---|---|---|---|
| 2013/0325505 A1* | 12/2013 | Vengco | ............... | G16H 50/70 |
| | | | | 705/3 |
| 2014/0081667 A1* | 3/2014 | Joao | ............... | G06Q 10/10 |
| | | | | 705/3 |
| 2015/0162308 A1* | 6/2015 | Kraft | ............... | H01L 24/24 |
| | | | | 257/676 |
| 2016/0147946 A1* | 5/2016 | Von Reden | ............... | G16H 10/60 |
| | | | | 705/3 |
| 2016/0371441 A1* | 12/2016 | Day | ............... | G16H 40/20 |

* cited by examiner

Network Relationship Type: Affiliation

Examples:

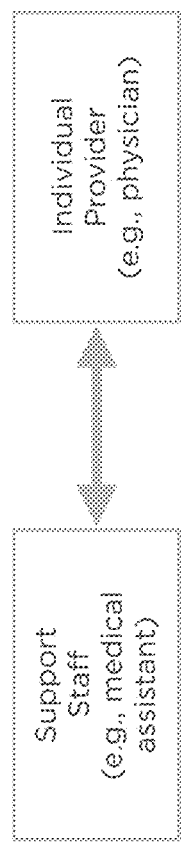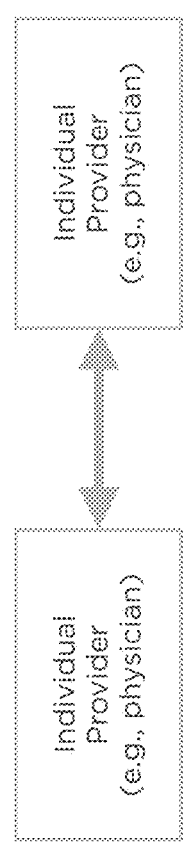

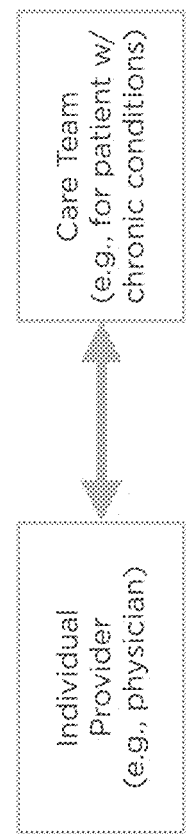

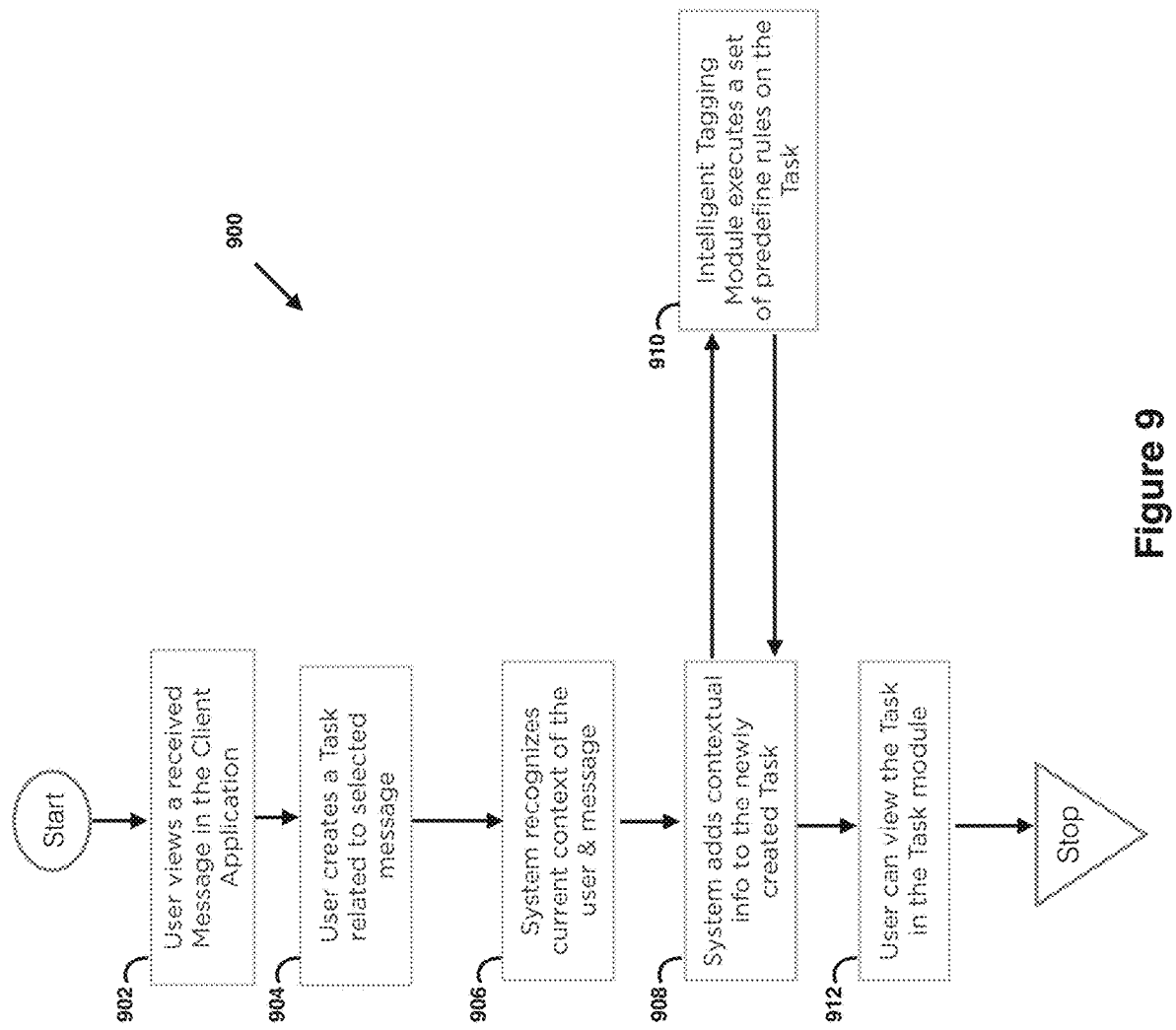

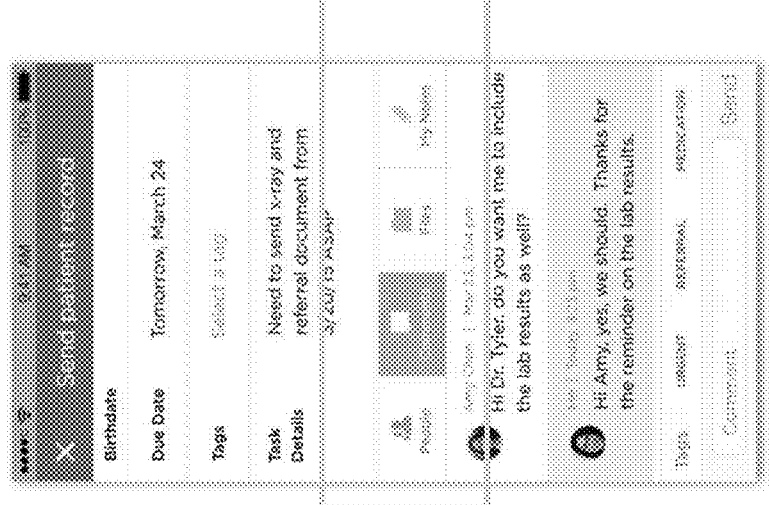
Figure 12C
Figure 12B
Figure 12A

SYSTEM AND METHOD FOR COLLABORATION OVER A NETWORK

CROSS-REFERENCE TO RELATED APPLICATION

This patent application claims the benefit of U.S. Provisional Patent Application No. 62/233,920 filed Sep. 28, 2015, entitled "System and Method to Dynamically Create and Modify Groups to Collaborate over a Network", which is incorporated by reference herein in its entirety.

BACKGROUND

The healthcare industry is highly fragmented, and many Americans experience poor care coordination and quality across providers, forcing them to piece together their own medical records and care. Healthcare providers, on the other hand, face challenges in care coordination because of the lack of interoperability among Electronic Health Record (EHR) systems and the use of outdated and unsecured methods such as phone, fax, short message service (SMS), and mail, leading to errors, inefficiencies, poor care coordination, and regulatory violations, in addition, many of the secure, HIPAA-compliant communication and collaboration software in the market today are designed for use by a single organization or provide partial support for collaboration, which creates friction and hurdles for healthcare providers in coordinating care across organizations and care settings.

A technology system is needed to support communication and collaboration among healthcare providers across a network of organizations as well as with their patients so that they can deliver a higher-quality and better coordinated care. A system is needed that enables and manages various relationships among individual users and organizations to support more effective collaboration. A system is needed that provides tight coupling of collaboration features such as messages, files, and tasks.

SUMMARY in one aspect, a system to support collaboration among client devices on a network includes a storage device that stores a class data structure to associate a message object, a file object, and a task object. A message bus module is configured to communicate messages over the network with the client devices. A file module is configured to associate, based at least in part upon content of a message communicated over the network, a file object instance with at least one of a message object instance and a task object instance. A task module is configured to associate, based at least in part upon content of a message communicated over the network, a task object instance with at least one of a message object instance and a file object instance. A message module configured to associate, based at least in part upon content of a message communicated over the network, a message with the file module, a message with the task module and a message with the with the message bus module.

In another aspect, a system to support collaboration among client devices on a network includes a storage device that stores a class data structure to associate a message object, a file object, and a tag object. A message bus module is configured to communicate messages over the network with the client devices. A file module is configured to associate, based at least in part upon content of a message communicated over the network, a file object instance with at least one of a message object instance and a task object instance. A tag module is configured to associate, based at least in part upon content of a message communicated over the network, a rule with at least one of a message object instance and a file object instance. A message module configured to associate, based at least in part upon content of a message communicated over the network, a message with the file module, a message with the tag module and a message with the with the message bus module.

BRIEF DESCRIPTION OF DRAWINGS

FIGS. 2B-2D are illustrative example screen displays produced by a client application running on a user device for use with the identity verification in accordance with some embodiments.

FIGS. 4A-4B are illustrative relationship diagrams representing example types of verified relationships between an individual user and another individual user in accordance with some embodiments.

FIG. 5 is an illustrative relationship diagram representing an example type of verified relationship between an individual user and a group in accordance with some embodiments.

FIG. 9 is an illustrative flow diagram representing user and system actions involved with creating a task in the context of a message in accordance with some embodiments.

FIG. 12A is an illustrative drawing of an example client application user interface screen display showing a list of tasks displayed on user device in accordance with some embodiments.

FIG. 12B is an illustrative drawing of an example user interface screen display produced in response to a user selecting a first task listed in a task list UI screen display of FIG. 12A in accordance with some embodiments.

FIG. 12C is an illustrative drawing of an example user interface screen display which shows the task that is selected in FIG. 12B that also shows the contextual activity menu in a task context and Comments that are associated with the selected task in accordance with some embodiments.

DESCRIPTION OF EMBODIMENTS

System Overview

Figure 1A:
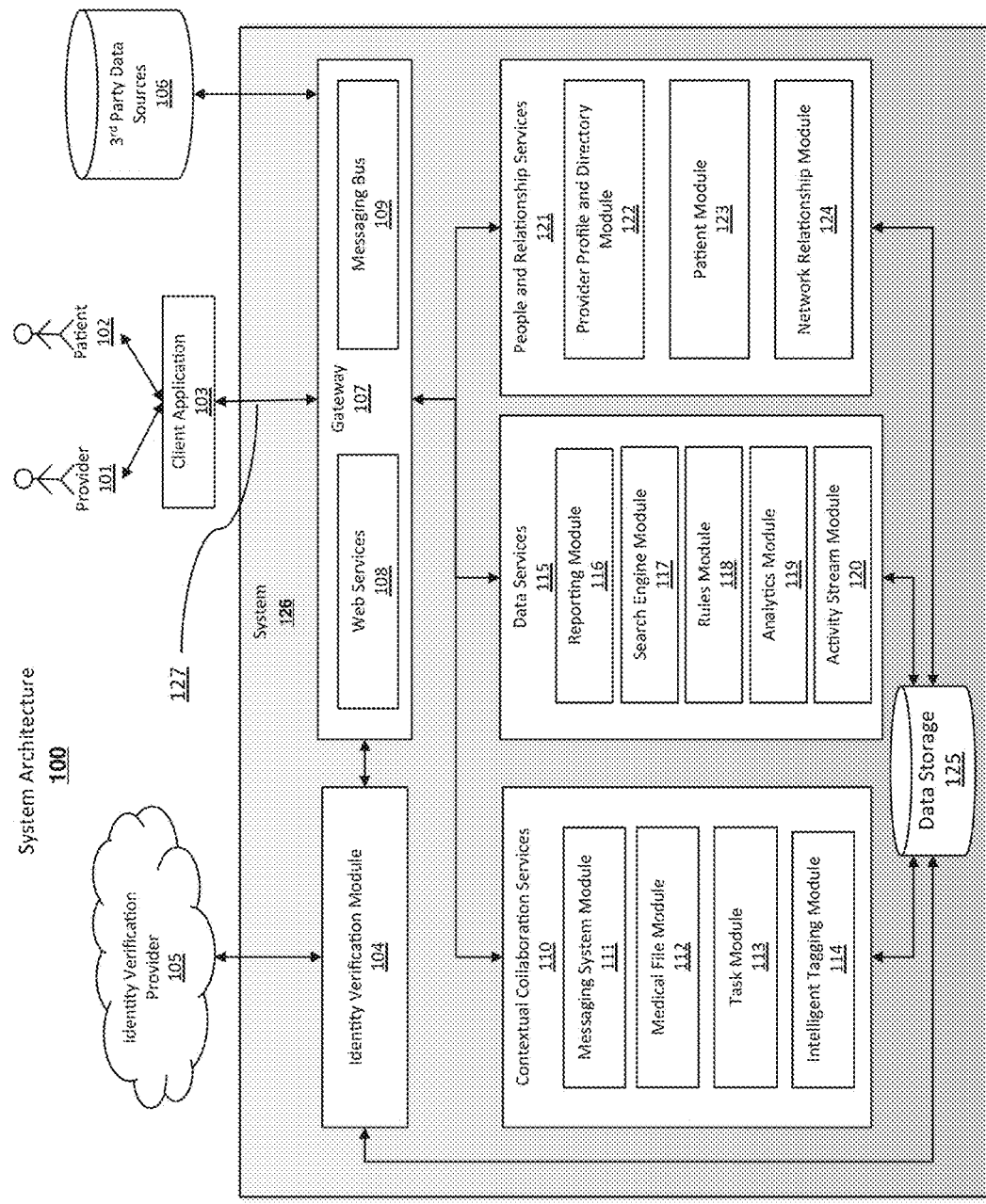
FIG. 1A is an illustrative drawing of an overall system architecture in accordance with some embodiments.

FIG. 1A is an illustrative drawing of an overall system architecture 100 in accordance with some embodiments. The system 100 provides a secure collaboration and communication network for healthcare professionals to exchange medical data and coordinate patient care within an office and across organizations. The system 100 includes a server system 126 that includes one or more servers that each includes one or more processors and storage devices configured to implement the functional blocks described below. Messages transmitted among client application users 101, 102 are encrypted in compliance with government HIPAA (Health Insurance Portability and Accountability Act) regulations. In use in a healthcare setting, the system supports various roles for individuals such as: physicians, nurses, medical assistants, and technicians. In use in a healthcare setting, the system supports various healthcare provider organization entities such as: private practices, hospitals, community health centers, and retail clinics. See the explanation below referring to FIGS. 16, 17A for additional explanation and examples in accordance with some embodiments. The system 100 is internet cloud-based and is accessible by client application users via mobile devices, browsers, and other internet accessible communication devices.

The system 100 includes a management server system 126 and multiple client application instances 103 running on provider user devices 101 and patient user devices 102 (hereinafter "users"). The management server system 126 includes one or more servers that each includes one or more processors and storage devices configured to implement the functional blocks described below. Each "client application" instance 103 configures a device such as a personal computer, laptop, tablet or smartphone, and smartwatch, for example, to provide users such as providers and patients with methods for accessing and interfacing with the server system 126. In a healthcare setting a "provider" 101 includes one or more of a professionals involved in the exchange of patient/medical data and coordination of patient care—e.g., physicians, nurses, medical assistants, and technicians, A "patient" 102 includes a person who receives care and treatment from a healthcare provider. The client application 103 provides access to mobile applications and browser-based applications that are available for use with the management server system 126, for example. The client application 103 handles the user's online registration to the server system 126 through verification and authentication of a user's identity. The client application 103 uses various methods to identity, verify and authenticate a user such as one or more of a user's consumer credentials and professional credentials, two-factor authentication via a user's mobile phone, third party identity verification providers 105, and other methods, for example.

An identity verification module 104 implements various measures to prevent identity theft and fraudulent activities and transactions through interaction with an identity verification provider 105 during the user's registration process, for example, as well as verification and monitoring of a user's credentials during his access to the system. See the explanation below referring to FIGS. 2B-2D for additional explanation and examples in accordance with some embodiments. In some embodiments, third party verification service providers 105 locate a user's identity record based on his/her personal information (e.g., name, home address, and date of birth) and verify a user's identity based on several challenge-response questions that only the user would know. The identity verification module 104 communicates with the third party verification service providers 105 to exchange data and verify a user's identity. Once a user's identity is verified, the identity verification module 104 creates an account and profile for the user, retrieves relevant data from third party data sources 106 such as NPI (National Provider Identifier) Registry and state medical license databases, and provide system access tokens to the user.

A gateway 107 provides a communication layer between the client application 103 and the communication services provide by the server system 126. A web services module 108 provides an interface to provide secure services to the client application 103 to access/modify data and call functionalities in the management server system 126. An example of a web services end point 108 is one that enables a user to modify his profile data such as his business address and preferences. When a user changes his profile data in a client application 103 running on his mobile device, a request is sent by the application 103 to the web services module 108 to persist the change to data storage 125. The web service 108 will accept the request, perform necessary instructions, and once the data is saved, an acknowledgement will be send to the client application 103 about the saved change. At that point, the client application 103 might call another end point in the web services layer 108 to get access to the updated user profile.

A communications services, or messaging bus, module 109 handles the real-time transport and routing of data from the client application 103 to the appropriate destination (e.g., other client applications, data storage). For example, when a user takes action in the client application 103 such as to create a task that is assigned to another user to perform, the client application 103 creates an event, which is detected by the communication service module 109. The communication service module 109 routes the event to another module (e.g., task module 113) within the management server system 126 to execute the appropriate action. Continuing with the task creation example, the task module 113 sends instructions to the communication services module 109 to route events to the creator of the task via his client application and the assignee of the task via his client application 103. The communication service module also handles the real-time synchronization of data across a user's client applications. For example, when a user uploads a file from his client application 103 on one mobile device, the file also is synched and viewable on his other client application(s) 103 running on his other device(s). (e.g., a web application running on a laptop device)

A contextual collaboration service module 110 provides collaboration services such as secure messaging, task management, and medical file sharing and management. These collaboration services are tightly coupled together. That is, relevant data flows from one collaboration service to another (e.g., from message object to a task object), and users can call collaboration services within the context of another service (e.g., posting messages and comments from a specific file). See the explanation below referring to FIGS. 6, 7A-7C, 15A-15B and 18A-18C for additional explanation and examples of the contextual collaboration module 110 in accordance with some embodiments. The contextual collaboration service module 110 within the management server system 126 includes a messaging module 111 that enables users to exchange secure, encrypted messages with other client applications running on user devices within the overall system 100. The messaging module 111 supports one-to-one messaging, group messaging, and message forwarding. See the explanation below referring to FIGS. 8A-9 for additional explanation and examples of the messaging module 111 in accordance with some embodiments. For example, a user can attach files to a message; the file can be uploaded from the mobile device storage, system's file module 112, and third party application data sources 106, for example. See the explanation below referring to FIGS. 10A-D, 11A-11C, for additional explanation and examples of the file module 112 in accordance with some embodiments. A user can add message tags such as: Urgent, Referral, Medication, Consultation, Admission, Lab Test, and Imaging. A tag object in accordance with some embodiments includes embedded intelligence and rules that will be executed when a user adds a tag to a specific message. A message object in accordance with some embodiments includes information such as: message content, date & time stamp, message read receipt status, message tags, and message flags. The messaging module 111 in accordance with some embodiments provides read receipt, or the date and time when the recipient viewed the message, for each message that is sent. For a specific message, for example, a user can add a task related to that message; the management server system 126 adds contextual information about that message (e.g., message content; sender info; patient's name and birthdate, and date & time stamp, message tags) to the newly created task. The new task can be viewed by the user in the task module 113. See the explanation below referring to FIGS. 12A-12D, 13A-13C, for additional explanation and examples of the task module 113 in accordance with some embodiments.

In addition, in some embodiments, the management server system 126 provides outbound and inbound integration to fax machines and digital fax services. For outbound faxes, for example, a user can request a document to be sent digitally to a fax number or "print to fax" a conversation or message thread (System formats the conversation and transmits the content to a fax machine (print or digital) via a third party fax APT. For inbound faxes, for example, a user can receive, view, and take actions on faxed documents through the client application.

A file module 112 enables users to view, share; and collaborate on files related to an individual. In some embodiments, the file module 112 includes a medical file module that includes files related to individual patient care. In some embodiments, the file module 112 supports various file formats including PDF, JPG, TIF, and other formats. A user can share a file with other users within the overall system 100. A user can upload files from mobile device storage, browser-based applications, and third party applications. Files that can be shared by other users will appear in the file module 112 (e.g., message file attachments). A user can post comments/messages related to a specific file; the management server system 126 recognizes the current context of the user and file and adds contextual information to the newly created message. A user can add a task related to a selected file; the management server system 126 recognizes the current context of the user and file and adds contextual information to the newly, created task. A user can add private notes related to a file that only he can view. A user can take other actions on a file such as: edit, delete, archive, flag/star, and download files. A user can perform search on files.

A task module 113 enables a client user to create tasks for the user himself or to assign tasks to others in the overall system 100 to coordinate patient care activities. A user can view a list of tasks that he assigned to others and those that have been assigned to him, edit tasks, flag/star tasks, delete and archive tasks, and mark tasks as complete. A user can share a task with other client application instances running on other user devices within the overall system 100. A user can post comments/messages related to a specific task; the management server system 126 recognizes the current context of the user and task and adds contextual information to the newly created message. A user can add a file related to a selected task; the management server system 126 recognizes the current context of the user and task and adds contextual information to the newly added file. A user can add private notes related to a task that only he can view. A user can perform search on all tasks.

An intelligent tagging module 114 enables users to apply a tag to a file object, message object; and task object. The tag objects contain embedded intelligence and rules to help manage and automate various workflows and processes. The tagging module 114 is tightly coupled with other modules within data services 115. For example, the tagging module 114 is coupled with the rules module 118 and analytics module 119 to analyze various factors and execute on a predefined set of rules that apply to the situation. See the explanation below referring to FIG. 14, for additional explanation and examples of the tagging module 114 in accordance with some embodiments.

A data services module 115 includes a group of services that process and perform specific actions on data in the management server system 126 in support of other modules in the system 115. A reporting module 116 provides a set of pre-defined and ad-hoc reports that are provided to the user. Users can search for relevant messages, files, tasks, and other data across the overall system 100. A search engine module 117 indexes the data to allow users to perform the search on patient name, provider name; and specific keywords.

A rules module 118 stores and executes a set of predefined rules, or steps, for various module in the management server system 126.

An analytics module 119 performs analysis of data and metadata in support of other modules in the management server system 126 using various analytical methods (e.g., statistical and predictive analysis, benchmarking). Examples of analytics include: analysis of the efficiency of patient referrals based on messages sent with referral tags and completion of the referral process; anonymized benchmarking of a user's referral efficiency to that of a peer group. The analytics module 119 provides recommendations for specific providers based on analysis and scoring of various data such as quality metrics, referral efficiency, reviews and ratings from patients and providers, for example.

An activity stream module 120 tracks all events in the management server system 126 and provides this data to other modules and client applications 103. For example, it tracks user activities related to his tasks, files, and messages, and is used to track creation, update and deletion of objects.

A people and relationships services module 121 provides a group of services that manage individual and organizational entities, various roles, and relationships and affiliations among these entities in the management server system 126. See the explanation below referring to FIGS. 2A, 4A-4B, 5, for additional explanation and examples of the people and relationship services module 121 in accordance with some embodiments.

A provider profile and directory module 122 creates and manages user profiles and provider objects for individual and organizational providers in the management server system 126. A profile is created and its properties are set based on user input and data retrieved from third party data sources 106 such as NPI Registry. Profile properties include: name, occupation, credentials (e.g., MD, MPH, BSN), business address, contact preferences, NPI and medical license numbers, medical specialty, and affiliations/memberships/relationships, for example. The module 122 also allows user to edit and manage profile data. The module 122 manages display of affiliations 203, relationships 206, and memberships 209. A user can view and search for users in the management server system 126 via the provider directory. A user can invite other users/organizations to become affiliated with an organization 204, establish relationship with another user 206, and gain membership to a group 209. A user can manage his or her account settings, notification preferences, billing and payment settings, and security settings. A patient module 123 creates and manages patient profiles and objects in the management server system 126. The patient module tracks all messages; tasks, files, providers, and groups associated with a specific patient.

A network relationships module 124 creates and manages dynamic relationships among individual and organizational users via a predefined relationship model provided by an organization's administrator or via an online invitation mechanism. For example, a user/organization sends an invitation to another user/organizational entity, and the receiving party has the option to accept or reject the invitation. When the receiving party accepts the invitation, then the network relationship module 124 creates a verified relationship and sets the properties based on the selected relationship type (e.g., affiliation, relationship, membership). The module 124 also sends the verified relationship property to the provider profile and directory module 122, which then makes the property visible on the user's profile. The network relationship module 124 also manages the properties of the verified relationships including access permission to data and administrative rights (e.g., security and policy settings); executes automated workflows and coordination of activities based on the relationship type.

A data storage 125 includes a database that includes data models for various objects and data types—providers, patients, messages, files, tasks, data streams, for example. The data storage 125 maps and reconciles data from multiple sources such as: identity verification module 104, contextual collaboration services 110, data services 115 and people and relationship services 121. The data storage includes user input data from the management server system 126, third party sources 106 (e.g., NPI registry, GPS data), and other data types, for example.

Figure 1B:
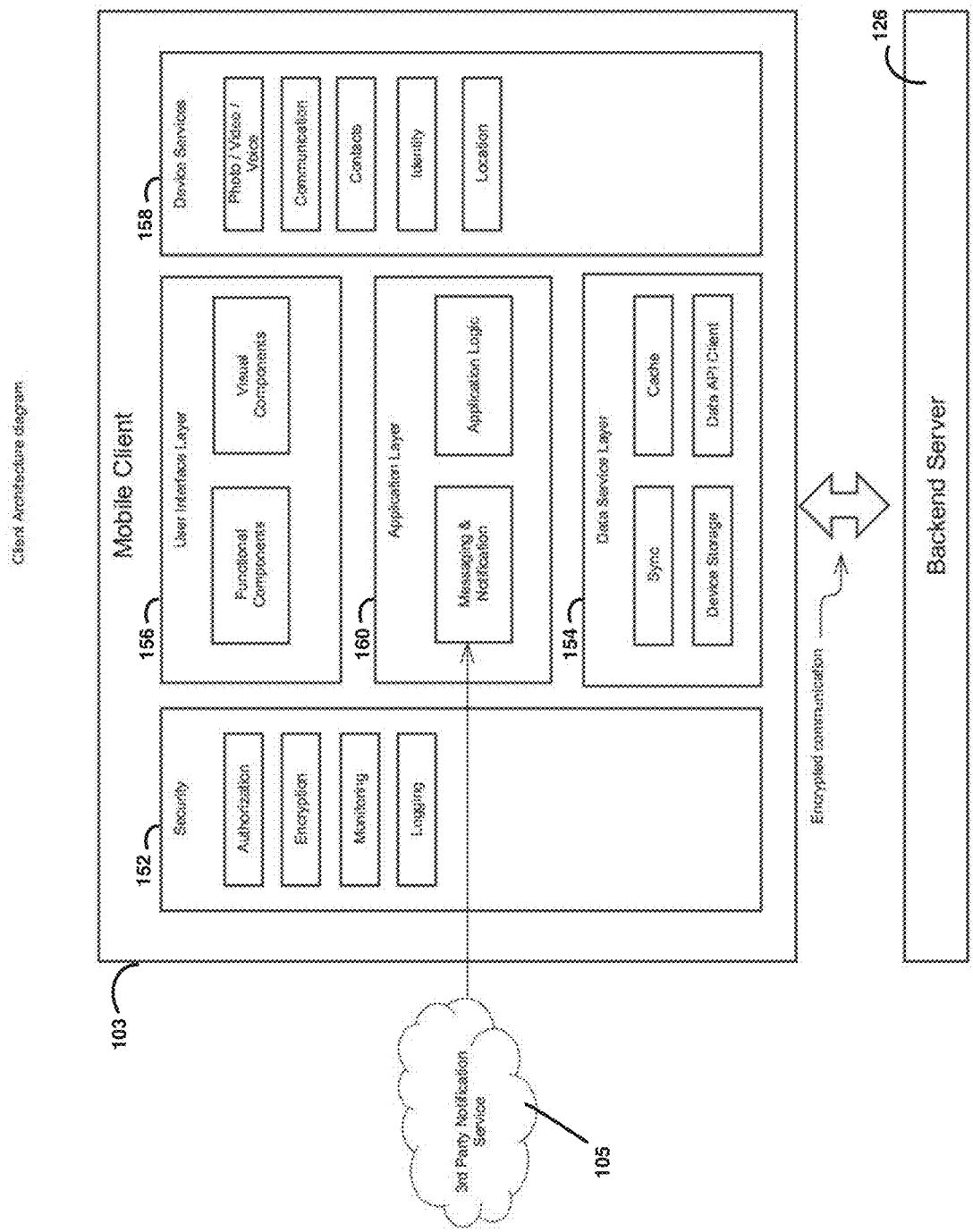
FIG. 1B is an illustrative block diagram representing a client device configured to run a client application in accordance with some embodiments.

FIG. 1B is an illustrative block diagram representing a client device configured to run a client application 103 in accordance with some embodiments. The client application 103 includes a security block 152 that includes authorization, encryption, monitoring and logging blocks. The monitoring and logging include track a user's access to the server (e.g., time at which user accessed the server). The client application 103 includes a data services layer block 154 that includes sync, device storage, cache and data API client blocks. The client application 103 includes a user interface layer block 156 that includes functional components such as the ability to browse and attach files to a message and visual components such as screens and buttons The client application 103 includes a device services layer block 158 that includes photo/video/voice, communication, contacts, identity, and location blocks. The client application 103 includes an application layer block 160 that includes messaging and notifications block and an application logic block.

Figure 1C:
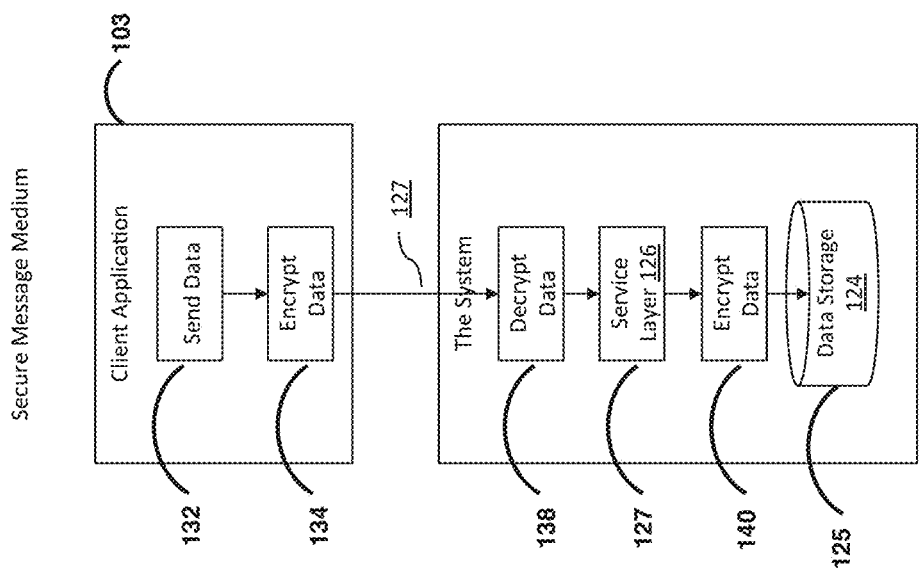
FIG. 1C is an illustrative flow diagram indicating end-to-end encryption of data provided by the system of FIG. 1A in accordance with some embodiments.

FIG. 1C is an illustrative flow diagram indicating end-to-end encryption of data provided by the system of FIG. 1A in accordance with some embodiments. Data in the client applications 103, data in transit between client application 103 and the management server system 126, and data that persist in data storage 125 are encrypted. In particular, a client application 103 configures a user device to invoke a send/receive block 132 to package messages sent by the application 103 and to unpackage messages received by the application 103. The client application 103 invokes an encryption block 134 to encrypt messages that are sent by the application 103 and to decrypt messages that are received by the application 103. The management server system 126 invokes an decryption block 138, functionally disposed between the send/receive block 136 and a service layer 127, to encrypt messages that are sent by the management server system 126 and to decrypt messages that are received by the management server system 126. The management server system 126 includes a service layer context collaboration services 110, data services 115 and people and relationship services 121 described above. The management server system 126 invokes an encryption block 140, functionally disposed between the data storage 125 and the service layer 126, to encrypt messages that are sent to storage 125 by the management server system 126 by the management server system 126.

Dynamic Relationship Model

Figure 2A:
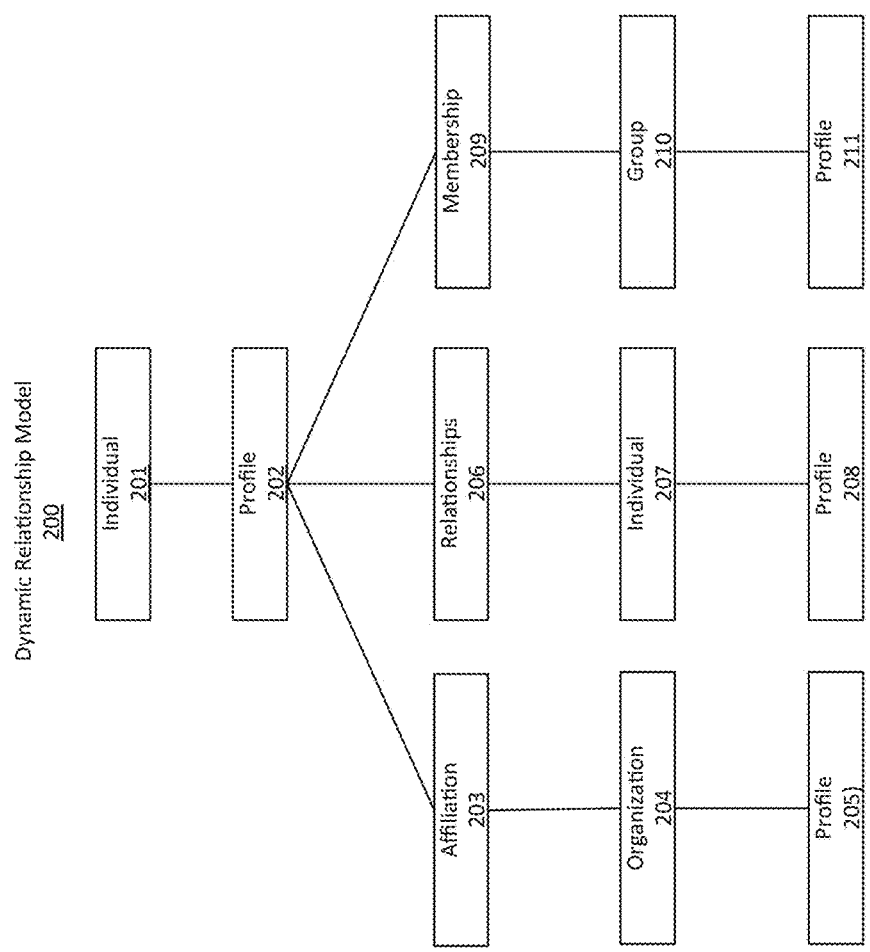
FIG. 2A is an illustrative data structure diagram representing a relationships data structure stored in a machine readable storage device in accordance with some embodiments.

FIG. 2A is an illustrative data structure diagram representing a relationships data structure 200 stored in a machine readable storage device in accordance with some embodiments. The system architecture 100 is configured to route messages to users in dependence upon the relationships that the user has with organizations, other individual users and groups of users. The management server system 126 uses the relationships data structure 200 to determine a user's relationships, which in turn, determines messages, tasks and files the user can send and receive. A relationship model represented by the user relationships data structure 200 is created for each user.

The data structure 200 associates an individual user identifier 201 with individual profile information 202. The individual profile 202 can be associated with affiliation branch node 203, a relationship branch node 206 and a membership branch node 209. The affiliation branch node 203 can be associated with one or more organization nodes 204. Each organization node 204 is associated with an organization profile 205 corresponding to the organization. The relationships branch node 206 can be associated with one or more (other) individual nodes 207. Each (other) individual node 207 is associated with an (other) individual profile 208 corresponding to the (other) individual. The membership branch node 209 can be associated with one or more group nodes 210. Each group node 210 is associated with a group profile 211 corresponding to the group 210.

Figures 2B, 2C, 2D:
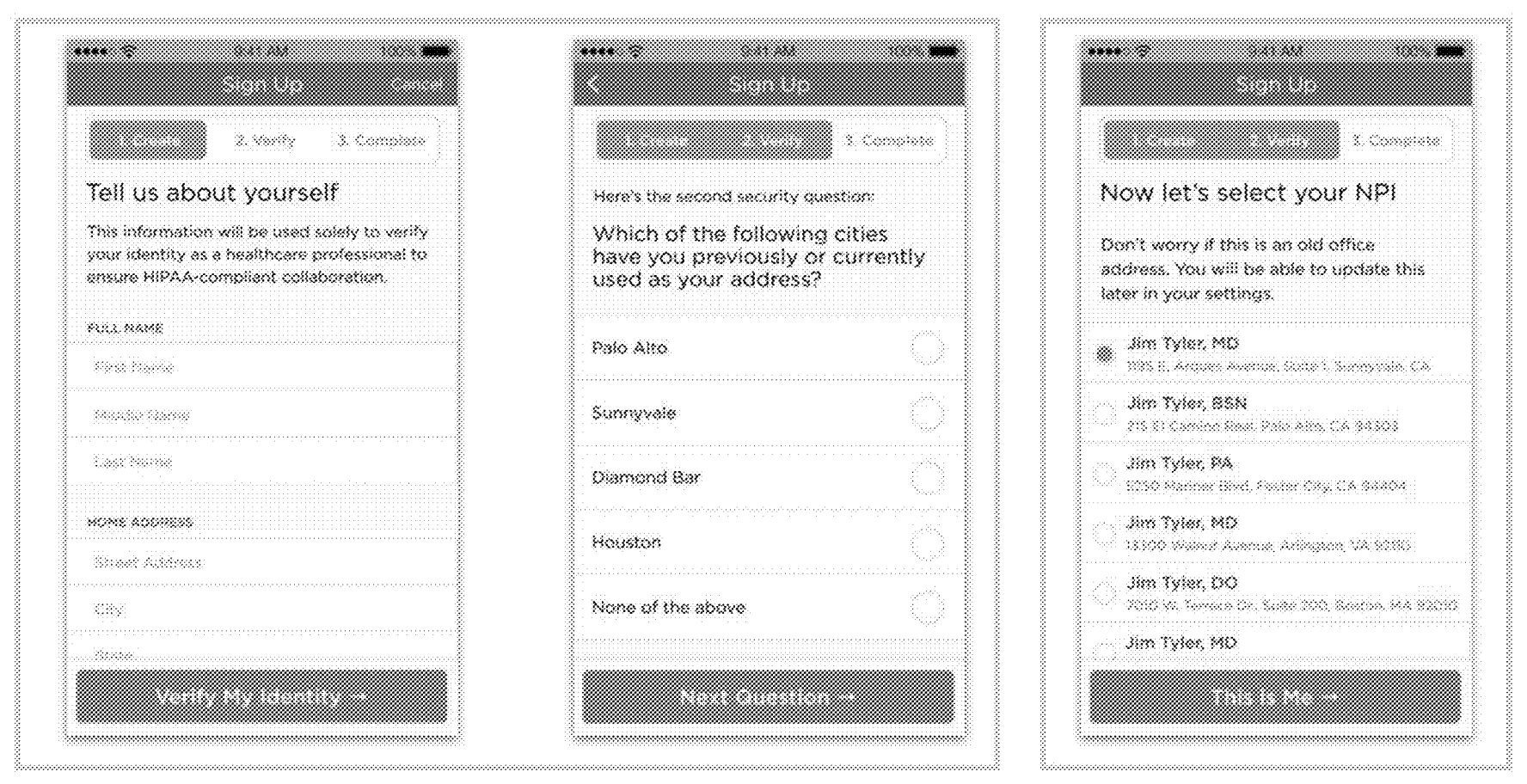

FIGS. 2B-2D are illustrative example screen displays produced by a client application 103 running on a user device for use with the identity verification module 104 to the management server system 126 to create and verify provider identity in accordance with some embodiments. FIGS. 2B-2C are example screen displays used for verification of a provider's consumer credentials. FIG. 2D is an example screen display used for verification of a provider's professional credentials.

Figure 2G:
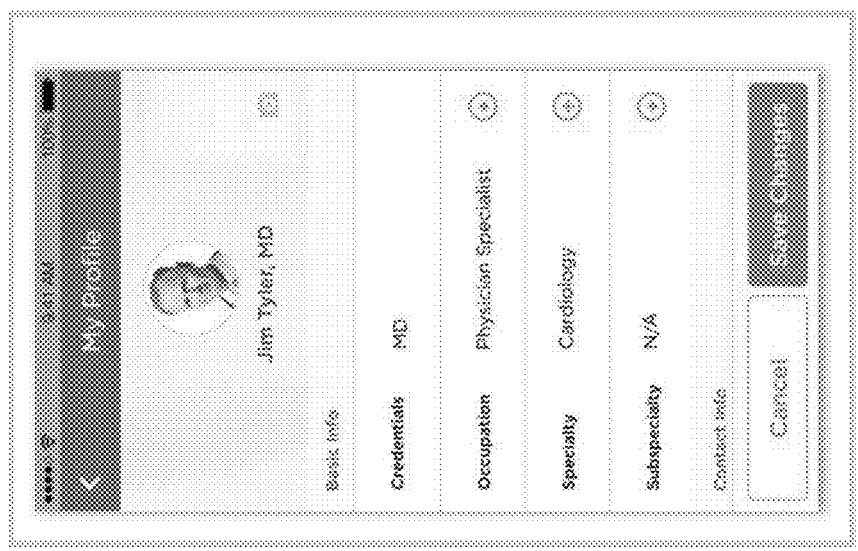
FIGS. 2E-2G are illustrative example screen displays produced by a client application running on a user device for use with the provider profile and directory module in accordance with some embodiments.
Figure 2F:
Figure 2E:
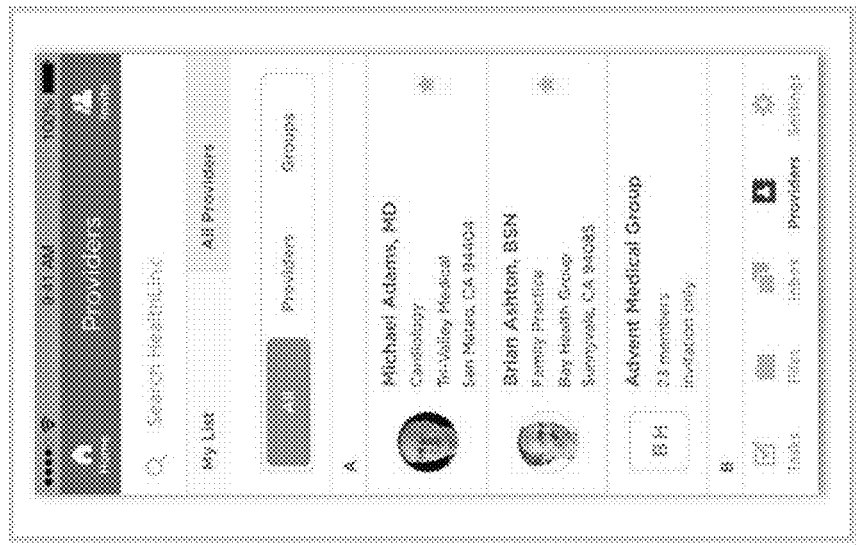

FIGS. 2E-2G are illustrative example screen displays produced by a client application 103 running on a user device for use with the provider profile and directory module 122 of the management server system 126 to create and render provider profile in accordance with some embodiments. FIG. 2E shows an example UI screen display showing a list of all providers. FIG. 2F shows an example UI screen display showing a list of provider groups. At the top of the display screens in FIGS. 2E-2F, there is displayed a contextual activity menu that displays menu items: "All", "Providers" and "Groups". The menu item "All" is selected in FIG. 2E, and the menu item "Groups" is selected in FIG. 2F. At the bottom of the display screens in FIGS. 2E-2F, there is displayed a menu that displays menu items: "Tasks", "Files", Inbox", Providers" and "Settings. The menu item "Providers" is selected in both FIGS. 2E-2F. The menu item FIG. 2G is an illustrative UI display screen that an individual provider can use to view and update his provider profile.

Figure 3A:
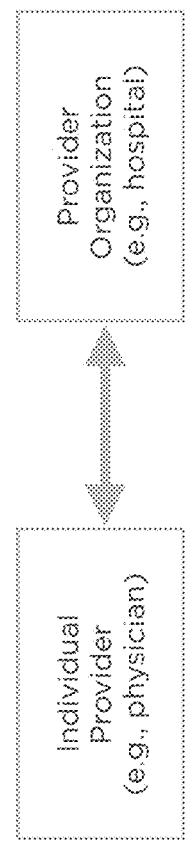
FIGS. 3A-3B are illustrative relationship diagrams representing example types of verified affiliation relationships between an individual user and an organization in accordance with some embodiments.
Figure 3B:
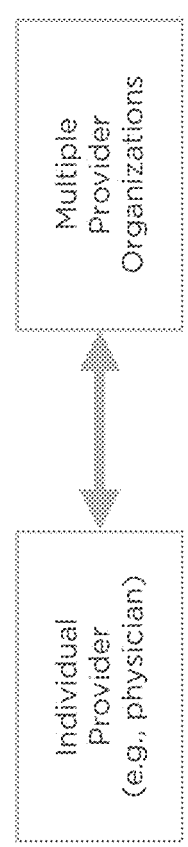

FIGS. 3A-3B are illustrative relationship diagrams representing example types of verified affiliation relationships between an individual user and an organization in accordance with some embodiments. An affiliation relationship may exist between a physician and a hospital, for example. Referring to FIG. 3A, for example, an individual provider, such as a physician, may receive a visible badge on his profile that verifies his affiliation with the provider organization. The provider organization, such as a hospital for example, gains administration rights over the individual provider's account (data, security & policy settings, etc.). Referring to FIG. 3B, for example, an individual provider who works in/are affiliated with multiple provider organizations can maintain multiple segregated accounts with different sets of policies and administration rights. The overall system 100 may establish private communication channels between individual providers and provider organizations and among individuals within the organization or multiple organizations consistent with the rules of the organization specified in the organization profile(s) 205, for example.

FIGS. 4A-4B are illustrative relationship diagrams representing example types of verified relationships between an individual user and another individual user in accordance with some embodiments. An individual relationship may exist between a medical assistant and a physician, for example. Referring to FIG. 4A, for example, an individual support staff member receives a visible badge on his profile that verifies his relationship with the provider (holder of an NPI number or state license number). The support staff member can receive delegate access to the provider's account (e.g., tasks, files). Referring to FIG. 4B, for example, individual providers can establish specific relationships with each other to access certain rights and share data. For example, physicians in same practice who cover each other's shifts can access each other's schedules and patient-related data and messages. The overall system 100 can automate workflow between provider and support staff members (e.g., forwards a provider's received message to support staff when the provider is not on call or on vacation).

FIG. 5 is an illustrative relationship diagram representing an example type of verified relationship between an individual user and a group in accordance with some embodiments. A group relationship may exist between a nurse and a care team, for example. Individual providers can become members of care team groups focused on specific patients, for example. Group members can communicate and coordinate activities as a group and access shared spaces that contain content such as messages, files, and activities. In some embodiments, group members can also view a "timeline" for a patient based on member-contributed content and receive system-generated updates and alerts.

Collaboration Services Interactivity

Figure 6:
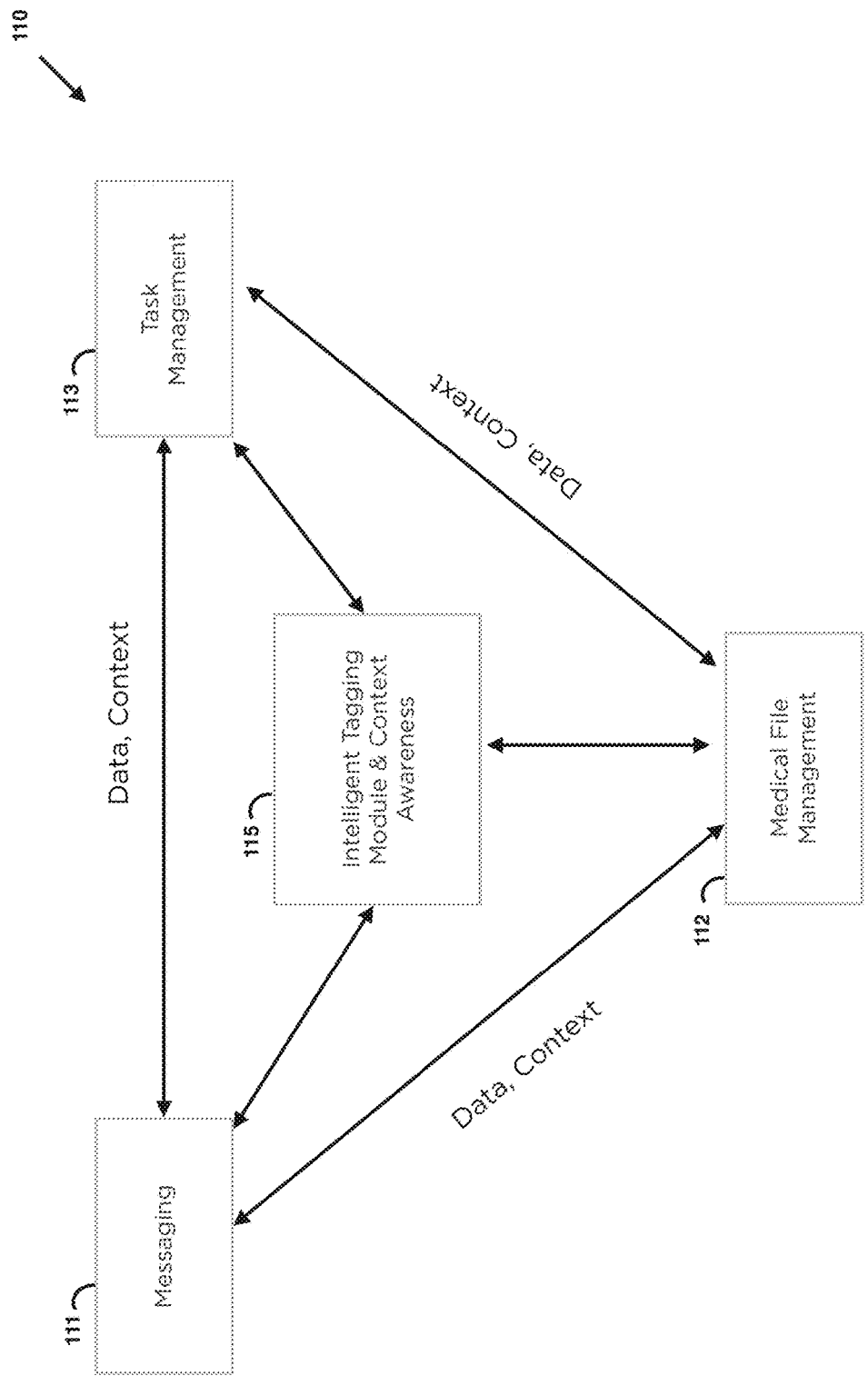
FIG. 6 is an illustrative conceptual diagram representing tight work flow integration among the contextual collaboration services that includes tightly coupled collaboration among the messaging, task management, file management and tagging modules in accordance with some embodiments.

FIG. 6 is an illustrative conceptual diagram representing tight work flow integration among the contextual collaboration services 110 of FIG. 1A that includes tightly coupled collaboration among the messaging, task management, file management and tagging modules in accordance with some embodiments. The intelligent tagging module 114 communicates with each of a messaging system module 111, task management module 113, and file management module 112. The messaging system module 111 and the task management module 113 are in communication with each other. The messaging system module 111 and the file management module 112 are in communication with each other. The task management module 113 and the file management module 112 are in communication with each other.

Network Communications

Figure 7A:
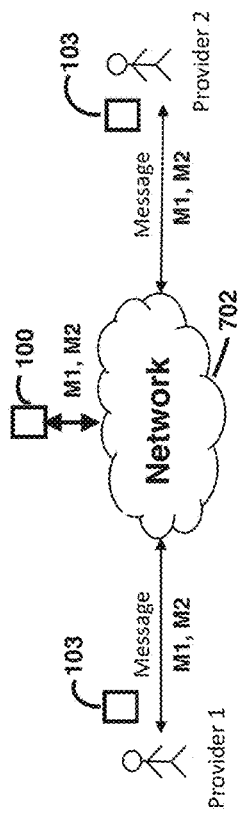
FIGS. 7A-7C are illustrative network communication diagrams illustrating one-to-one messaging (FIG. 7A), group messaging (FIG. 7B) and messaging between organizations (FIG. 7C) in accordance with some embodiments.
Figure 7B:
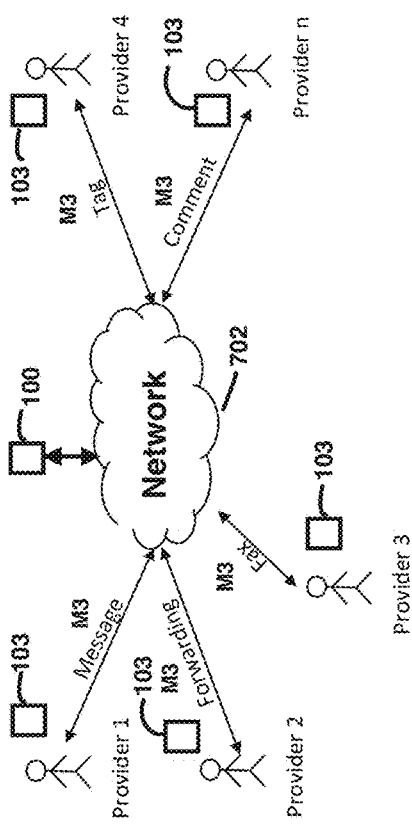
Figure 7C:
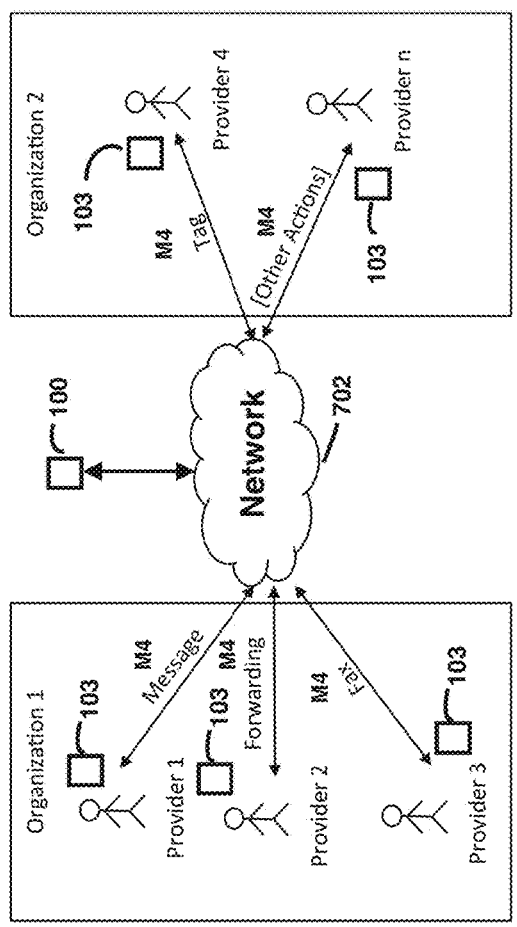

FIGS. 7A-7C are illustrative network communication diagrams illustrating one-to-one messaging (FIG. 7A), group messaging (FIG. 7B) and messaging between organizations (FIG. 7C) in accordance with some embodiments. FIG. 7A is an illustrative drawing representing the management server system 126 managing communication between a client application 103 of a first individual provider 1 and a client application 103 of a second individual provider 2 over a network such as the internet 702. The client applications 103 of the first and second providers can communicate directly with each other under management of the management server system 126 since each is associated with an individual profile 208 represented in the dynamic relationship model of FIG. 2A. Individual providers 1 and 2 use their client applications 103 to communicate with each other over the network 702 via the management server system 126. More particularly, for example, first individual provider 1 sends a first message M1 directed to the second provider 2 via his client application 103, which sends the first message M1 to the management server system 126, which in turn sends the first message M1 to the client device 103 of individual provider 2. Conversely, second individual provider 2 sends a second message M2 directed to the first provider 1 via his client application 103, which sends the second message M2 to the management server system 126, which in turn sends the second message M2 to the client device 103 of first individual provider 1.

FIG. 7B is an illustrative drawing representing an example communication of the management server system 126 managing communication between client applications 103 of members of a group of individual providers in accordance with some embodiments. A first through nth providers are members of a group. The client applications 103 of the first through nth providers communicate as a group over the management server system 126 since each is associated with the same group profile 211 represented in the dynamic relationship model of FIG. 2A. In the example, assume that the first provider 1 uses his client application 103 to send a third message M3 via the management server system 126 to client applications 103 of all members of the group (i.e. to providers 2 through n). Thus, FIG. 7B shows that different users in the group can take different actions and/or send different types of information (e.g., add a tag to a message, forward a message, send a fax).

FIG. 7C is an illustrative drawing representing example communication of the management server system 126 managing communication between client applications 103 of providers within two different organizations in accordance with some embodiments. First through third providers are members of a first organization 704, such as a first private practice. Fourth through nth providers are members of a second organization 706, such as a second private practice. The client applications 103 of the first through third provider communications are associated with a first organization via a first organization profile 205 in the dynamic relationship model of FIG. 2A. The client applications 103 of the fourth through nth providers are associated with a second organization via a second organization profile 205 in the dynamic relationship model of FIG. 2A. In the example, assume that the first provider 1 uses his client application 103 to send a fourth message M4 via the management server system 126 to client applications 103 of the second and third providers, which are members of the first organization 704 and to the fourth through nth providers, which are members of the second organization 706. The example message flow in this organization-to-organization example is the same as that in the above group message flow example except that instead of all providers being members of the same group as in FIG. 7B, the first through third providers are members of the first organization 704 and the fourth through nth providers are members of a second organization 707 in FIG. 7C. Thus, FIG. 7C shows that messages/collaboration can flow between users within different providers within different organizations on a network 702.

Figure 8B:
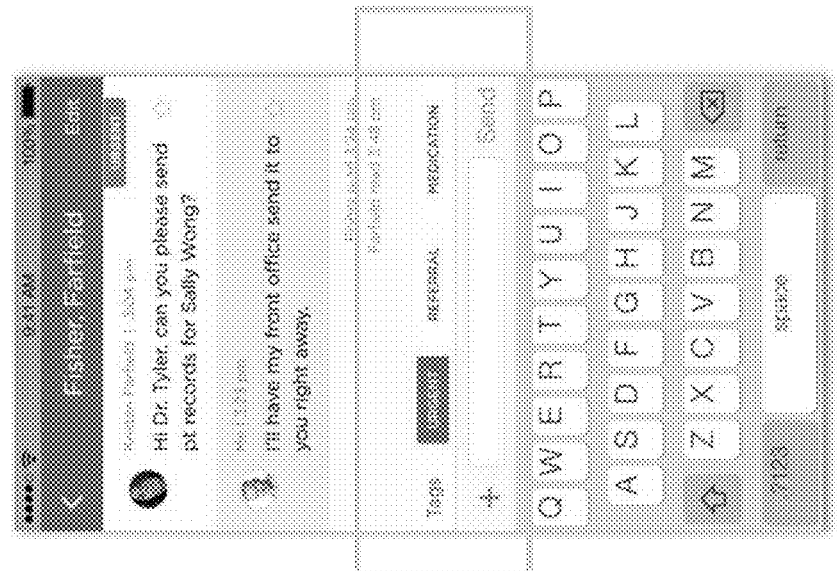
FIG. 8B is an illustrative drawing of an example client application user interface screen display showing a tag menu in accordance with some embodiments.
Figure 8A:
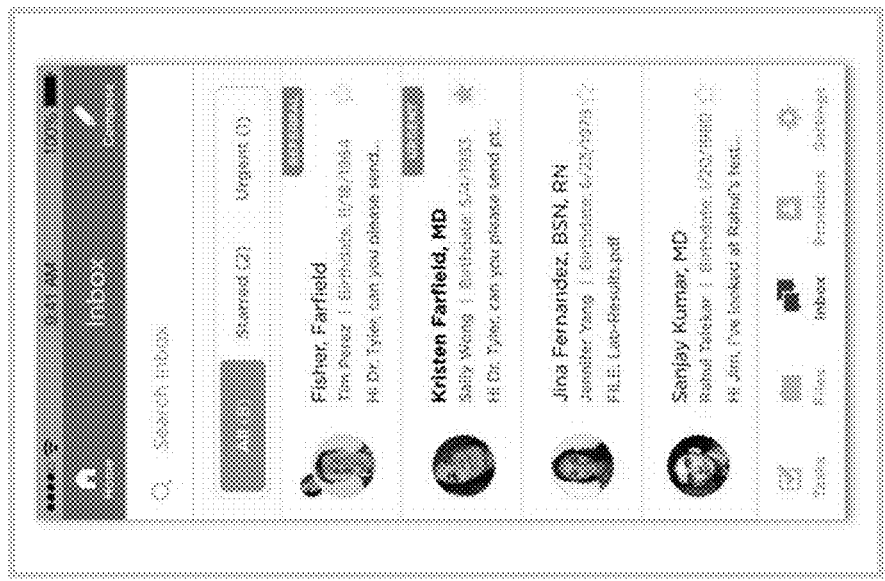
FIG. 8A is an illustrative drawing of an example client application user interface screen display showing a list of messages displayed on user device some of which are tagged in accordance with some embodiments.

User Interface Displays Example During
Collaboration in the Context of a Message FIG. 8A is an illustrative drawing of an example client application user interface screen display showing a list of messages displayed on user device some of which are tagged in accordance with some embodiments. A first message in the list is tagged as "Referral". A second message in the list is tagged as "Urgent". At the bottom of the display screen there is menu of items: "Tasks", "Files", Inbox", Providers" and "Settings". In this example, the "inbox' menu item is selected, which has resulted in display of the example list of messages. A user can sort/filter the messages, star/flag the messages and tag the messages, for example.

FIG. 8B is an illustrative drawing of an example client application user interface screen display showing a tag menu in accordance with some embodiments. The example UI screen of FIG. 8B is displayed in response to a user selection of the first message ("Fisher, Farfield") in the message list of FIG. 8A. The display screen of FIG. 8B includes a tag menu that includes the tag menu items, "Urgent", "Referral", "Medication", "Consultation", "Imaging", "Lab Test", and "Admission", that a user can select to invoke the intelligent tagging module 114 for a selected message. A user can select a tag from the tag menu to associate a message. A tag is associated with actions performed by the intelligent tagging module 114 of the server system 126 to promote user actions in response to a message tag. More particularly, some tags are associated with a work flow among members of a group and in which the intelligent tagging module 114 sends and receives messages to promote the work flow. For example, in some embodiments, each of the tag menu items is associated with a different work flow message protocol in which the intelligent tagging module 114 sends and receives a different sequence of messages. Some messages in a message protocol may be contingent upon user actions in response to a tagged message, for example.

Figure 8C:
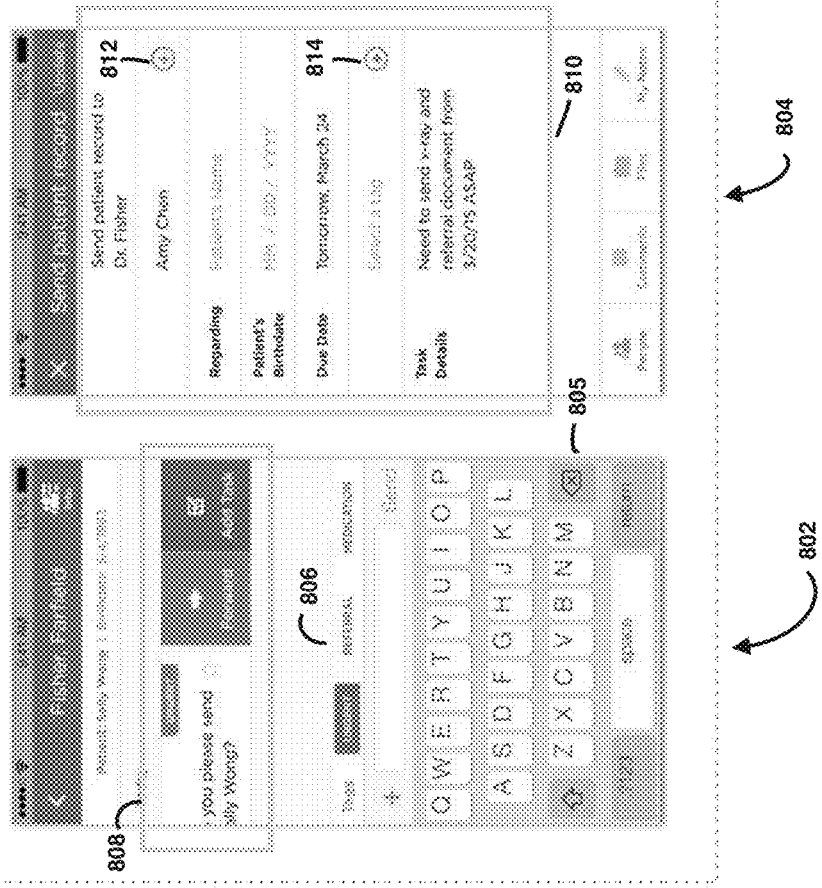
FIG. 8C is an illustrative drawing of an example sequence of first and second user client application interface screen displays representing collaboration of providers in the context of a message in accordance with some embodiments.

FIG. 8C is an illustrative drawing of an example sequence of first and second user client application interface screen displays 802 and 804 representing collaboration of providers in the context of a message in accordance with some embodiments. Providers may collaborate with each other in the context of a message to coordinate patient care by accessing a set of actions within the message, for example. FIG. 8C shows the first UI screen display in the sequence on the left 802 that shows a message, "Hi Dr. Tyler, can you please send pt records for Sally Wong?", that has been received from another provider. The first UI display also shows selection of a task creation menu item in the context of the received message. The first UI screen display 802 includes a keyboard 805 and a tag menu 806 that includes tag menu selections: "Urgent", "Referral", "Medication", "Consultation", "Imaging", "Lab Test", and "Admission". As explained more fully below, some tag menu items are associated with rules that invoke a workflow associated with the tag menu item. In this example, the provider receiving the message has selected the "Urgent" menu, which is shown highlighted. Provider can also access a menu of actions related to the specific message that includes the items, "Forward" and "Add Task". In this example, the provider has selected "Add Task" menu item, which is shown highlighted.

FIG. 8C also shows the second UI screen display in the sequence on the right 804 that shows task information that has been added to a task creation form 810 using the keyboard 805. The task information form 810 indicates a descriptive title for the task, "Send patient record to Dr. Fisher". The task information form 810 indicates task details as, "Need to send x-ray and referral document from Mar. 20, 2015 ASAP." The management server system 126 creates a task and adds contextual information about the message (message content, tag, sender, date and time stamp, patient name, patient birthdate, etc.) The illustrative UI screen 804 does not show this contextual information that is pre-populated by the system 126 based on contextual information of the message (e.g., patient name, DOB, sender). When a user clicks on the "Add Task" menu item, the system 126 creates a new task. Then, the user will see a task form that is either empty or has some contextual information pre-populated in the form, depending on whether the create task menu item was triggered from a specific message or somewhere else. A user then can type in a description of a user-defined specific task to be performed. The task information form 810 also indicates a due date. Additional information concerning the patient such as patient's name and date of birth are added automatically by the contextual collaboration services module 110. The task information form 810 includes a task assignee selector 812 for user to identify persons to whom the task should be assigned. In this example, the task is to be assigned to another user, "Amy Chen". The task information form 810 also includes a tag selector to add an additional tag such as "Urgent", "Referral", "Medication", "Consultation", "Imaging", "Lab Test", and "Admission". The new task is viewable in a task list UI (not shown) in the client application 103 of the provider who received the task.

FIG. 9 is an illustrative flow diagram 900 representing user and system actions involved with collaboration of providers in the context of a message in accordance with some embodiments, in block 902, a user views a received message in the client application. It will be appreciated that the messaging system module 111 of the contextual collaboration services 110 of the server system 126 acts as an intermediary that transmits messages between members of a predefined group. The network communication diagrams of FIGS. 7A-7C illustrated different example network communication flows. For example, one member of a group may send a message directed to another member of the same group. The server system 126 receives the message 126 and processes the message by adding contextual information and, if the message is associated with a tag, by implementing a tag workflow, and then sends the message with context information to the recipient. The messaging system module 111 can have access to patient-specific contextual information to associates with the message since the and receiver of the message are members of the same group who are authorized (e.g., under HIPAA) to share such confidential information in block 904, a user creates a task related to selected message. In block 906, the management server system 126 recognizes current context of the user and message. In particular, the messaging system module 111 within the server system 126 understands that the user created a new task in the context of the specific message and adds contextual information to that newly created task (e.g., message content, message sender, patient name). Or put another way, the server system 126 knows the context since the user clicks on the menu item within a specific message screen. In block 908, the server system 126 adds contextual information to the newly created task. In particular, the messaging system module 111 within the server system 126 adds contextual information including: message content, sender, date and time stamp, patient name, patient birthdate, for example. In block 912, if the task has been tagged, then the intelligent tagging module 114 executes a set of pre-defined workflow task rules. In block 912, a user can view the task in the task module.

The user and system actions in FIG. 9 direct creation of an instance of a data structure described below with reference to FIG. 19. More particularly, user messages are transmitted as messages to the server system 126. A post a task processor described below with reference to FIG. 20, provides an association 1950 between a message object 1906 that corresponds to a message shown in a device UI with a task object 1908 that corresponds to a user-defined task shown in the device UI. Thus, an instance of the data structure 1900 acts to associate tasks that are available to members of a group of users with messages sent to members of the group. Client application instances 103 running on user devices displays user defined tasks in correspondence with user messages that an instance of the data structure 1900 indicates to be associated with the each other.

Figure 10A:
FIG. 10A is an illustrative drawing of an example client application user interface screen display showing a list of files displayed on user device in accordance with some embodiments.

User Interface Displays Example During Collaboration in the Context of a File FIG. 10A is an illustrative drawing of an example client application user interface screen display showing a list of files displayed on user device in accordance with some embodiments. At the bottom of the display screen there is displayed menu of items: "Tasks", "Files", Inbox", Providers" and "Settings. In this example, the "Files' menu item is selected, which has resulted in display of the example list of files. Alternatively, for example, if the "inbox" menu item was selected, then the UI display would transition to the message UI of FIG. 8A. A user can sort/filter the files, star/flag the files and tag the files, for example.

Figure 10B:
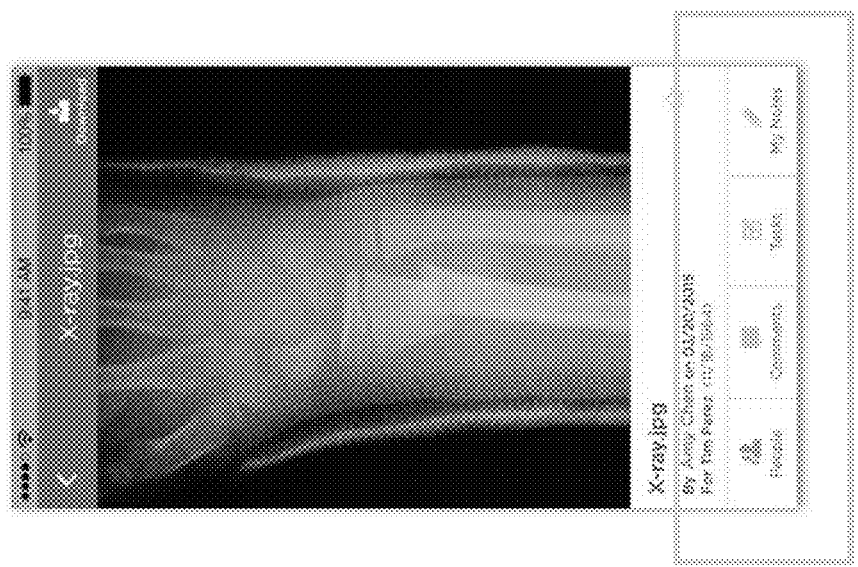
FIG. 10B is an illustrative drawing of an example client application user interface screen display showing a contextual activity menu in a file context in accordance with some embodiments.
Figure 10C:
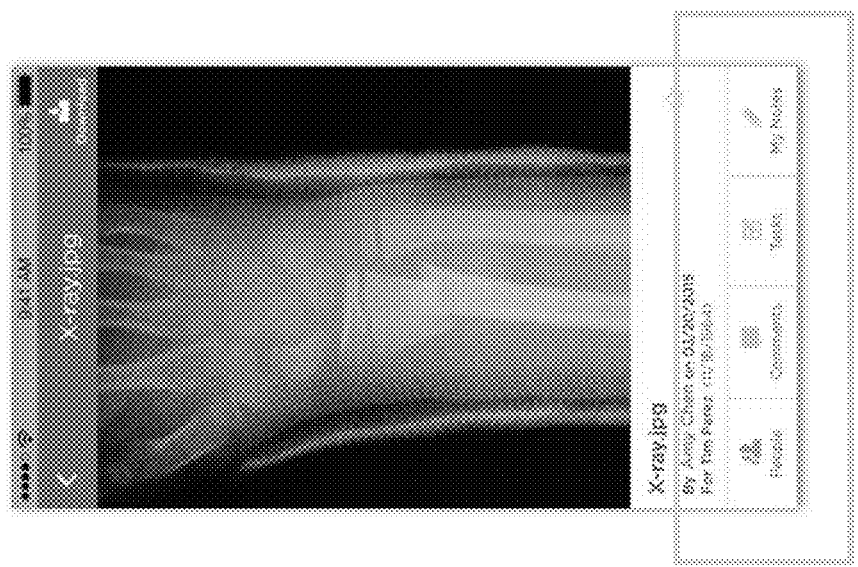
FIG. 10C is an illustrative drawing of an example that shows a "People" menu item selected from the contextual activity menu associated with the UI screen of FIG. 10B in accordance with some embodiments.
Figure 10D:
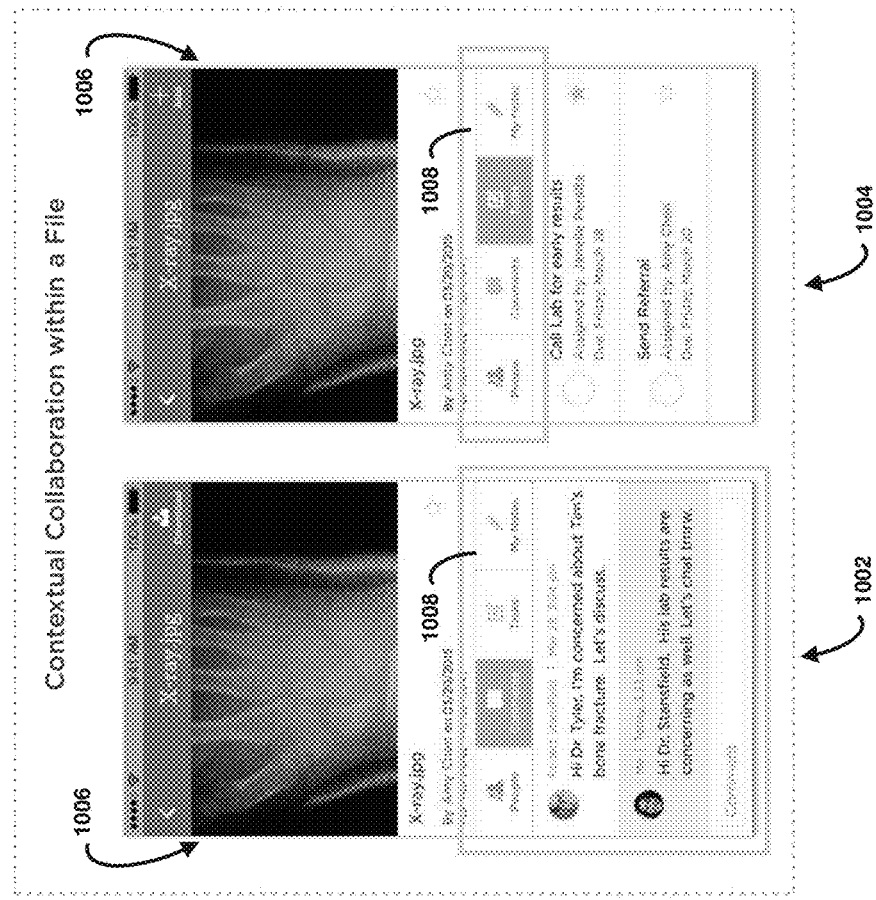
FIG. 10D is an illustrative drawing of an example that shows a menu displayed in response to a user section of the "Comments" menu item and the "Task" menu item, respectively, in the screen of FIG. 10C in accordance with some embodiments.

FIG. 10B is an illustrative drawing of an example client application user interface screen display showing a contextual activity menu in a file context in accordance with some embodiments. The example UI screen of FIG. 1.0B is displayed in response to a user selection of the first file ("X-ray.jpg") in the file list of FIG. 10A. The display screen of FIG. 10B includes a contextual activity menu in a file context that includes the menu items, "People", "Comments" "Tasks", and "My Notes" that a user can select. Selection of the "People" menu item causes display of the UI screen display of FIG. 10C, which shows the selected X-ray.jpg file that is selected in FIG. 10B that also shows the providers who are associated with the selected file. From the "People" menu item, the user can select additional providers with whom he would like to share the file. FIG. 10C shows that the "People" menu item is selected from the contextual activity menu associated with the UI screen of FIG. 10B. FIG. 10D shows a menu displayed in response to a user selection of the "Comments" menu item in the screen of FIG. 10C. In particular, an X-ray.jpg file is shown selected in FIG. 10B that also shows the comments by providers that are associated with the selected file. Selection of the "Tasks" menu item causes display of a UI screen display on the right in FIG. 10D, which shows the selected X-ray.jpg file that is selected in FIG. 10B that also shows the tasks who are associated with the selected file. Selection of the "My Notes" menu item causes display of a UI screen display (not shown), which shows the selected X-ray.jpg file that is selected in FIG. 10B that also shows a user of the device's personal notes that are associated with the selected file.

Figure 11A:
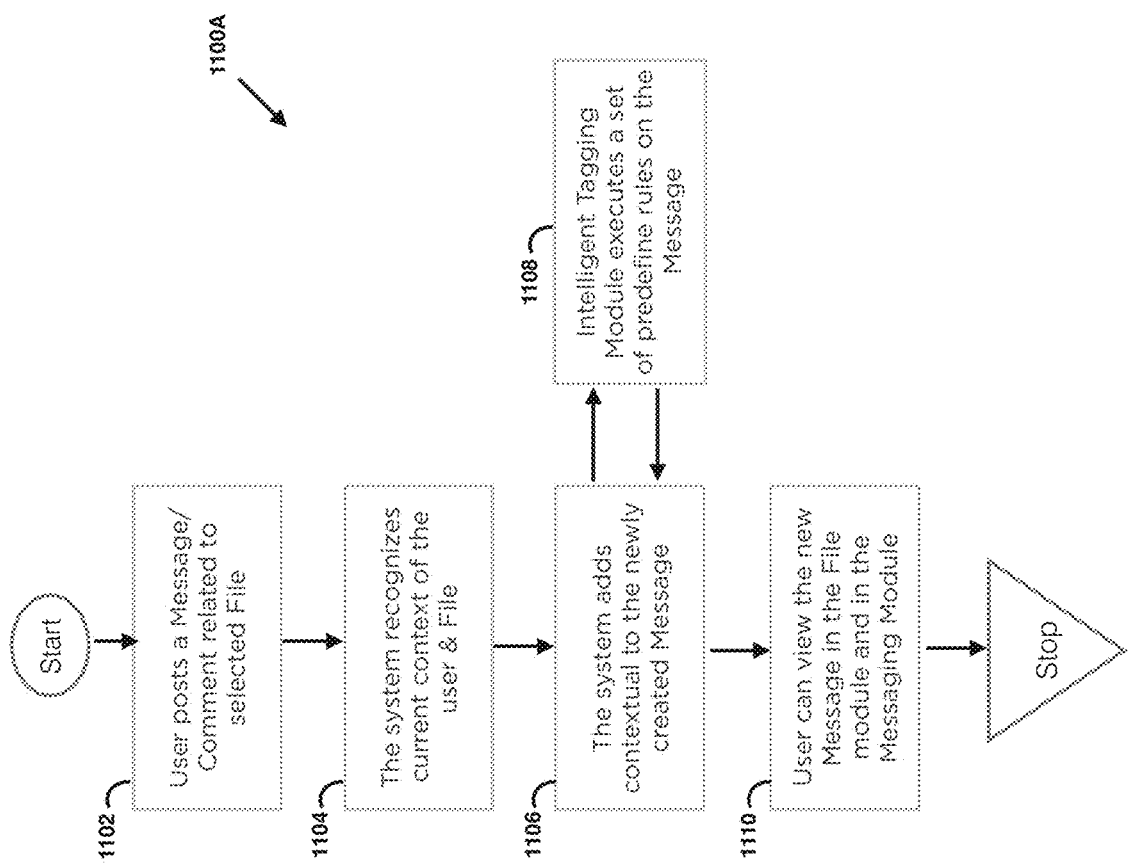
FIG. 11A is an illustrative flow diagram representing user and system actions involved with posting a message in the context of a file in accordance with some embodiments.
Figure 11B:
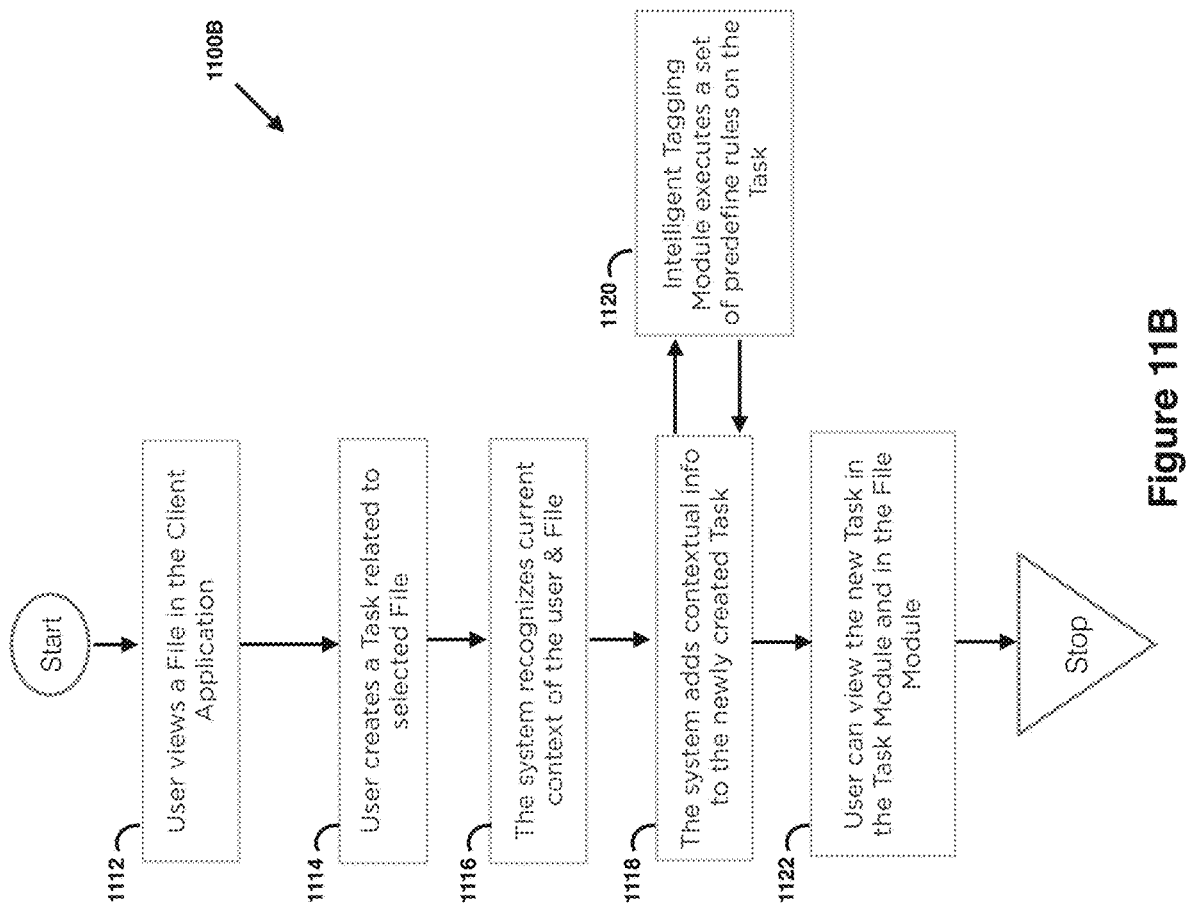
FIG. 11B is an illustrative flow diagram representing user and system actions involved with creating a task in the context of a file in accordance with some embodiments.
Figure 11C:
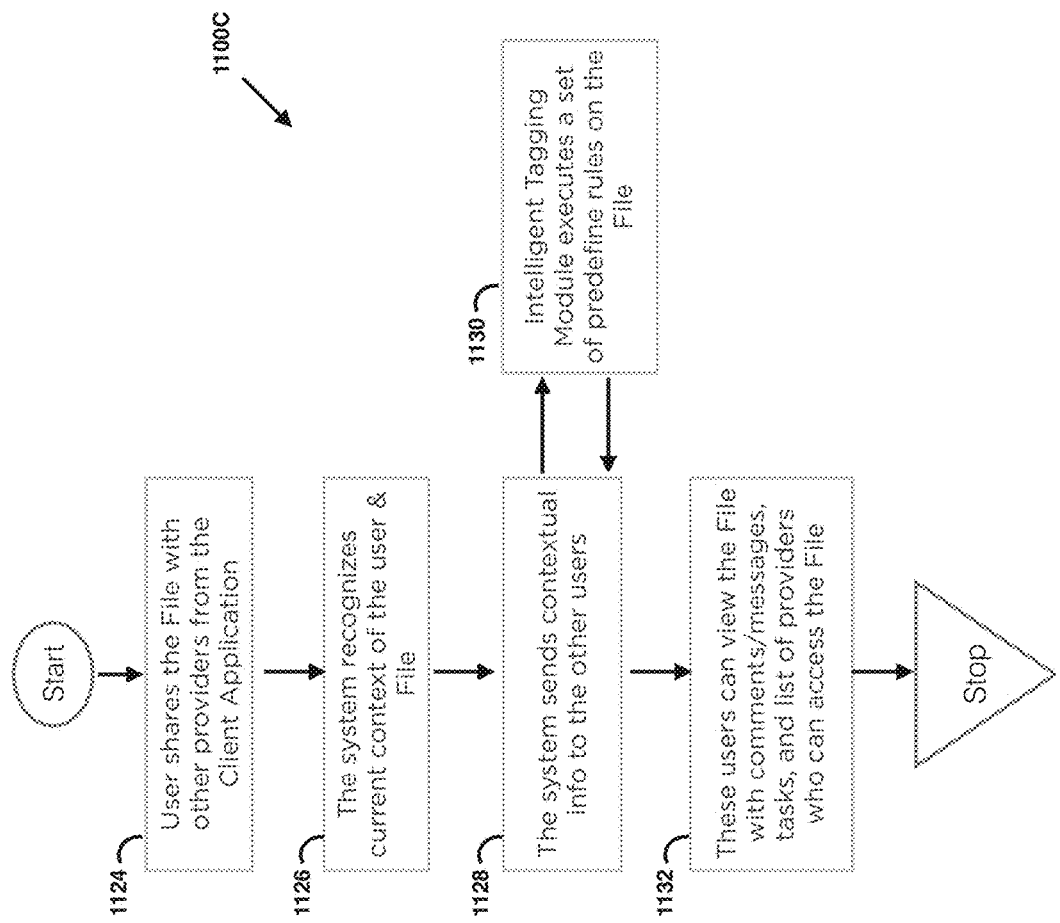
FIG. 11C is an illustrative flow diagram representing user and system actions involved with sharing of a file among members of a group in accordance with some embodiments.

Referring again to FIG. 10D is an illustrative drawing of an example sequence of first and second user interface screen displays 1002 and 1004 representing collaboration of providers in the context of a file in accordance with some embodiments. Providers may collaborate with each other in the context of a file 1006, which is shown in both UI screen displays 1002, 1004, to coordinate patient care by accessing a contextual collaboration window within the UI screen, for example. In accordance with some embodiments, collaboration is achieved through an instance of the data structure 1900 of FIG. 19, which is discussed more fully below, which is within the server system 126. The example file includes an x-ray image 1006 that corresponds to a file object 1902 within an instance of the data structure 1900 within the data storage 125 of the server system 126. The first file collaboration UI screen display 1002 includes a contextual activity menu 1008 in the file context that includes menu selections: "People", "Comments", "Tasks" and "My Notes". It is noted that the menu items within an activity menu are different in the file context and in the task context. In a file context, "Task" is a menu item within an activity menu, but "Files" is not. In a task context, discussed below, "Files" is a menu item within an activity menu, but "Task" is not. In this example, the provider accessing the file has selected the "Comments" menu item, which is shown highlighted. In response to the provider's selection of "Comments" in the file menu, the first file collaboration UI screen display 1002 shows shared comments provided by providers who have commented on the associated file 1006. The second file collaboration UI screen display 1004 shows the activity menu 1008 in the file context with the "Tasks" menu item selected, in response to the provider's selection of "Tasks" in the file menu, the second file collaboration UI screen display 1004 shows a list of tasks associated with the file 1006. The provider can add to the list of tasks. FIGS. 11A-11C are illustrative flow diagrams 1100A, 1100B, 1100C representing user and system actions involved with collaboration of providers in the context of a file in accordance with some embodiments.

FIG. 11A is an illustrative flow diagram representing user and system actions involved with posting a message to a file in accordance with some embodiments. In block 1102, a user posts a message/comment related to selected file. In block 1104, the system recognizes the current context of the user and the file. In block 1106, the system adds contextual information to the newly created message. In block 1108, the intelligent tagging module 114 executes a set of predefined rules on the message. In block 1110, a user can view the new message in the file module and in the messaging module 111.

The user and system actions in FIG. 11A direct creation of an instance of a data structure described below with reference to FIG. 19. In accordance with some embodiments, user comments are transmitted as messages to the server system 126. A contextual message to file processor described below with reference to FIG. 21, associates the file 1006 with a file object 1902 within an instance of a data structure 1900 and associates that file object with message objects 1906 that correspond to comments/messages posted by users in their device UIs in association with the file 1006.

In particular, the contextual message to file processor provides an association 1942 between a file object 1902 that corresponds to the example file 1006 with one or more message objects 1906 that correspond to one or more comment messages received from users. Thus, an instance of the data structure 1900 acts to associate files that are available to members of a group of users with comments/messages made about the file by members of the group. Client application instances 103 running on user devices displays the example file image 1006 in association with user comments that a corresponding instance of the data structure 1900 indicates to be associated with the file image 1006. FIG. 11B is an illustrative flow diagram representing user and system actions involved with posting a task to a file in accordance with some embodiments. In block 1112, a user views a file in the client application. In block 1114, the user creates a task related to selected file. In block 1116, the management server system 126 recognizes current context of the user and file. More particularly the server system 126 understands that the user created a new task in the context of the specific file and adds contextual information to that newly created task. Or put another way, the system knows the context since the user clicks on the menu item within a specific file screen. In block 1118, the system adds contextual information to the newly created task, e.g., file name, ID, type, etc. In module 1120, the intelligent tagging module 114 executes a set of predefined rules on the file. In block 1122, the user can view the new task in the task module and in the file module.

The user and system actions in FIG. 11B direct creation of an instance of a data structure described below with reference to FIG. 19. A contextual task to file processor described below with reference to FIG. 22, associates the user-defined task with a task object 1908 within an instance of a data structure 1900 and associates that task object 1908 with a file object 1902 within the instance of a data structure 1900. In particular, the contextual task to file processor provides associations 1950, 1942 that act to associate a task object 1908 that corresponds to a user-defined task with a file object. Thus, an instance of the data structure 1900 acts to associate a file with tasks that are to be performed in relation to the file by members of a group of users. A client application instance 103 running on a user device, displays the example file image in association with tasks that a corresponding instance of the data structure 1900 indicates to be associated with the file.

FIG. 11C is an illustrative flow diagram representing user and system actions involved with sharing of a file among members of a group in accordance with some embodiments. In block 1124, a user shares the file with other providers from the client application. In block 1126, the management server system 126 recognizes current context of the user and file. In block 1128, the system sends the contextual information to the providers with whom the file has been shared, e.g. file name, File ID, File Type, Comments that have been posted, Providers with whom file has been shared. In block 1130, the intelligent tagging module 114 executes a set of predefine rules on the message. In block 1132, the users can view the file with comments/messages, tasks, and list of providers who can access the file.

The user and system actions in FIG. 11C direct creation of an instance of a data structure described below with reference to FIG. 19. A contextual file sharing processor described below with reference to FIG. 23, creates a file object 1902 within an instance of a data structure 1900. The server system 126 sends messages to one or more members of a group indicated within one or more user objects 1924 associated with the instance of the data structure to notify of the shared file. A client application instance 103 running on a user device, receives the notification message and displays a file image.

User Interface Displays Example During Collaboration in the Context of a Task

FIG. 12A is an illustrative drawing of an example client application user interface screen display showing a list of tasks displayed on user device in accordance with some embodiments. At the bottom of the display screen there is displayed a menu of items: "Tasks", "Files", Inbox", "Providers" and "Settings. In this example, the "Tasks" menu item is selected, which has resulted in display of the example list of tasks. Alternatively, for example, if the "Files" menu item was selected, then the UI display would transition to a file list UI like that of FIG. 10A. Similarly, if the "inbox" menu item was selected, then the task list UI display would transition to a message list UI like that of FIG. 8A. A user can view tasks assigned to the user and can view tasks assigned to others by the user. A user can sort/filter the tasks by due date and overdue status. A user can take actions such as star/lag the tasks, mark as complete, delete and archive tasks.

FIG. 12B is an illustrative drawing of an example user interface screen display produced in response to a user selecting the first task ("Send patient record to Dr. Fisher") listed in the task list UI screen display of FIG. 12A in accordance with some embodiments. The display screen of FIG. 12B includes a contextual activity menu in a task context that includes the menu items, "People", "Comments" "Files", and "My Notes" that a user can select. Selection of the "Comments" menu item causes display of the UI screen display of FIG. 12C, which shows the task that is selected in FIG. 12B that also shows the Comments that are associated with the selected Task. A contextual activity menu associated with the UI screen of FIG. 12C shows that the "Comments" menu item is selected. Using the activity menu, a user can take contextual action on a specific task: share task with others, post comments, add files related to the task, or add private notes.

Figure 12D:
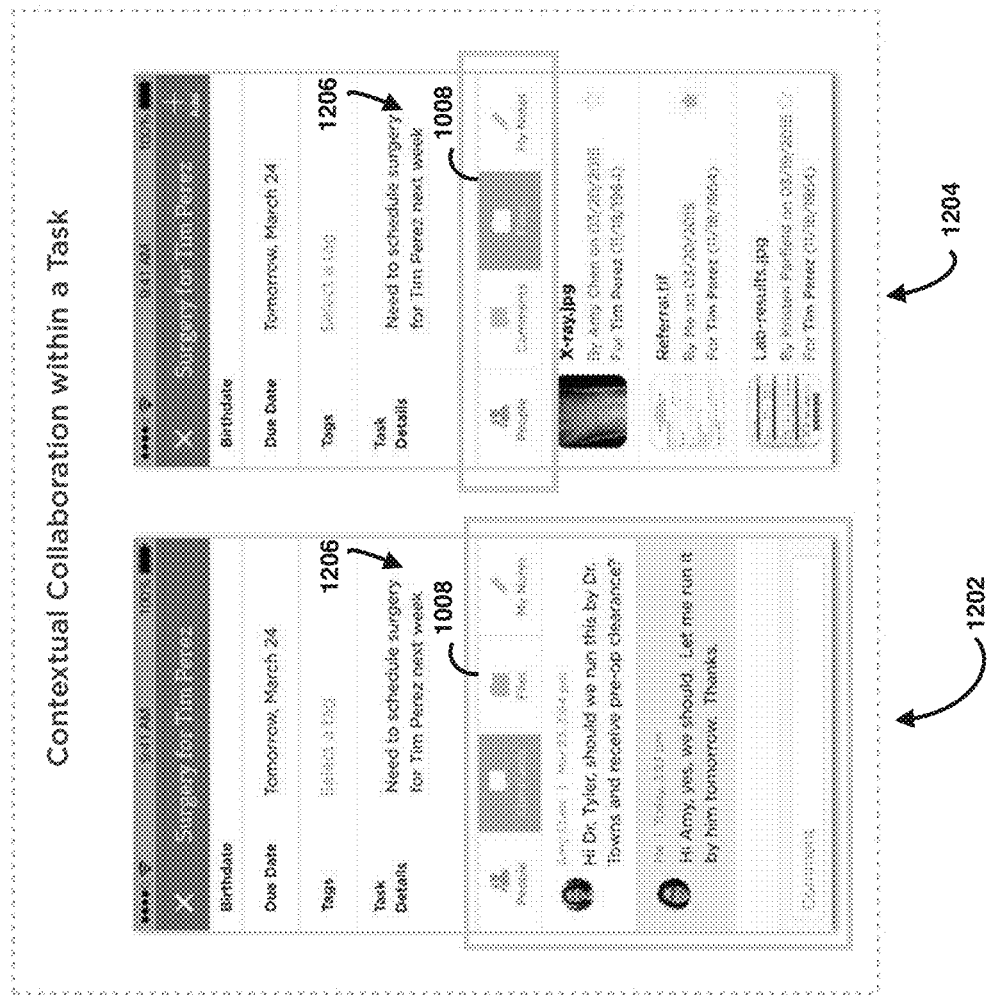
FIG. 12D is an illustrative drawing of an example sequence of first and second user interface screen displays representing collaboration of providers in the context of a task in accordance with some embodiments.

FIG. 12D is an illustrative drawing of an example sequence of first and second user interface screen displays 1202 and 1204 representing collaboration of providers in the context of a task in accordance with some embodiments. Providers may collaborate with each other in the context of a task 1206, which is shown in both displays 1202, 1204, to coordinate patient care by accessing a contextual collaboration window within the task detail UI display screen, for example. The first task collaboration UI screen display 1202 includes the contextual activity menu 1008 in the task context that includes menu selections: "People", "Comments", "Files" and "My Notes". In this example, the provider accessing the task has selected the "Comments" menu item, which is shown highlighted. In response to the provider's selection of "Comments" in the contextual action menu, the first task collaboration UI screen display 1202 shows shared comments provided by providers who have commented on the associated task 1206. The second task collaboration UI screen display 1204 shows the contextual activity menu 1008 in a task context with the "Files" menu item selected. In response to the provider's selection of "Files" in the file menu, the second task collaboration UI screen display 1204 shows a list of files associated with the task 1206. The provider can add to the list of files.

Figure 13A:
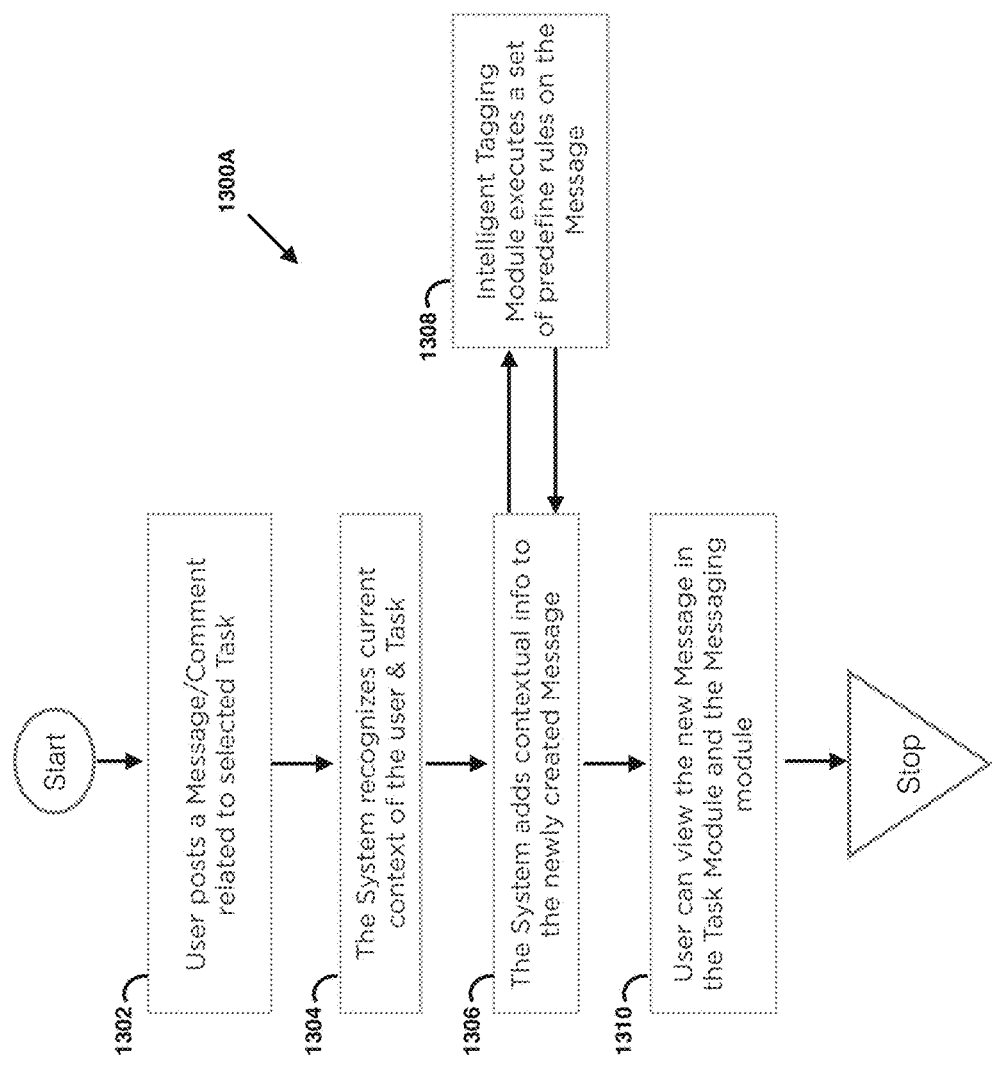
FIG. 13A is an illustrative flow diagram representing user and system actions involved with posting a message to a task in accordance with some embodiments.
Figure 13B:
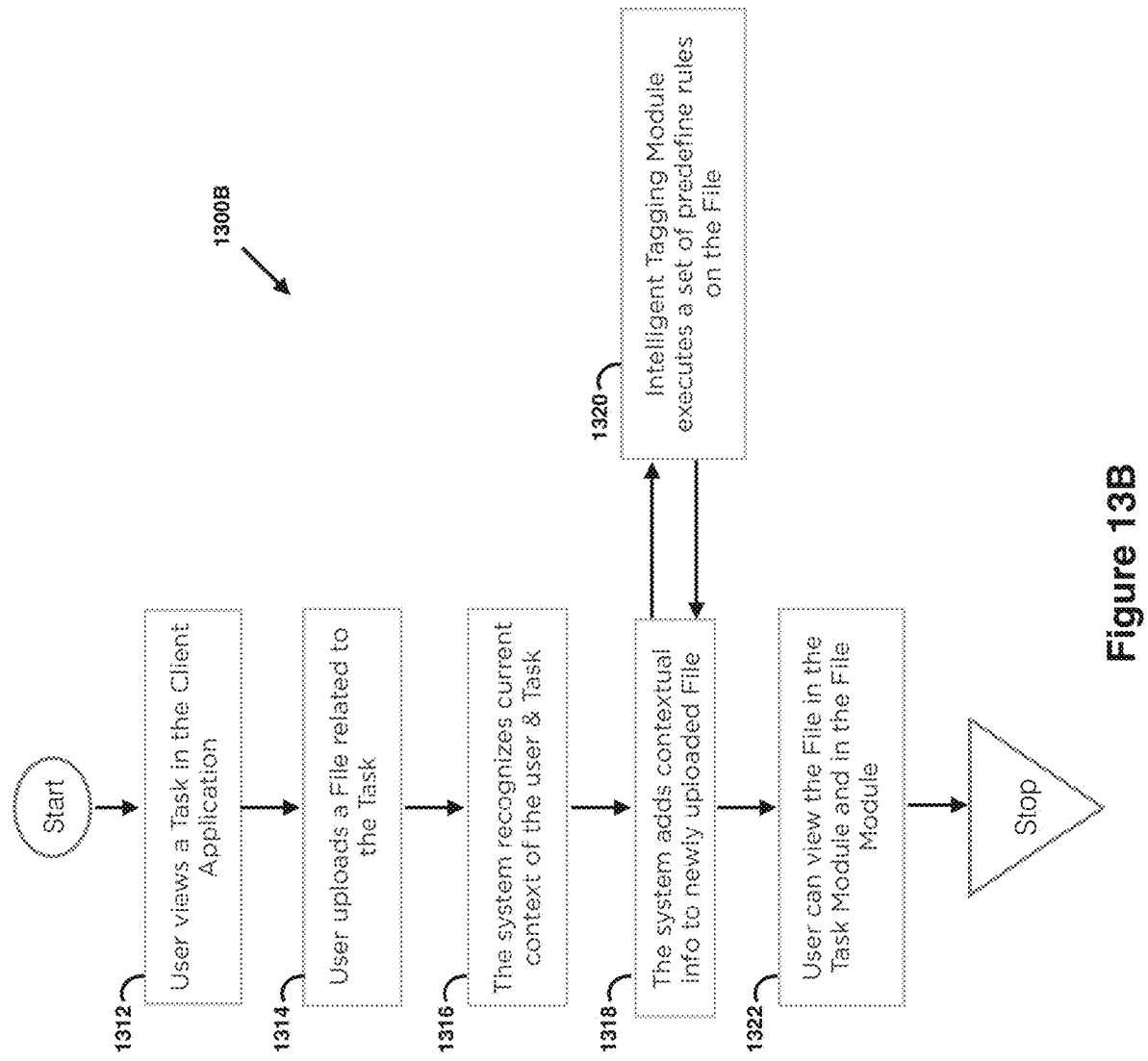
FIG. 13B is an illustrative flow diagram representing user and system actions involved with posting a file to a task in accordance with some embodiments.
Figure 13C:
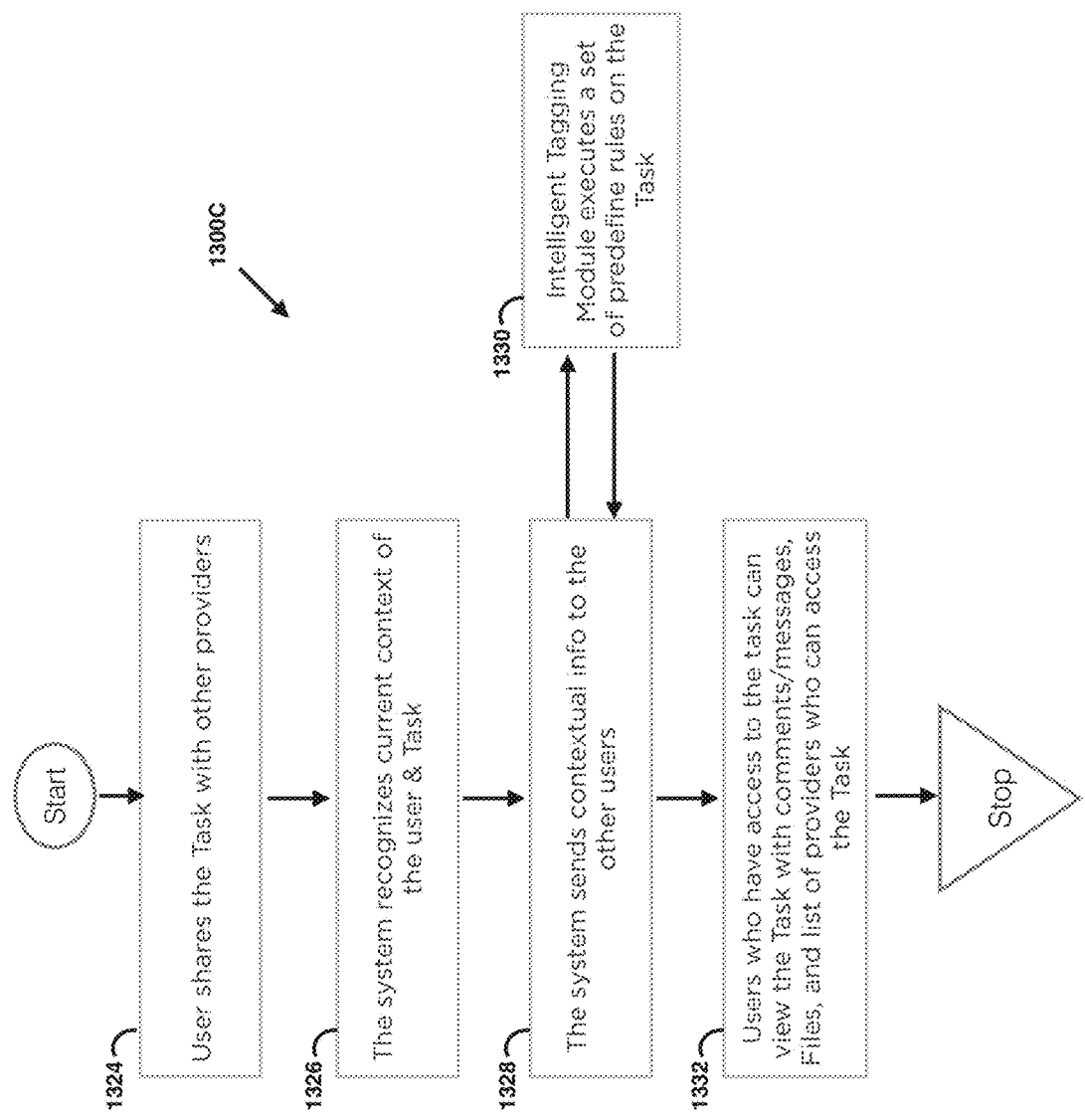
FIG. 13C is an illustrative flow diagram representing user and system actions involved with sharing of a task among members of a group in accordance with some embodiments.

FIGS. 13A-13C are illustrative flow diagrams 1300A, 1300B, 1300C representing user and system actions involved with collaboration of providers in the context of a task in accordance with some embodiments. The pattern of user and system actions involved with collaboration of providers in the context of a task has the same pattern as the actions described with reference to those involved with collaboration of providers in the context of a file described with reference to FIGS. 11A-11C. Thus, FIGS. 13A-13C will be understood by a person skilled in the art by reference to the description associated with FIGS. 11A-11C.

FIG. 13A is an illustrative flow diagram representing user and system actions involved with posting a message to a task in accordance with some embodiments. The user and system actions in FIG. 13A direct creation of an instance of a data structure described below with reference to FIG. 19. A contextual add message to task processor described below with reference to FIG. 24, creates an association 1950 between a message object 1906 and a task object 1908 within an instance of a data structure 1900. The server system 126 sends messages to one or more members of a group indicated within one or more user objects 1924 associated with the instance of the data structure to notify of the message posted to the task. A client application instance 103 running on a user device, receives the notification message and displays the message posted to task information.

FIG. 13B is an illustrative flow diagram representing user and system actions involved with posting a file to a task in accordance with some embodiments. The user and system actions in FIG. 13B direct creation of an instance of a data structure described below with reference to FIG. 19. A contextual add file to task processor described below with reference to FIG. 25, creates associations via association 1942, 1950, for example, between a file object 1902 and a task object 1908 within an instance of a data structure 1900. The server system 126 sends messages to one or more members of a group indicated within one or more user objects 1924 associated with the instance of the data structure to notify of the file posted to the task. A client application instance 103 running on a user device, receives the notification message and displays the file posted to task information.

FIG. 13C is an illustrative flow diagram representing user and system actions involved with sharing of a task among members of a group in accordance with some embodiments. The user and system actions in FIG. 13C direct creation of an instance of a data structure described below with reference to FIG. 19. The user and system actions in FIG. 13C direct creation of an instance of a data structure described below with reference to FIG. 19. A contextual task sharing processor described below with reference to FIG. 26, creates a task object 1908 within an instance of a data structure 1900. The server system 126 sends messages to one or more members of a group indicated within one or more user objects 1924 associated with the instance of the data structure to notify of the shared task. A client application instance 103 running on a user device, receives the notification message and displays shared task related information.

Figure 14:
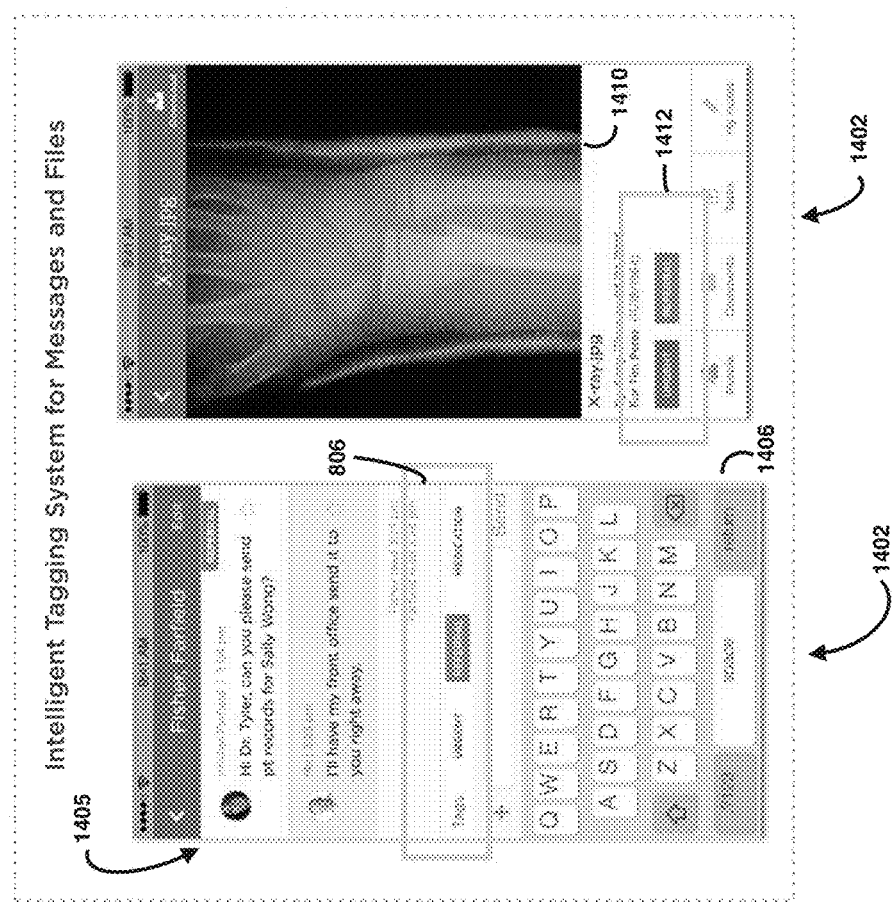
FIG. 14 is an illustrative drawing of an example sequence of first and second user interface screen displays in which a user adds intelligent tags in accordance with some embodiments.

User Interface Displays Example During Collaboration in Involving Intelligent Tagging FIG. 14 is an illustrative drawing of an example sequence of first and second user interface screen displays 1402 and 1404 in which a user adds intelligent tags in accordance with some embodiments. A tag can be added to various objects such as messages, files and tasks. Tags are associated with rules and embedded intelligence to manage and automate various workflows and collaborative processes. The UI screen display 1402 includes messages 1405, a keyboard 1406 and the Tags menu 806 that includes Tag menu selections: "Urgent", "Referral", "Medication", "Consultation", "Imaging", "Lab Test", and "Admission". In this example, the provider has selected the "Referral" menu item, which is highlighted. The second collaboration UI screen display 1402 includes an x-ray image from a file 1410 and a Tag menu 1412 that includes Tag menu selections: "Urgent", "Referral", "Medication", "Consultation", "Imaging", "Lab Test", and "Admission". In this example, the provider has selected the "Urgent" menu item, which is highlighted.

Continuing with the example in FIG. 14, assume for example, that a primary care physician refers his patient to a specialist by sending a message and related documents. The primary care physician applies a "Referral" tag (as indicated in the first screen display 1402) to the message which triggers the analytics module 119 and rules module 118 to manage the referral process from start to finish. The intelligent tagging module 116 will automatically create tasks for all parties in the referral process, send reminder and alerts, assign referral-related activities to delegates, and "listen" for consultation notes from the specialist physician. The analytics module 119 with the help of the intelligent tagging module 116 can also detect referrals made by the specialist to another provider (e.g., sub-specialist) and notify the primary care physician of this second level referral that has taken place.

Referral Intelligent Tag Workflow—Example

Figure 15A:
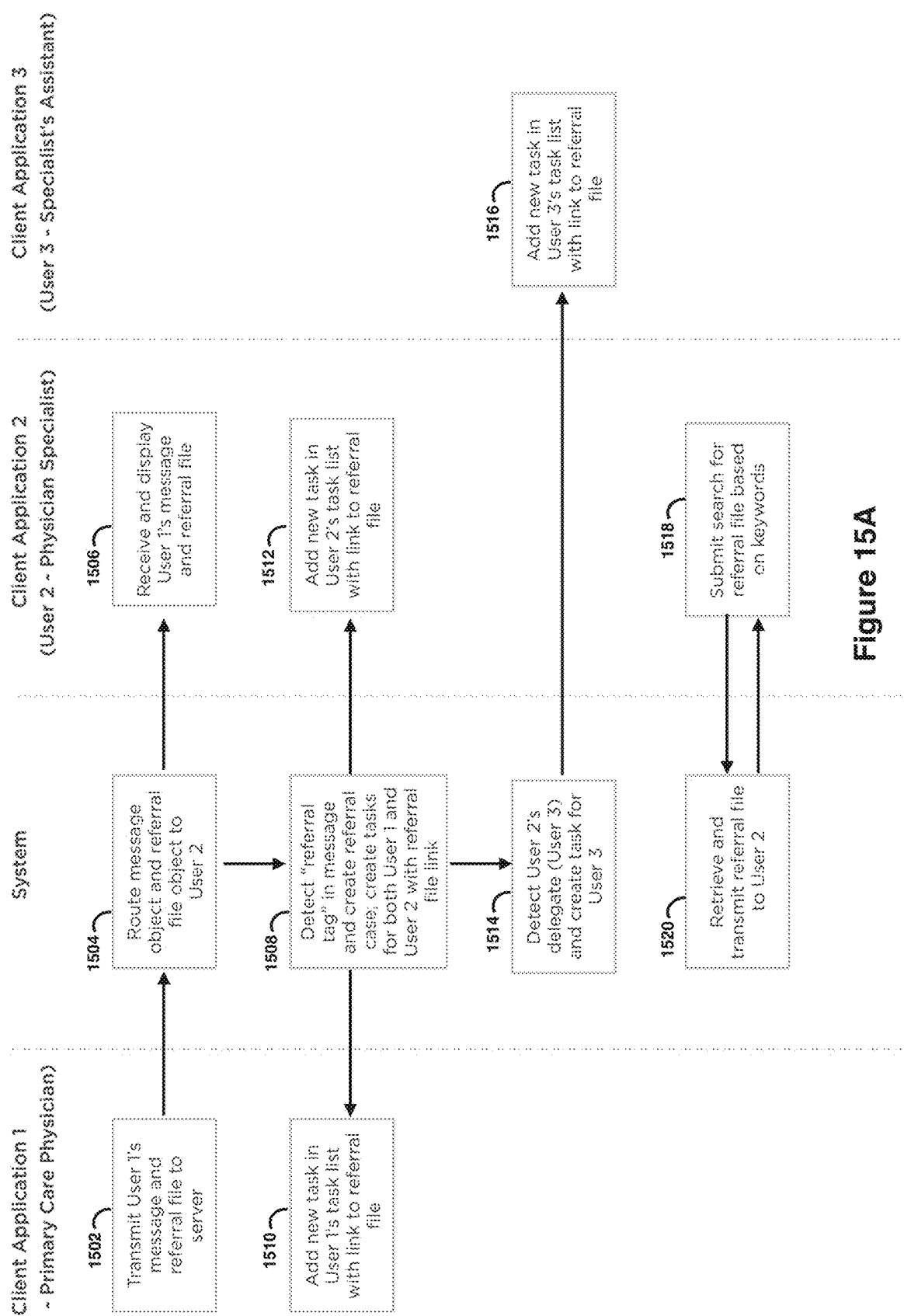
FIGS. 15A-15B provide an illustrative example work flow diagram indicating an example workflow for a referral tag in accordance with some embodiments.

FIGS. 15A-158 provide an illustrative example work flow diagram indicating an example workflow implemented by the management server system 126 to manage work among multiple providers in response to a provider selecting a "Referral" tag in accordance with some embodiments. The flow diagrams include multiple columns. A first column indicates actions using a client application 103 running on a device used by a first provider (e.g., a primary care physician) who associates a Referral tag to a file. A second column indicates actions performed by the management server system 126 to manage provider activities in response to the first provider selecting the Referral tag. A third column indicates actions using a client application 103 running on a device used by a second provider (e.g., a physician specialist) who receives a referral message from the first provider. A fourth column indicates actions using a client application 103 running on a device used by a third provider (e.g., a specialist's assistant) who receives a message from the second provider in which the second provider delegates a task to the third provider.

Figure 15B:
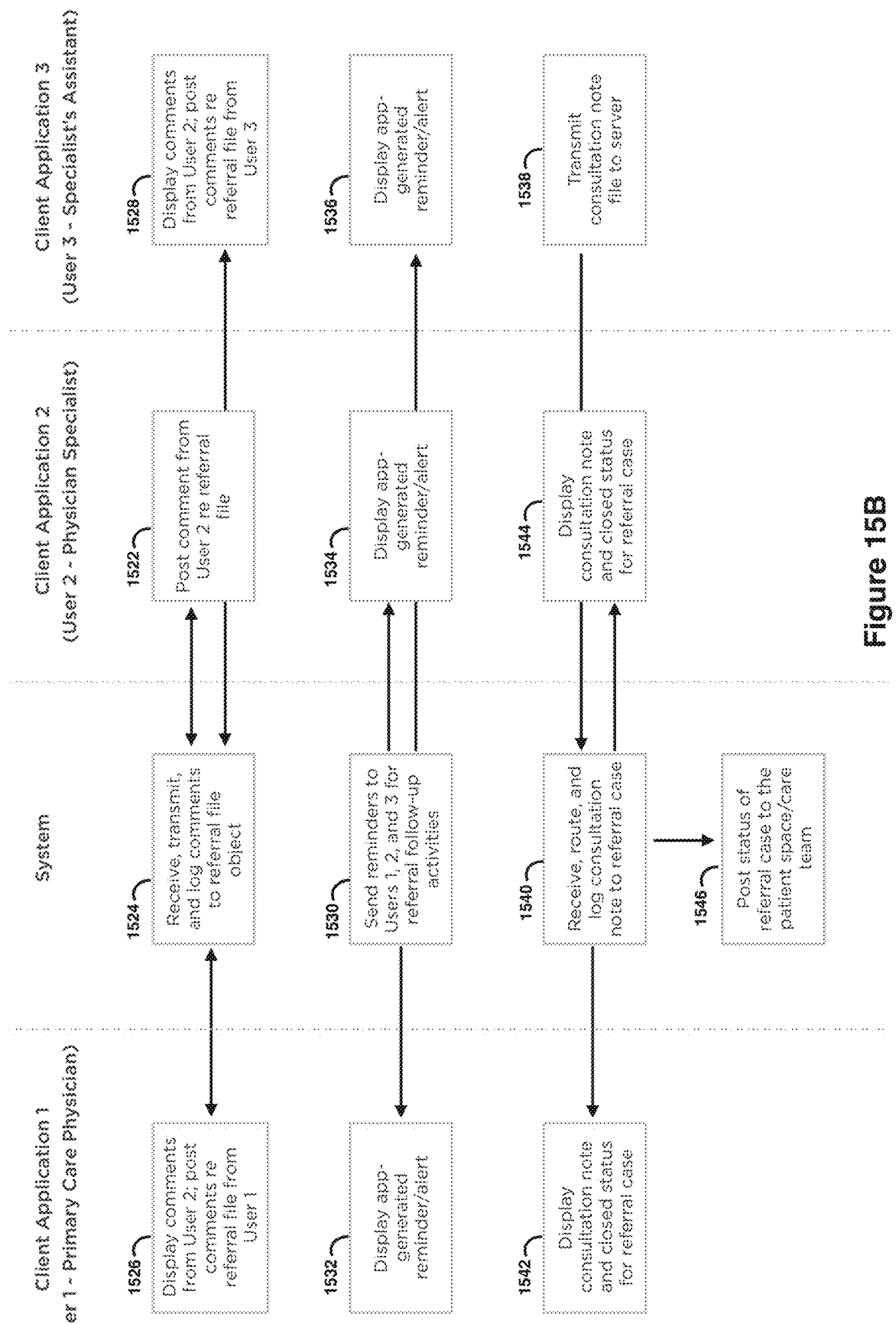

The illustrative work flow diagram of FIGS. 15A-15B provides a work flow example in which the intelligent tagging module 114 of the management server system 126 manages an example Referral work flow. It will be appreciated that a Referral workflow can be dynamic in that it can accommodate both system-created tasks and messages and provider-created tasks and messages. The system creates a Referral workflow instance in storage that has associated attributes such as a patient name and patient data and methods such as tasks and rules for sending messages and reminders. In the example Referral work flow; the first provider sends a message that includes a Referral tag with a referral to the second provider. It will be appreciated that a "delegate" relationship is established beforehand, not during the referral workflow. For example, assuming that the server system 126 knows that provider 3 is a delegate of provider 2, the system 126 creates new tasks for provider 3 as part of the referral workflow. In the course of implementing the referral, the intelligent tagging module 114 of the management server system 126 sends messages to deliver the system-created tasks to providers identified by one or more other providers in the workflow as being members of the work flow; creates task for providers in the workflow; sends messages to members of the workflow to deliver the system-created tasks; sends messages created by the members of the workflow to other members of the workflow that may include provider-created tasks; sends messages to members of the workflow to follow up with reminders as to system-created and provider-created tasks; and sends messages to report status of system-created and provider-created tasks.

In the following discussion of FIGS. 15A-15B, it will be understood that messages are sent and received by providers using client applications running on provider devices such as a smartphone or other device that includes a processor and storage. Referring to FIG. 15A, block 1502 represents a first provider (user 1) sending a message addressed to a second provider (user 2). The message is associated with a file and includes a Referral tag. The message is received by the management server system 126. Block 1504 represents the intelligent tagging module 114 of the management server system 126 routing the message object and the referral file object to the second provider. The management server system 126 sends the message to the second provider. Block 1506 represents the second provider receiving the message and the referral file sent by the first provider. Block 1508 represents the intelligent tagging module 114 detecting the Referral tag in the message, creating a referral case, and creating tasks for both the first and second providers.

It will be appreciated that a referral case involves a set of rules and methods. When a referral case is created, the system tracks the referral workflow from start to finish and executes a set of rules and methods. Some can be time-based, while others can be event-based.

In some embodiments, the referral case is implemented as a referral record stored in a computer readable storage device. The management server system 126 sends messages to the first and second providers that include the system-created tasks. Block 1510 represents the first provider receiving a message indicating a system-created task that is added to a task list in a storage associated with the first provider. Block 1512 represents the second provider receiving a message indicating a system-created task that is added to a task list in a storage associated with the second provider. It is assumed that the second provider sends a message (not shown) directed to the third provider that delegates the system-created task to the third provider. The management server system 126 receives the second provider's message delegating the task. Block 1514 represents the system detecting the second provider's delegation of the task to the third provider and in response to the delegation, creating a corresponding delegated task for the third provider. The system sends a message to the third provider that includes the system-created delegated task. Block 1516 represents the third provider receiving a message indicating a system-created task that is added to a task list in a storage associated with the third provider. Block 1518 represents the second provider sending a message that includes a search request for the referral file based upon keywords. Block 1520 represents the management server system 126 retrieving the file and transmitting it to the second provider in response to the second provider's search request.

Referring to FIG. 15B, block 1522 represents the second provider posting a comment concerning the referral file and sending a message associated with the referral case to the other members associated with the case, i.e. to the first and third providers. The management server system 126 receives the message. Block 1524 represents the system receiving the second provider's message containing the posted comment, transmitting the comment to the other members associated with the referral case, logging the comment to a referral file object instance in storage. Block 1526 represents the first provider receiving a message from the system containing the second provider's comments and the display of the second provider's comments on by the first provider's device. Similarly, block 1528 represents the third provider receiving a message from the system containing the second provider's comments and the display of the second provider's comments on by the third provider's device. Block 1530 represents the intelligent tagging module 114 of the management server system 126 creating and sending system-created reminder messages to the first, second and third providers as to follow-up activities required of one or more of them. Blocks 1532, 1534 and 1536 represent the first, second and third provider, respectively, receiving and displaying the system-created reminder/alert. Block 1538 represents the third provider creating and transmitting a consultation note to the other providers associated with the referral case. Block 1540 represents the system receiving the message containing the consultation note, logging the note to the referral file object instance in storage and sending messages containing the consultation note to the first and second providers. Blocks 1542 and 1544 represent the first and second providers receiving messages from the system containing the second provider's consultation note. Block 1546 represents the system posting status of the referral case to the patient space/care team. In accordance with some embodiments, if the providers have set up a patient space/care team in advance, then this referral status can be posted automatically to that space/care team.

Figure 27:
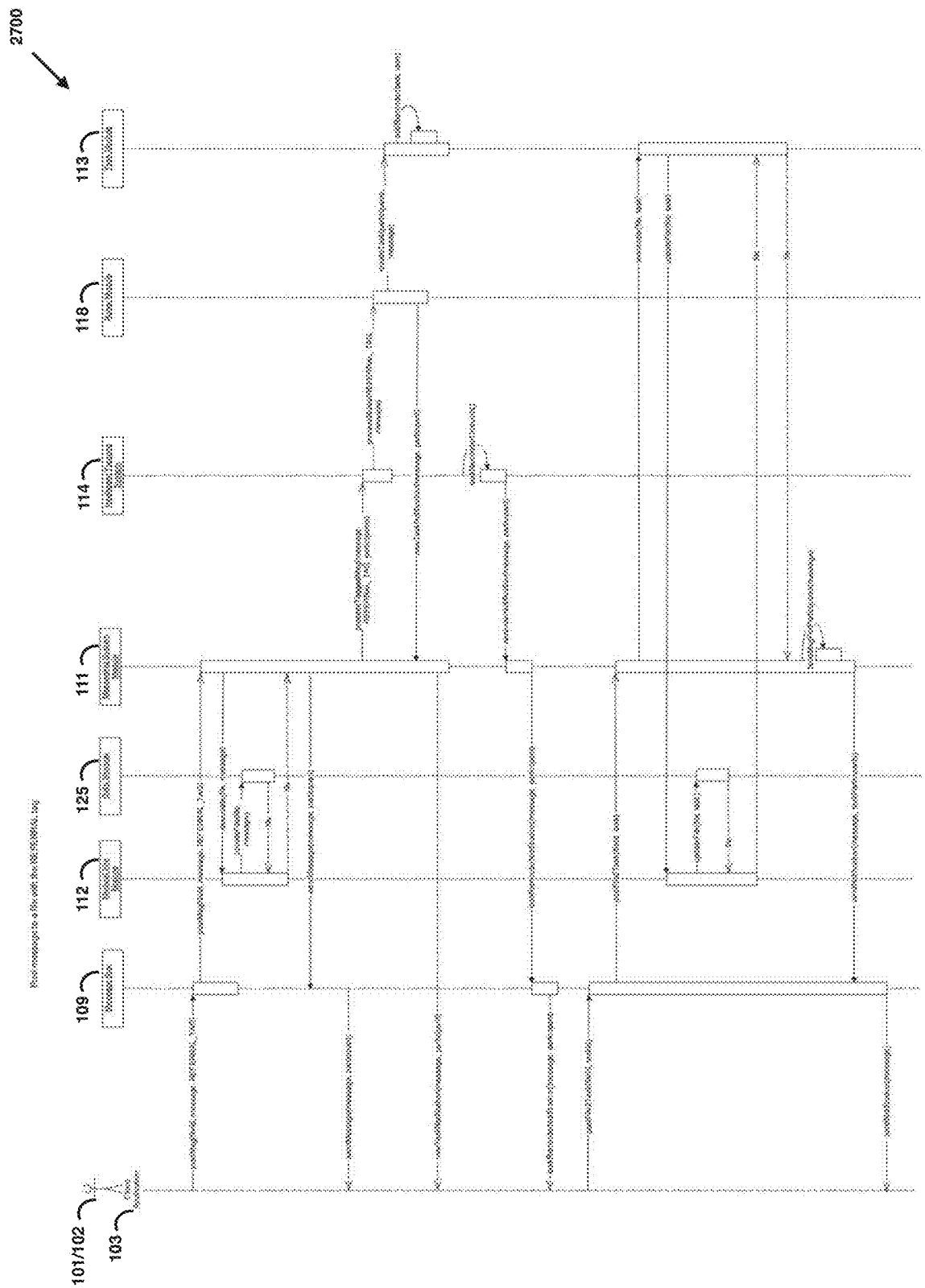
FIG. 27 is an illustrative sequence flow diagram representing configuration of the server system of FIG. 1A to act as a contextual referral processor in accordance with some embodiments.

The user and system actions in FIGS. 15A-15B direct creation of an instance of a data structure described below with reference to FIG. 19. The user and system actions in FIGS. 15A-15B direct creation of an instance of a data structure described below with reference to FIG. 19. A contextual referral processor described below with reference to FIG. 27, provides an association 1951 between a tag object 1904 and a task object 1908 within an instance of a data structure 1900. The server system 126 sends messages to one or more members of a group indicated within one or more user objects 1924 associated with the instance of the data structure to notify of the referral involving tasks. A client application instance 103 running on a user device, receives the notification message and displays shared referral information including task related information.

Patient Care Team Workflow—Example

Figure 16:
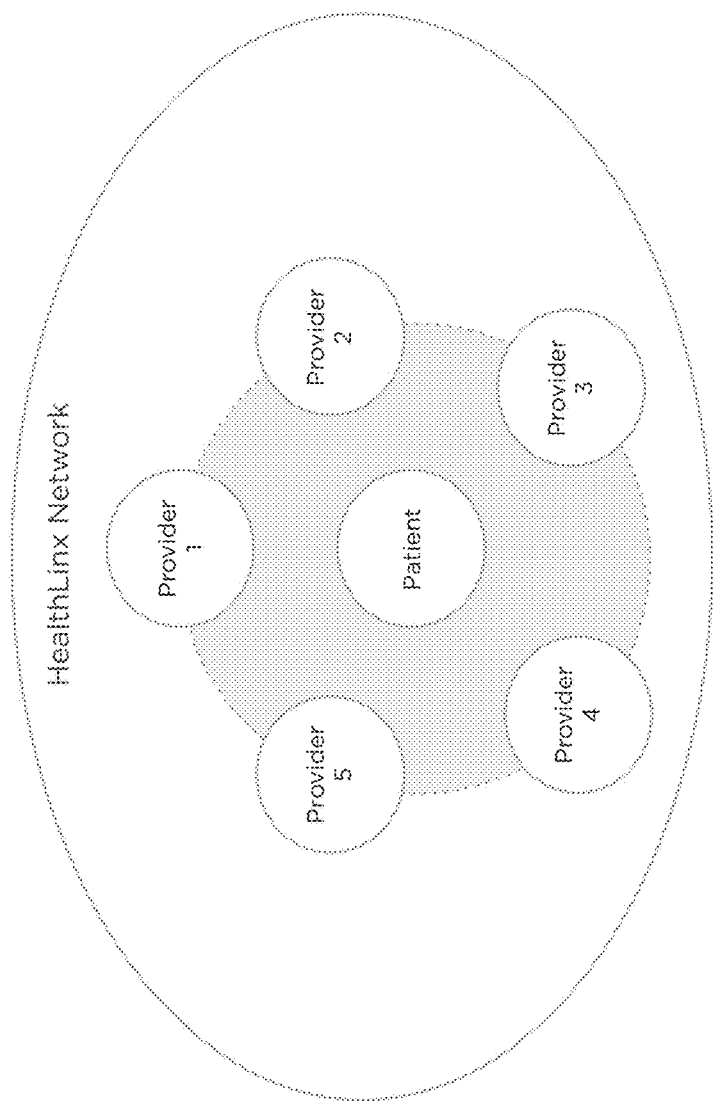
FIG. 16 is an illustrative drawing representing relationships among members of a care team in accordance with some embodiments.
Figure 17A:
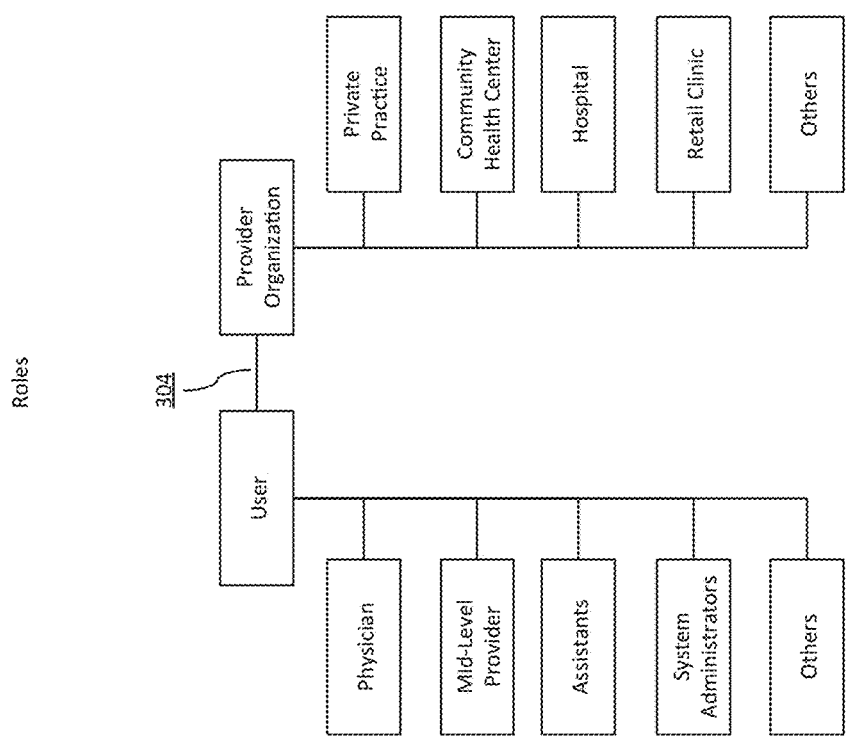
FIG. 17A is an illustrative diagram indicating example provider roles in accordance with some embodiments.
Figure 17B:
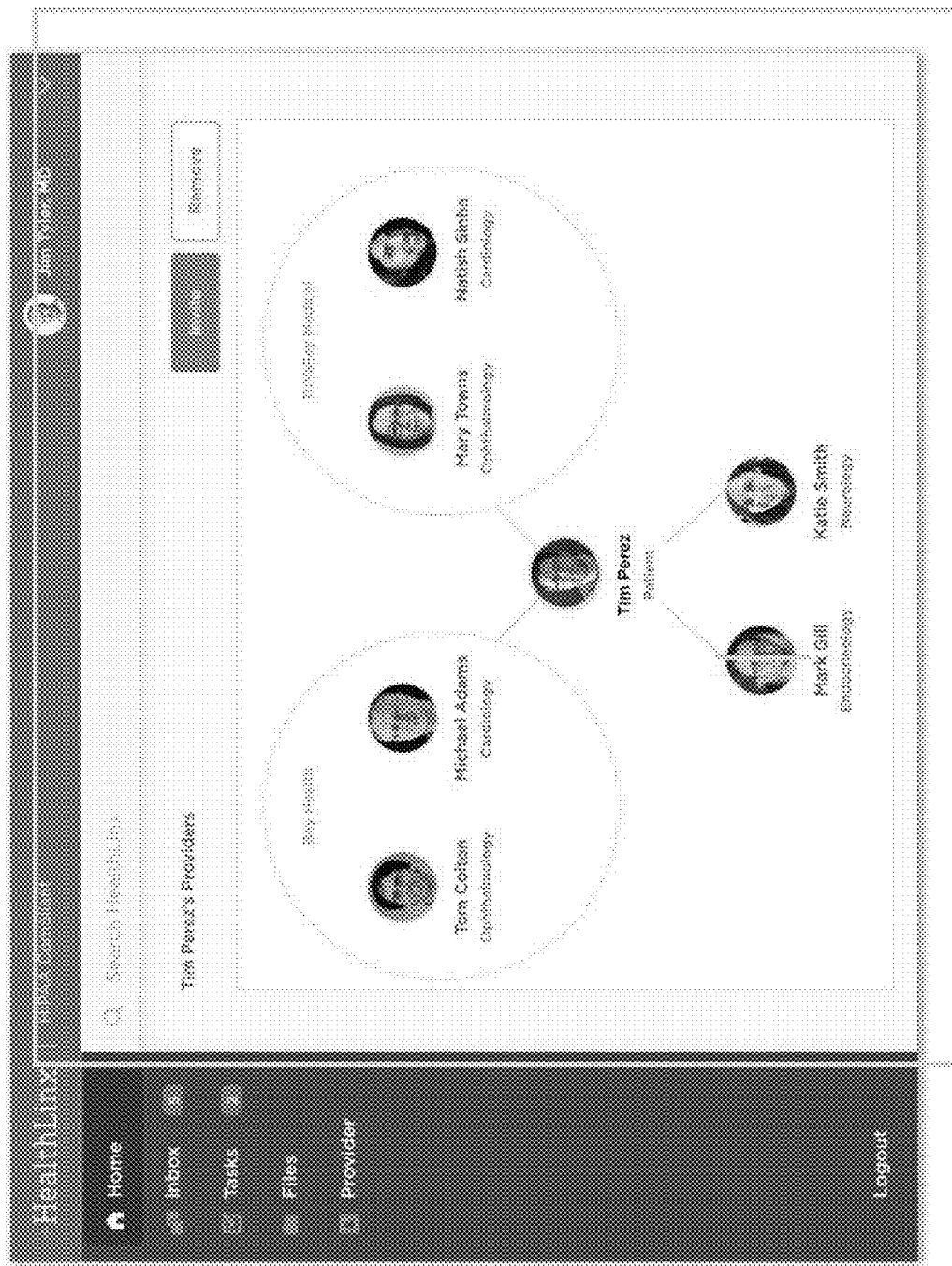
FIG. 17B is an illustrative drawing of an example client application user interface screen display showing example care team information in accordance with some embodiments.

FIG. 16 is an illustrative drawing representing relationships among members of a care team in accordance with some embodiments. A care team includes multiple providers and the patient. FIG. 17A is an illustrative diagram indicating example provider roles in accordance with some embodiments. Two categories of roles are shown. A first category includes individual users: physician, mid-level provider (e.g., a nurses), assistants, system administrators and others. A second category includes provider organizations: private practice, community health center, hospital, retail clinic, and others. FIG. 17B is an illustrative drawing of an example client application user interface screen display showing example care team information in accordance with some embodiments. The illustrative care team display shows providers, their relationships to each other and to the patient. In particular, the care team display shows two care team individual providers (cardiologist and ophthalmologist) who are members of the Bay Health group, two care team individual providers (cardiologist and ophthalmologist) who are members of the TriValley Medical group, an individual provider (endocrinologist), an individual provider (neurologist), and the patient.

A care team is defined by providers who have profiles within the relationships data structure 200 of FIG. 2A. Providers can create a patient space/care team for sharing relevant data and coordinating care activities related to a specific patient. Patients also can participate in a space/care team with certain access rights, allowing them to have a holistic view of their data from multiple providers and various coordination activities related to their care (e.g., which provider is on point for which activities by when, etc.). The system permits providers and patients to set joint health goals, create shared digital care plans, assign tasks, engage in discussions, and send reminders to activity owners.

Figure 18A:
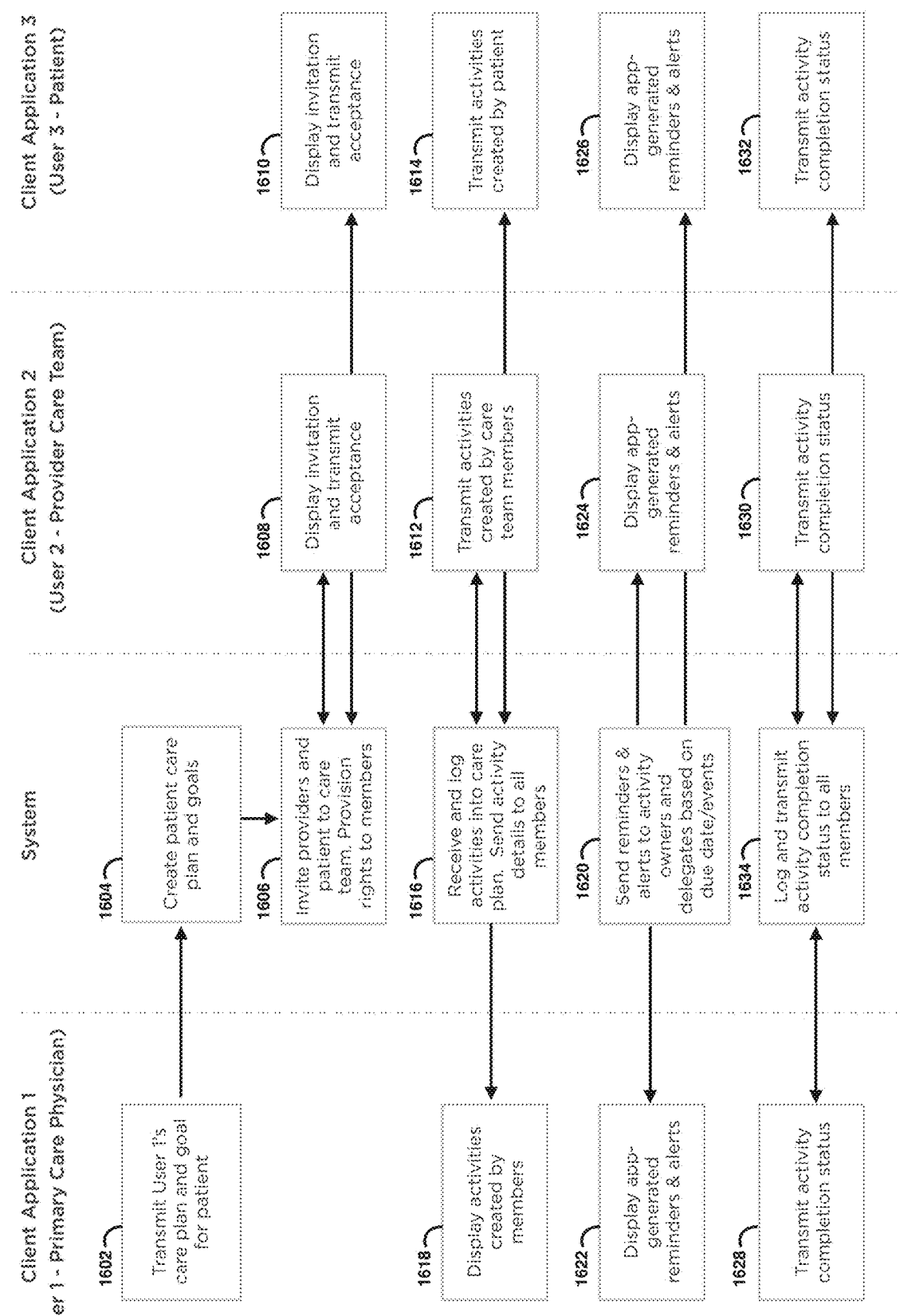
FIGS. 18A-18C provide an illustrative example work flow diagram indicating an example workflow implemented by the management server system to manage work among multiple providers in response to a provider creating a care plan and goal for a patient in accordance with some embodiments.
Figure 18B:
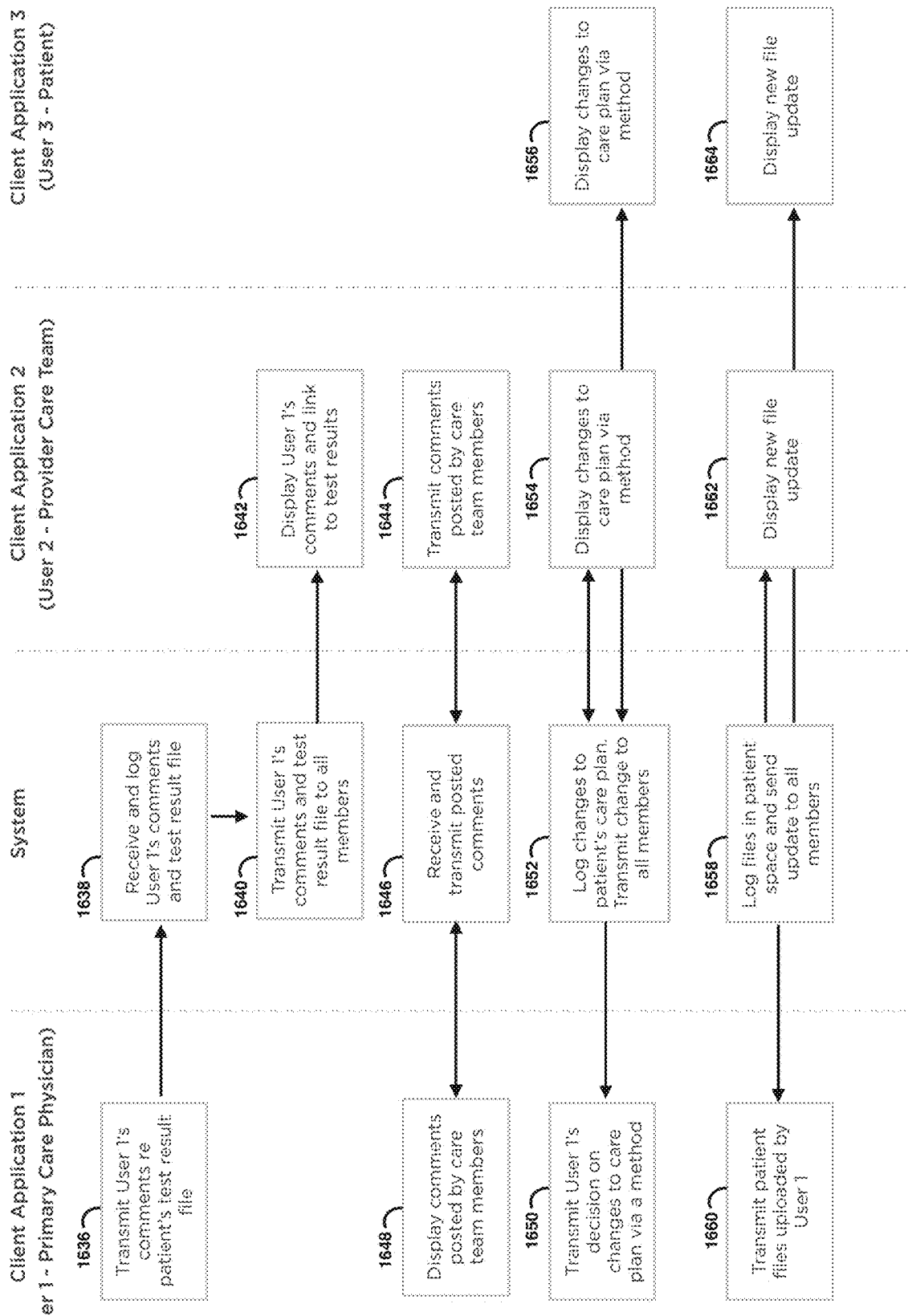
Figure 18C:
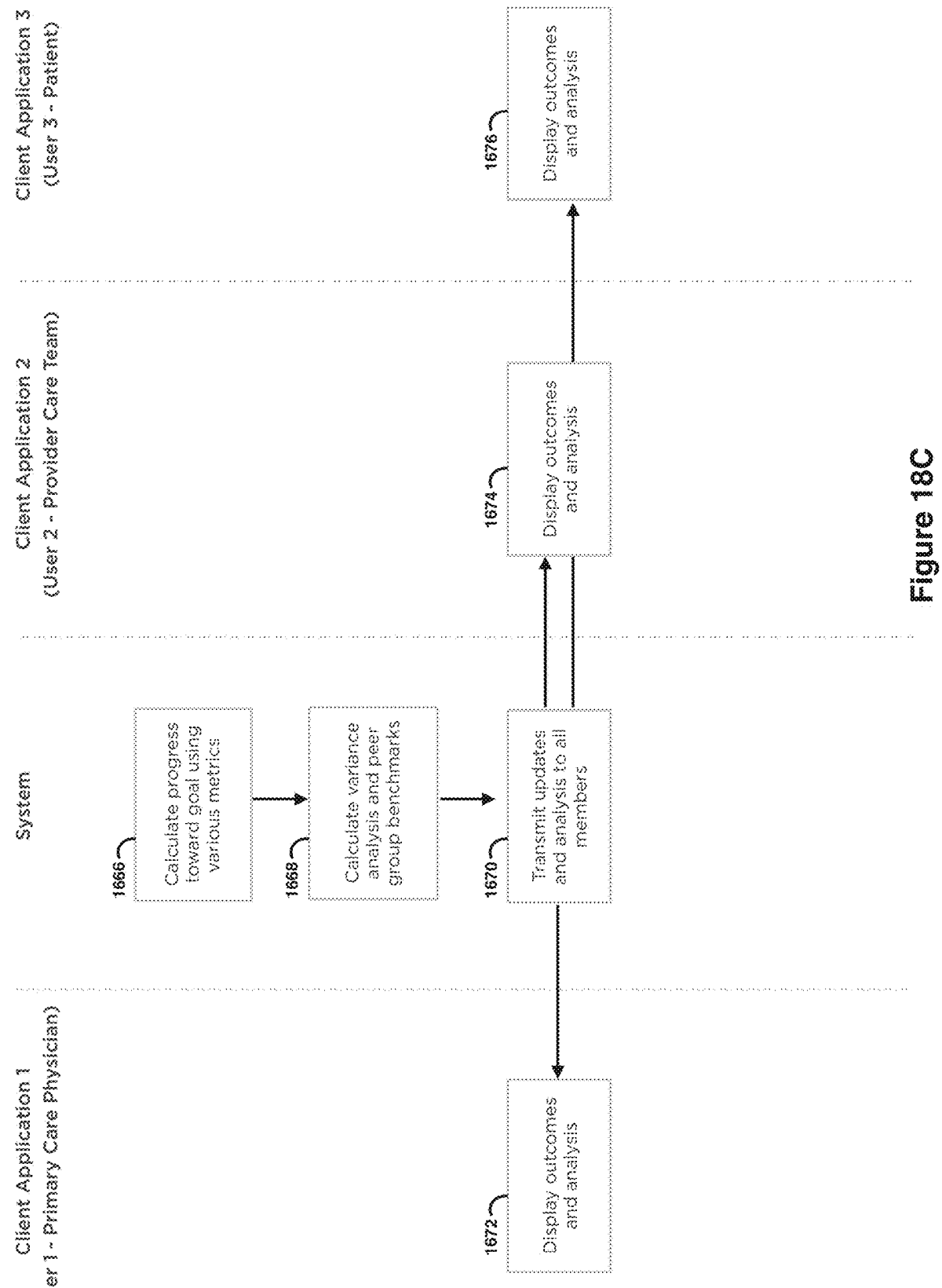

FIGS. 18A-18C provide an illustrative example work flow diagram indicating an example workflow implemented by the management server system 126 to manage work among multiple providers in response to a provider creating a care plan and goal for a patient in accordance with some embodiments. In accordance with some embodiments, a provider can access a list of patients, and when he clicks on a patient's name, the provider can view the patient's care plans and care teams, for example. A first column indicates actions using a client application 103 running on a device used by a first provider (e.g., a primary care physician) who creates a care plan and goal for a patient. A second column indicates actions performed by the management server system 126 to manage provider activities in response to the first provider creating the care plan. A third column indicates actions using a client application 103 running on a device used by a second provider or group of providers (e.g., a provider care team member). A fourth column indicates actions using a client application 103 running on a device used by a patient. It will be appreciated that a patient workflow can be dynamic in that it can accommodate both system-created tasks and messages and provider-created tasks and messages. The system 126 creates a patient care plan workflow instance in storage that has associated attributes such as a patient name and patient data and methods such as tasks and rules for sending messages.

In the following discussion of FIGS. 18A-18C, it will be understood that messages are sent and received by providers using client applications running on provider devices such as a smartphone or other device that includes a processor and storage. Referring to FIG. 18A, Block 1602 represents a first provider (user 1) entering a care plan including a goal into a UI provided by an application client running on a device used by the first provider and sending the care plan to the management server system 126. Block 1604 represents the management server system 126 receiving the message containing the care plan and goals and creating a care plan record instance in storage to manage the care plan and goals. Block 1606 represents the system sending messages to providers to invite them to be members of the patient care team. In some embodiments, one user/provider creates a care team and invites relevant users to the care team for collaboration purposes. Block 1606 also represents the system provisioning rights to care team members. In some embodiments, rights provisioned include: ability to share messages and files, create tasks, add new members to the care team. Blocks 1608, 1610 represent second and third provider care team members (users 2, user 3) receiving the invitation message on their device display screens and sending acceptance messages to the system. Blocks 1612, 1614 represent the second and third providers creating their respective care team activities and sending messages to the management server system 126 indicating the activities. Block 1616 represents the system receiving the care team member created activities, and logging the activities into the stored care plan record, and sending messages to the care team members (users 1, 2, 3) indicating the care team member activities. Block 1618 represents the first provider displaying on his user device, activities created by the care team members. Block 1620 represents the system sending reminder messages and activity alerts to the care team members based upon occurrence of dates and events. For example, an event is that a patient (Tim Perez in the example UI screen) may need to visit an ophthalmologist by a certain date; if the patient does not complete this activity by the due date, then the patient will receive a reminder to visit the physician. The reminder might also be sent several days prior to the due date. Blocks 1622, 1624 and 1626 represent the first, second and third providers receiving the reminder messages and displaying the reminders on their devices. Blocks 1628, 1630 and 1632 represent the first, second and third providers transmitting to the system messages indicating completions of activities as those completions occur. Block 1634 represents the system logging completion activity to the stored care plan record and transmitting messages to care plan members indicating the completion status for the various care plan members.

Referring to FIG. 18B, continuing with the example, block 1636 represents the first user transmitting a message to the system with comments on a patient's test results file. Block 1638 represents the system receiving the first provider's comments and logging them to the care plan object in storage. Block 1640 represents the system sending message containing the first provider's comments to the other care plan members. Block 1642 represents the second provider displaying the first user's message on his device and using a link on his device display screen to access and view a file containing test results. Block 1644 represents the second provider posting comments for transmission to other care team members. Block 1646 represents the system receiving the second provider's comments, logging them to the care plan object and transmitting them to the first provider. Block 1648 represents the first provider receiving and displaying the second provider's comments. Block 1650 represents the first provider making changes to the care plan via an API call method, for example, and sending a message with the changes to the system. Block 1652 represents the system logging the changes to the care plan in the care plan record, and sending messages to the other care plan members reporting the changes. Blocks 1654, 1656 represent the second and third providers displaying the first provider's changes to the care plan. Block 1660 represents the first provider transmitting patient files uploaded by user 1. Block 1662 represents the system receiving the message from the first provider, logging the files into the care plan object and sending messages to the other care plan members to inform them of the uploaded files. Blocks 1662, 1664 represent the second and third providers receiving and displaying the messages containing the new file updates.

Referring to FIG. 18C, continuing with the example, block 1666 calculates progress toward care plan goals. For example, a goal for a diabetic patient might be to reduce body weight from 210 to 190 pounds in next 4 months. Progress toward that goal can be tracked, for example through periodic measurement of body weight and the percentage achieved toward the target weight. For example, if the measured weight after 2 months is 200 pounds, then this patient has achieved 50% progress toward his goal. Block 1668 represents the system determining variance analysis and peer group benchmarks. Continuing with the diabetic patient example, variance analysis may involve, for example, the patient's reducing his body weight from 210 to 200 pounds within four months; so the patient made improvements but did not quite reach the target body weight of 190 pounds. A variance analysis would simply calculate the difference between 200 and 190 pounds; variance=10 pounds/190 pounds. Peer Group Benchmarking: involves comparing the patient's outcome/achievement of goals to a peer group who pursued similar goals within a four-month period; the system would then calculate how this patient did—e.g., patient performed in the 90th percentile. Block 1670 represents the system transmitting updates and analysis results to the care group members. Blocks 1672, 1674 and 1676 represent the first, second and third providers receiving the system-generated messages containing the updates and analysis results and displaying them on their device display screens.

Class Structure

Figure 19:
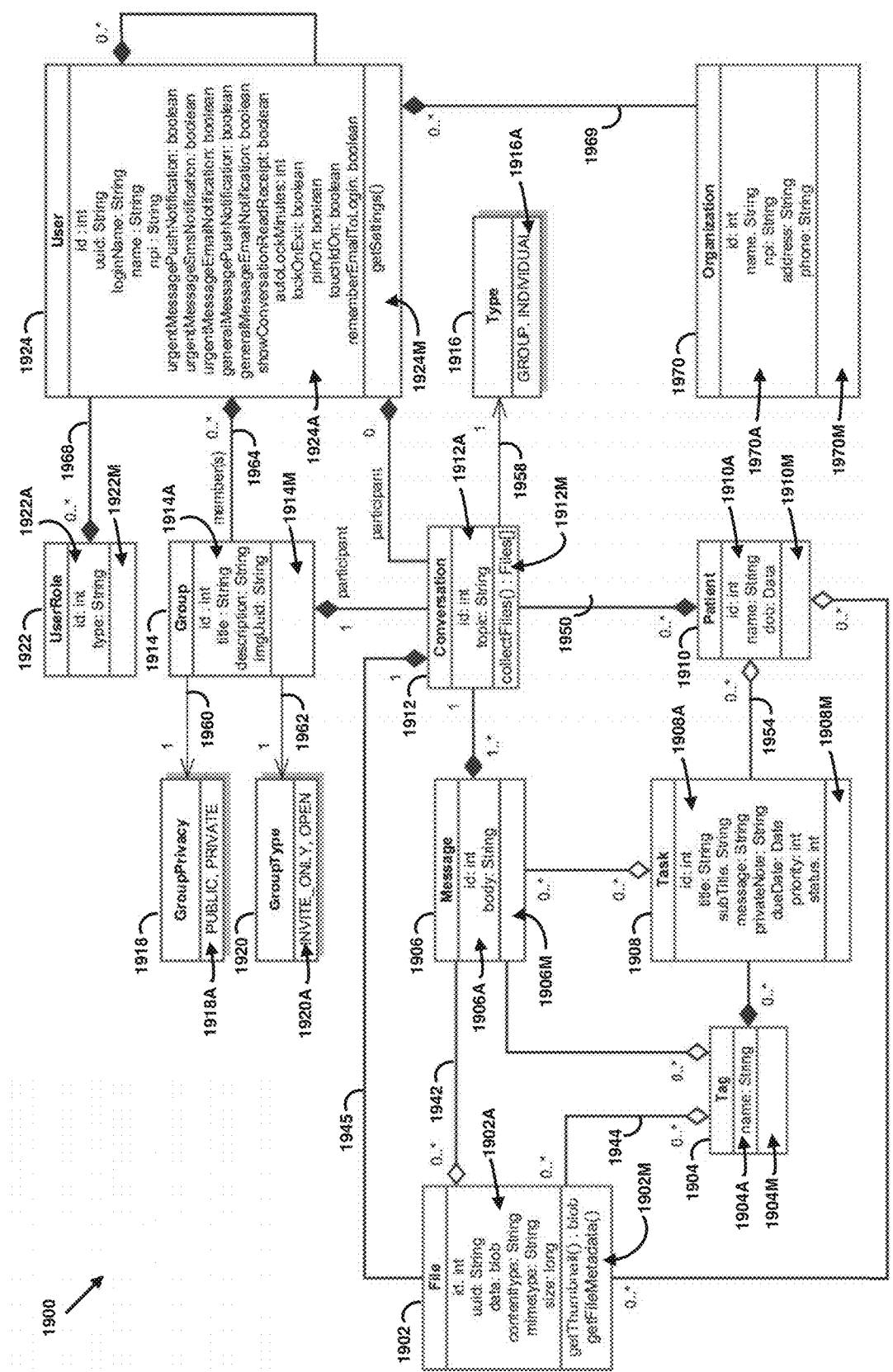
FIG. 19 is an illustrative class diagram representing a software object class in accordance with some embodiments.
Figure 20:
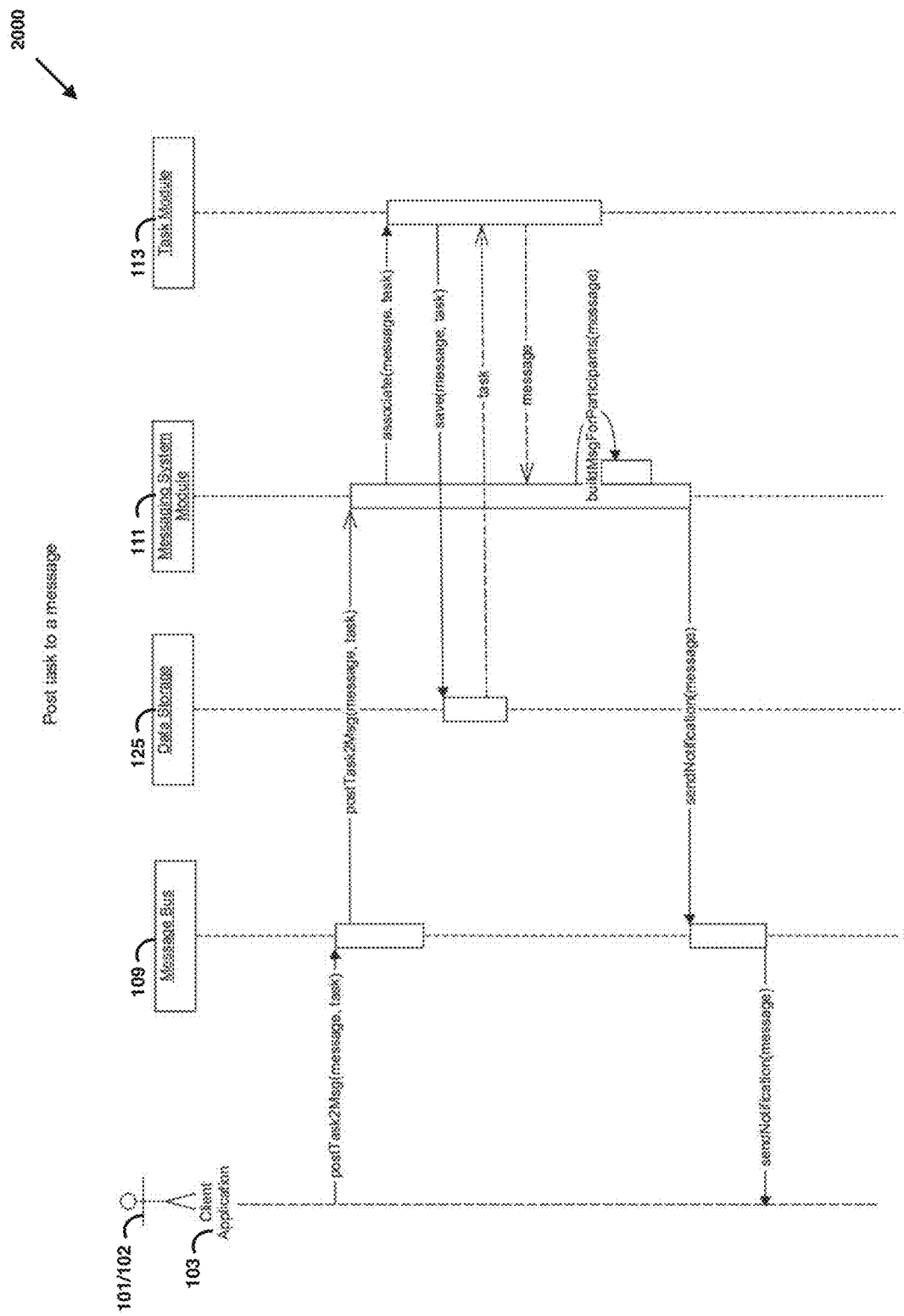
FIG. 20 is an illustrative sequence flow diagram representing configuration of the server system of FIG. 1A to act as a contextual post a task to message processor in accordance with some embodiments.

FIG. 19 is an illustrative class diagram representing a software object class 1900 in accordance with some embodiments. The class 1900 represents structure and organization of instances of the class stored in a non-transitory computer readable storage device. The software object class 1900 includes multiple software objects 1902-1924. Each object includes an object structure indicating corresponding attributes and methods. The software object class 1900 defines a class structure that indicates associations among the objects within the class.

The management server system 126 creates and modifies individual instances of the software class 1900 in a computer readable storage device 125 in response to user interaction with client application UIs displayed on display screens of their client devices. For example, individual instances of a software class 1900 are created and/or modified in the course of providers creating and sending messages. Providers determine objects included in a class instance and the class structure defined by the class determines associations among them. For example, in response to a provider associating a file with a message and sending the file to another provider, the management server system 126 produces a class instance that includes a reference to a message object 1906 that corresponds to the message and that includes a file object 1902 that includes a reference to the file and that includes an association 1942 between the message object 1906 and the file object 1902.

Each object in the class is associated with at least one attribute and/or method. For example, a file object 1902 includes attributes 1902A and methods 1902M. A message object includes attributes 1906A and methods 1906M (not shown). Each object in the class is associated with on more other objects.

The class 1900 includes an association structure 1942 within the storage device that associates the message object 1906 and the file object 1902. The class 1900 includes association 1944 that associates the file object 1902 and a tag object 1904. The class 1900 includes association 1946 that associates the message object 1906 and a tag object 1904. The class 1900 includes association 1948 that associates the message object 1906 and a conversation object 1912.

The class 1900 includes associations 1952, 1954, 1956 that respectively associate the conversation object 1912, task object 1908 and file object 1902 with a patient object 1910. The class 1900 includes association 1958 that associates the conversation object 1912 with a (conversation) type object 1916.

The class 1900 includes associations 1960, 1962 that respectively associate a group privacy object 1918 and a group type object 1920 with a group object 1914. The class 1900 includes an owner association 1964 that associates the group object 1914 with a user object 1924. The class 1900 includes a member association 1966 that associates the group object 1914 with the user object 1924.

The class 1900 includes an association 1968 that associates a user role object 1922 with the user object 1924.

The class 1900 includes an association 1969 that associates a user object 1924 with an organization object 1970.

Sequence Flow Examples

FIGS. 20-27 are illustrative sequence diagrams representing configuration of the system 126 according to the class structure 1900 in accordance with some embodiments. More particularly, the sequence flow diagrams represents configuration of the server system 126 of FIG. 1A according to the class 1900 of FIG. 19 to implement activity in response to provider input to a UI of the client application 103 of FIG. 1C displayed on the provider's device in accordance with some embodiments.

FIG. 20 is an illustrative sequence flow diagram 2000 representing configuration of the server system 126 of FIG. 1A to act as a contextual post a task processor in accordance with some embodiments. The sequence flow diagram 2000 corresponds to the flow diagram 900 FIG. 9 representing user and system actions. A user 101/102 of client application 103 sends a postrask2Msg(message, task) message over a network (not shown) to the message bus 109, which in turn, sends the message to the messaging system module 111. The messaging system module 111 sends a message associate (message, task) to the task module 113 that causes the task module 113 to create a class instance that includes an association 1950 between a message object 1906 corresponding to the message and a task object 1908. As explained with reference to FIG. 9, the tag module executes a set of predefined rules on the task. For example, if a task includes an Urgent tag, then in accordance with an Urgent tag rule, the server system 126 sends a message to notify the recipients of the task that this is an urgent task and therefore the recipients/users should be notified accordingly. The task module 113 sends a message save(message, task) that causes the data store 125 to save the class instance, which includes the associated message object and task object. Then the data store 125 responds with a message object instance, record ID, and other metadata about that message.

It is noted that in the illustrative drawings, dashed lines represents a response by the server 126 to a request. In the task example here, the task module requests Ill the data store 125 to create a new task record, and the data store 125 responds with the appropriate information. Some of the requests (e.g., "postTask2Msg") is an asynchronous call so does not wait for a response from the target system (e.g., "Messaging System Module 111")

The messaging system module 111 executes a method buildMsgForParticipants(message) that builds messages to send to the participants of the task and sends a message sendNotification(message) to the message bus 109. The message bus, in turn, sends the sendNotification(message) to the client application 103 of users who are participants in the newly created task.

Figure 21:
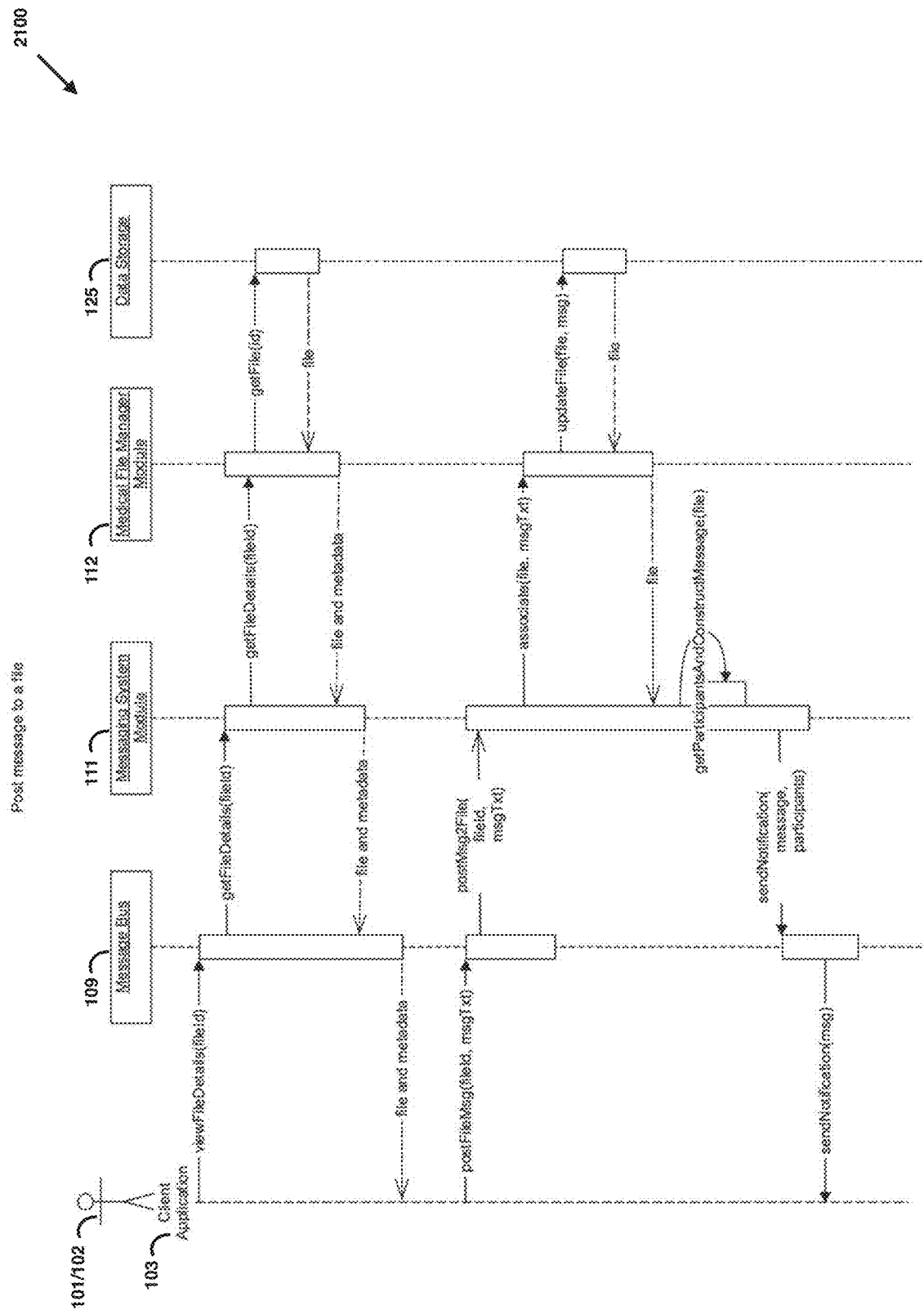
FIG. 21 is an illustrative sequence flow diagram representing configuration of the server system of FIG. 1A to act as a contextual post a message to file processor in accordance with some embodiments.

FIG. 21 is an illustrative sequence flow diagram 2100 representing configuration of the server system 126 of FIG. 1A to act as a contextual message to file processor in accordance with some embodiments. The sequence flow diagram 2100 corresponds to the flow diagram 1100A FIG. 11A representing user and system actions A user 101/102 of client application 103 sends a command message viewFileDetails(fileID) over a network (not shown) to the message bus 109, which in turn, sends getiFileDetails(fileid) message to the messaging system block 111. The messaging system block 111 sends the message to the medical file manager block 112, which sends a message getFile(id) to the data store 125. The data store 125 sends the file to the medical file manager block 112. The medical file manager associates the file with metadata that is retrieved from the data store 125, and sends the file and metadata to the messaging system module 11, which in turn sends the file and metadata over the network (not shown) to the client application 103.

Still referring to FIG. 21, the user 101/102 of client application 103 sends a command message postFileMsg (fileid, msgTxt) over a network (not shown) to the message bus 109, which in turn, sends a message postMsg2File (fileid, msgTxt) to the messaging system module 111. The messaging system module 111 sends a message associate (file,msgTxt) causing the medical file manager module 112 to associate a file object that contains the identified file fileid with a message object that contains the identified msgTxt. The medical file manager module 112 sends an updatedFile (file, msg) message that causes the data store 125 to update the file object with the message information. Then the data store 125 responds with a file object instance, record. ID, and other metadata about that file. As explained with reference to FIG. 11A, the tag module executes a set of predefined rules on the message. The messaging system module 111 executes a method getParticipantsAndConstructMessage(file) that builds a message that contains references to the identified file and that sends a sendNotification(message, participants) to the message bus 109. The message bus 109, in turn, sends a message sendNotification(message) to the client application 103 indicating that the message is created.

Figure 22:
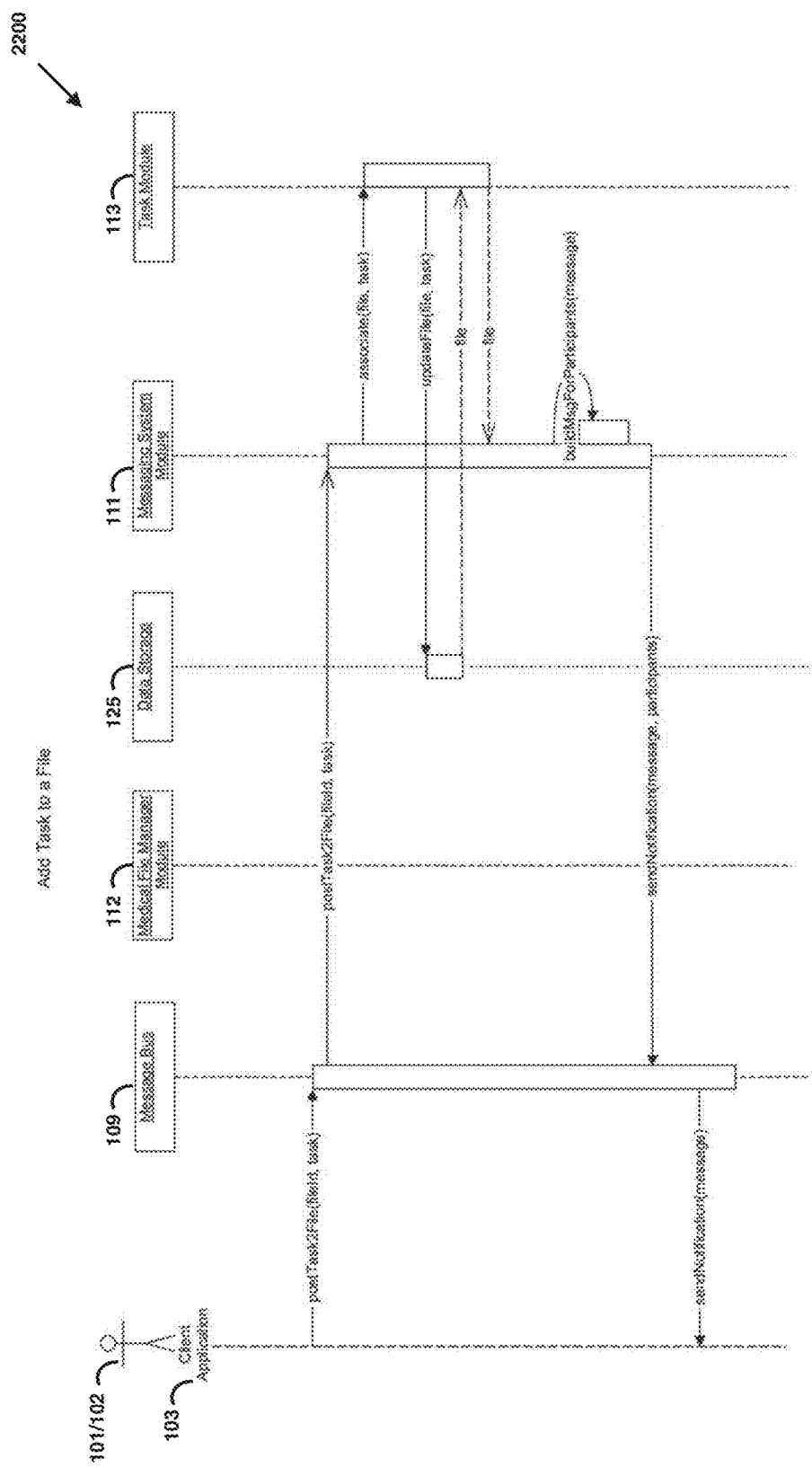
FIG. 22 is an illustrative sequence flow diagram representing configuration of the server system of FIG. 1A to act as a contextual post a task to file processor in accordance with some embodiments.

FIG. 22 is an illustrative sequence flow diagram 2200 representing configuration of the server system 126 of FIG. 1A to act as a contextual message to file sharing processor in accordance with some embodiments. The sequence flow diagram 2200 corresponds flow diagram 1100B FIG. 11B representing user and system actions. A user 101/102 of client application 103 sends a command message postTask2File(fileid, task) over a network (not shown) to the message bus 109, which in turn, sends the message to the messaging system module 111. The messaging system module 111 sends a message associate(file, task) causing the task module 113 to associate the task object that contains the taskId with a file object that contains the identified file/D. As explained with reference to FIG. 1B, the task module executes a set of predefined rules on the task. The task module 113 sends an updateFile(file, task) message that causes the data store 125 to update the file object with the task information. Then the data store 125 responds with a file object instance, record ID, and other metadata about that file. The messaging system module 111 executes a method buildMsgForParticipants(message) that builds a message to send to the participants in the message and sends a message sendNotification(message, participants) to the message bus 109. The message bus 109, in turn, sends a sendNotification (message) to the client application 103 indicating that the task is created.

Figure 23:
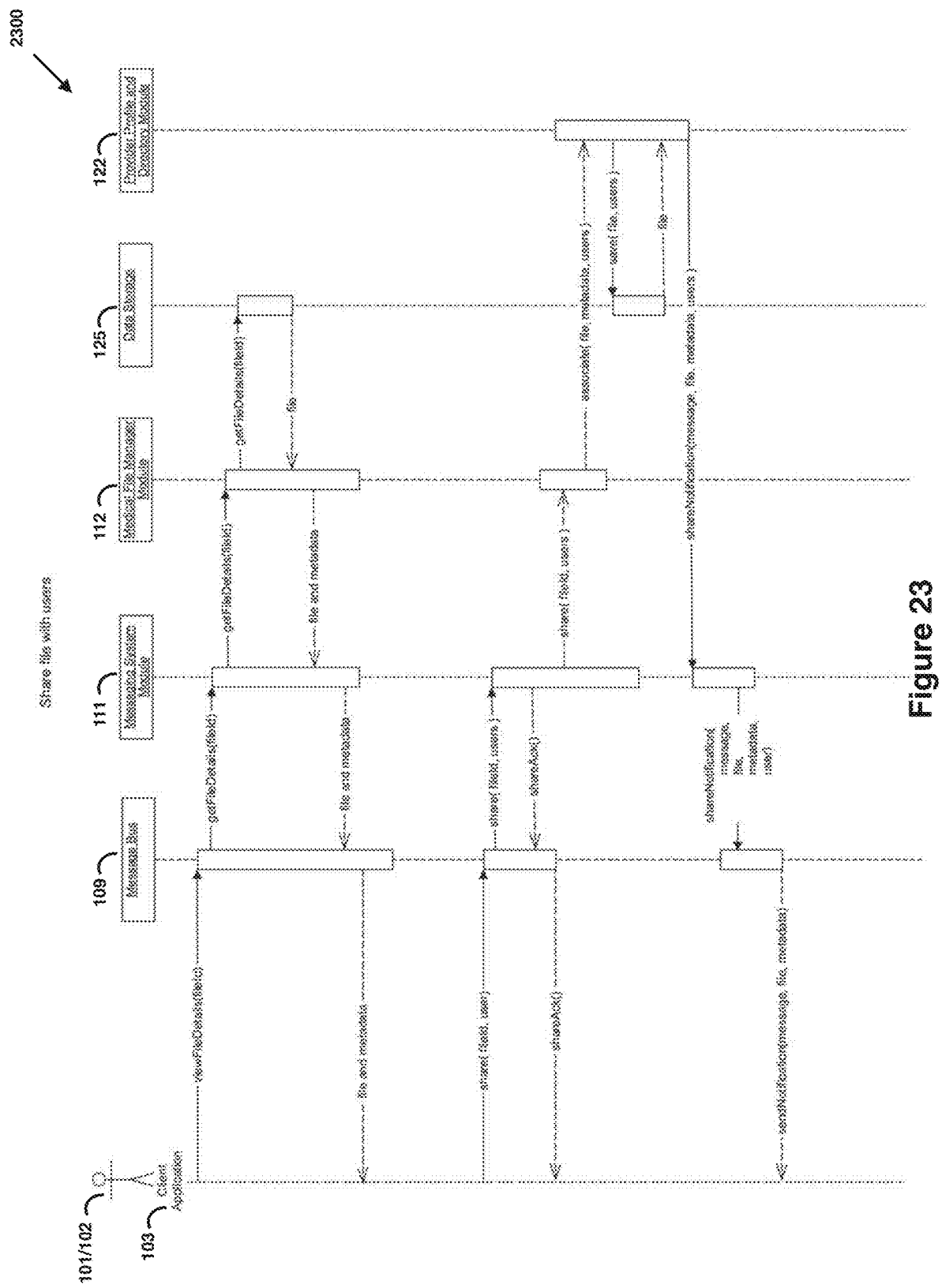
FIG. 23 is an illustrative sequence flow diagram representing configuration of the server system of FIG. 1A to act as a contextual file sharing in accordance with some embodiments.

FIG. 23 is an illustrative sequence flow diagram 2300 representing configuration of the server system 126 of FIG. 1A to act as a contextual message in accordance with some embodiments. The sequence flow diagram 2300 corresponds flow diagram 1100C FIG. 11C representing user and system actions. A user 101/102 of client application 103 sends a command message viewFileDetails(fileid) over a network (not shown) to the message bus 109, which in turn, sends a getFileDetails(fileid) message to the messaging system block 111. The messaging system module 111 sends the getFileDetails(fileid) message to the medical file manager module 112, which in turn sends the message to the data store 125. The data store 125 returns to the identified file to the medical file manager module 112 in response to the getFileDetails(fileid) message. The medical file manager module 112 adds metadata to the file and sends the file and the metadata to the messaging system module 111, which sends it to the message bus 109, which sends it over the network (not shown) to the client application 103.

Still referring to FIG. 23, a user 101/102 of client application 103 sends a command message share(fileid, users) over a network (not shown) to the message bus 109, which in turn sends the message share(fileid, users) to the messaging system module 111. The messaging system module 111 sends to the message bus 109 a shareAck( ) message to acknowledge receipt of the message, which the message bus 109 sends over the network to the client application 103. The message system module continues the operation of sending the share(fileid, users) message to the medical file manager module 112. The medical file manager module 112 sends an associate(file, metadata, users) message to the provider profile directory module 122, which associates the file with the users. The provider profile directory module 122 sends a save (tile, users) message to the data store 125 which causes the data store 125 to update the file object with information about the users. Then the data store 125 responds with a file object instance, record ID, and other metadata about that file. As explained with reference to FIG. 11C, the provider profile and directory module 122 executes a set of predefined rules on the file. The data store 125 sends the file to the provider file directory module 122, which and sends a shareNotification(message, file, metadata, users) message to the messaging system module 111, which sends it to the message bus 109, which sends it over the network to the client application.

Figure 24:
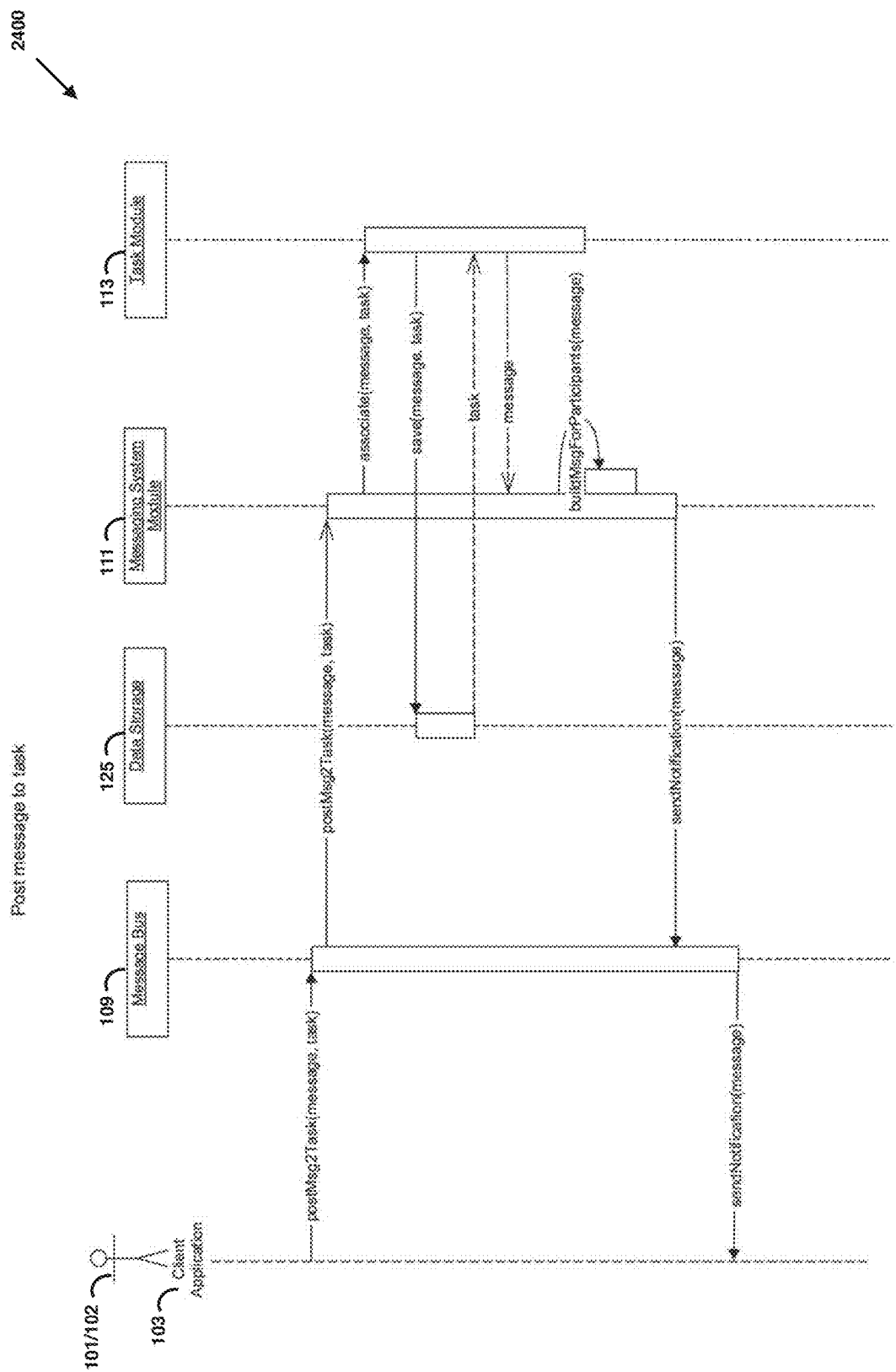
FIG. 24 is an illustrative sequence flow diagram representing configuration of the server system of FIG. 1A to act as a contextual post a message to task processor in accordance with some embodiments.
Figure 25:
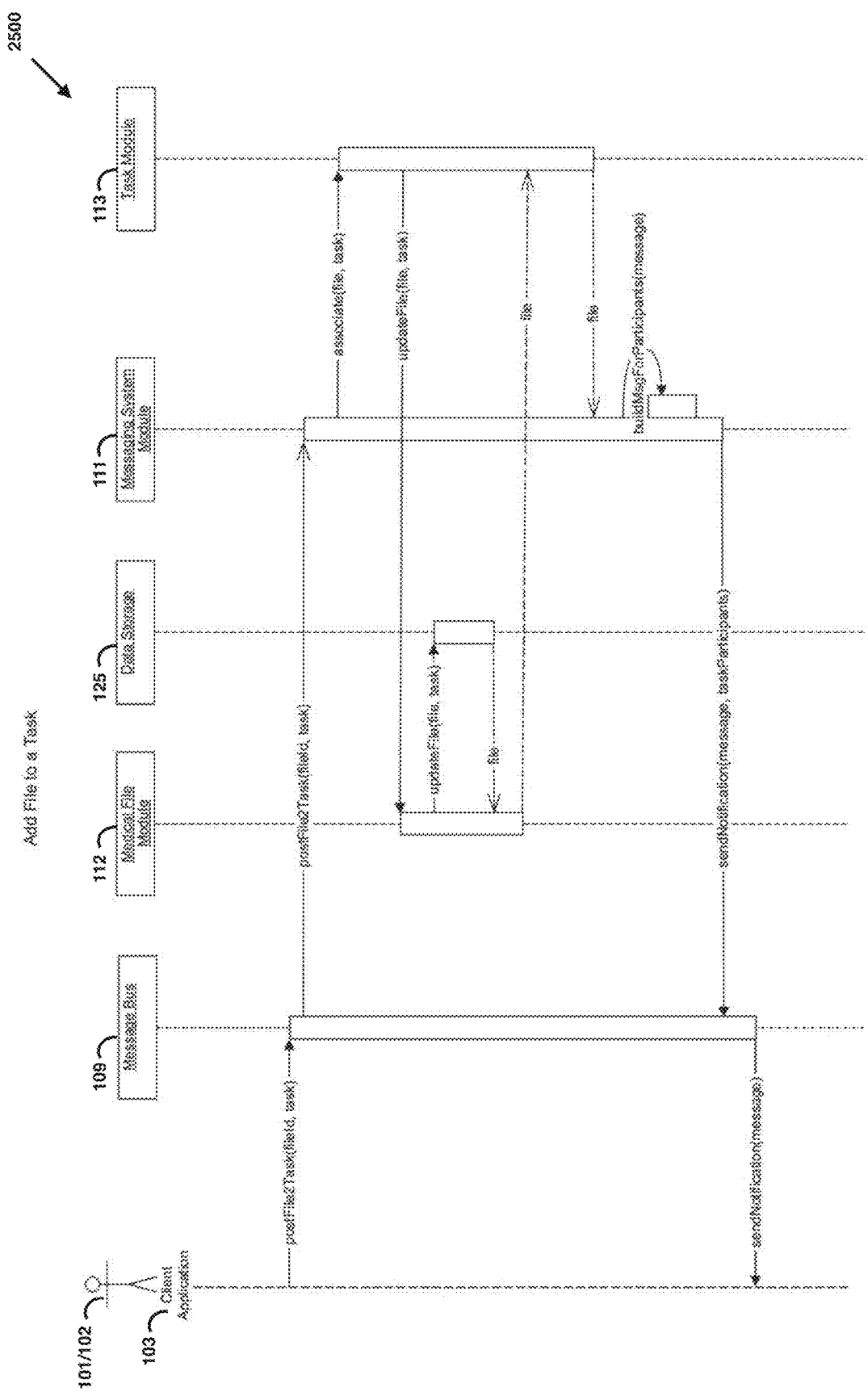
FIG. 25 is an illustrative sequence flow diagram representing configuration of the server system of FIG. 1A to act as a contextual post a file to task processor in accordance with some embodiments.

FIG. 24 is an illustrative sequence flow diagram 2400 representing configuration of the server system 126 of FIG. 1A to act as a contextual add message to task processor in accordance with some embodiments. The sequence flow diagram 2400 corresponds to the flow diagram 1300A in FIG. 13A representing user and system actions. A user 101/102 of client application 103 sends a postMsg2Task (message, task) message over a network (not shown) to the message bus 109, which in turn, sends the message to the messaging system module 111. The messaging system module 111 sends a message associate(message, lash) to the task module 113 that causes the task module 113 to create a class instance that includes an association 1950 between a task object 1908 corresponding to the message and a message object 1906. As explained with reference to FIG. 13A, the task module executes a set of predefined rules on the task. The task module 113 sends a save(message, task) message to the data store 125 that causes the data store 125 to save the class instance, which includes the associated message object and task object. Then the data store 125 responds with a task object instance, record ID, and other metadata about that task. The messaging system module 111 executes a method buildMsgForParticipants(message) that builds messages to send to the participants in the message and sends a message sendNotification(message) to the message bus 109. The message bus, in turn, sends the sendNotification(message) to the client application 103 indicating association of a message with the task. FIG. 25 is an illustrative sequence flow diagram 2500 representing configuration of the server system 126 of FIG. 1A to act as a contextual add file to task processor in accordance with some embodiments. The sequence flow diagram 2500 corresponds to the flow diagram 1300B in FIG. 13B representing user and system actions. A user 101/102 of client application 103 sends a postFile2Task(fileid, task) message over a network (not shown) to the message bus 109, which in turn, sends the message to the messaging system module 111. The messaging system module 111 sends a message associate(file, task) to the task module 113 that causes the task module 113 to create a class instance that includes an association 1950 between a file object 1902 corresponding to the fileid and a task object 1908. As explained with reference to FIG. 13B, the task module executes a set of predefined rules on the file. The task module 113 sends an update(file, task) message to the medical file module 112 that causes the medical file module 112 to update the task class instance with the file. The medical file module 112 sends the update (file, task) message to the data store 125 that causes the data store 125 to update the task class instance with the file, which includes the associated file object and task object. Then the data store 125 responds with a task object instance, record ID, and other metadata about that task. The messaging system module 111 executes a method buildMsgForParticipants(message) that builds messages to send to the participants in the message and sends a message sendNotification(message, taskParticipants) to the message bus 109. The message bus, in turn, sends the sendNotification(message) to the client application 103 indicating association of a file with the task.

Figure 26:
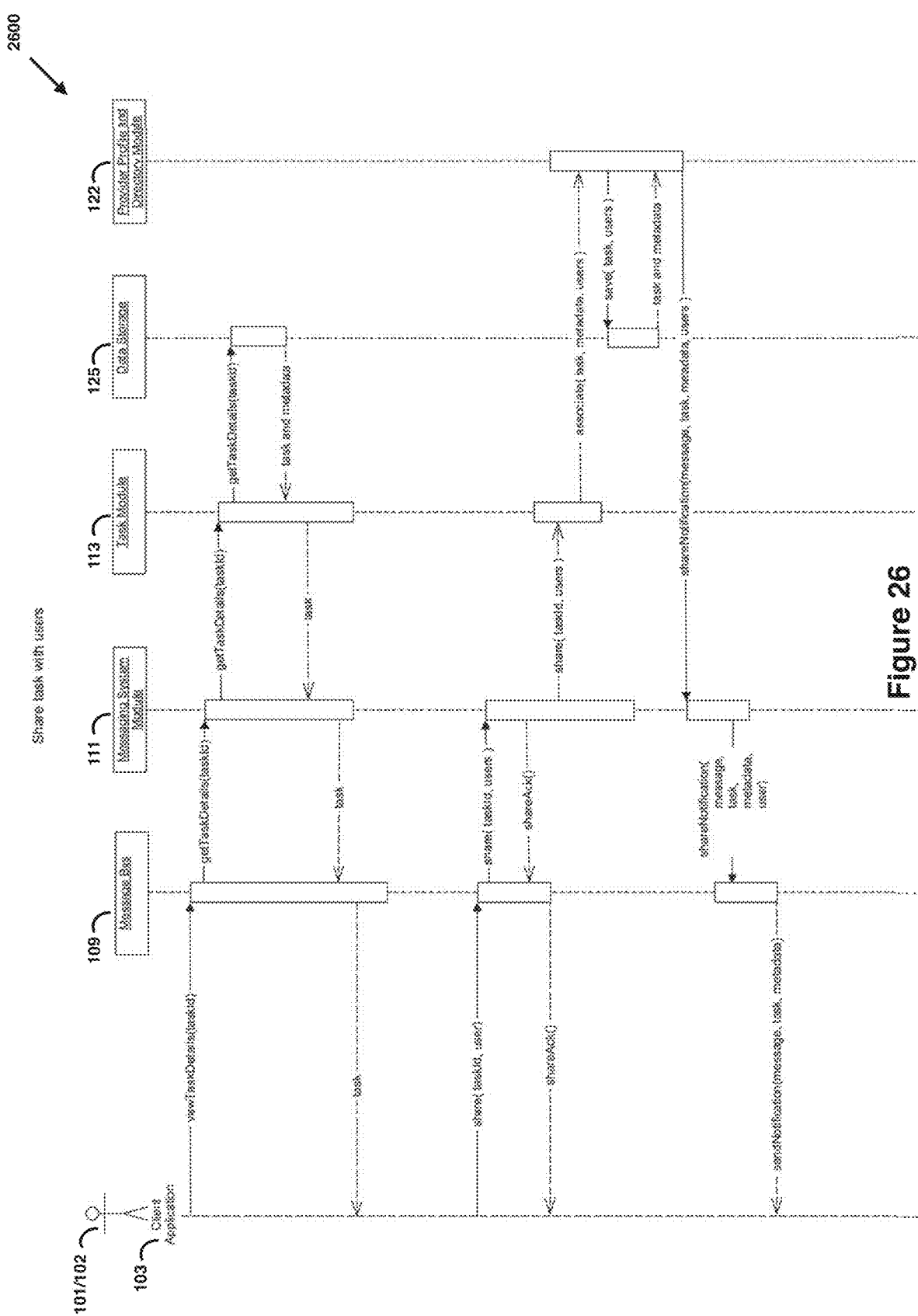
FIG. 26 is an illustrative sequence flow diagram representing configuration of the server system of FIG. 1A to act as a contextual task sharing processor in accordance with some embodiments.

FIG. 26 is an illustrative sequence flow diagram 2600 representing configuration of the server system 126 of FIG. 1A to act as a contextual task sharing processor in accordance with some embodiments. The sequence flow diagram 2600 corresponds to the flow diagram 13000 in FIG. 13C representing user and system actions. A user 101/102 of client application 103 sends a viewTaskDetails(taskid) message over a network (not shown) to the message bus 109, which in turn, sends a getTaskDetails(taskid) message to the messaging system module 111. The messaging system module 111 sends the getTaskDetails(taskid) message to the task module 113. The task module 113 sends the getTaskDetails (taskid) message to the data store 125, which retrieves the task object.

Still referring to FIG. 26, a user 101/102 of client application 103 sends a share(task, userid) message over the network to the message bus 109, which in turn, sends the share(task, userid) message to the messaging system module 111. The messaging system module 111 sends a shareAck( ) message to the message bus 109, which in turn sends the shareAck( ) message over the network to the client application 103 of the task participant who shared the task. In addition, the messaging system module 111 sends the share (task, userid) message to the task module 113, which will route the message to the provider profile and directory module 122. As explained with reference to FIG. 13C, the task module executes a set of predefined rules on the task. The task module 113 sends an associate(task, metadata, users) message to the provider profile and directory module 122, that causes the task module 113 to create a class instance that includes an association between a task object 1908 corresponding to the taskid and a user object 1924. The provider profile and directory module 122 sends a save(task, users) message to the data storage 125 that causes the data store 125 to save the task class instance with the user, which includes the associated task object and user object. Then the data store 125 responds with a task object instance, record ID, and other metadata about that task.

The provider profile and directory module 122 sends a shareNotification(message, task, metadata, users) message to the messaging system module 111, which in turn, sends the shareNotification(message, task, metadata, users) message to the message bus 109 The message bus 109 sends a sendNotification(message, task, metadata) message to the client application 103 indicating sharing of the task with a user.

FIG. 27 is an illustrative sequence flow diagram 2700 representing configuration of the server system 126 of FIG. 1A to act as a contextual referral processor in accordance with some embodiments. The sequence flow diagram 2700 corresponds to the flow diagrams 1500A-1500B in FIGS. 115A-15B representing user and system actions. A user 101/102 of client application 103 sends a postMsg(fileid, message, REPERRAL_TAG) message over a network (not shown) to the messaging bus 109, which in turn, sends it to the messaging system module 111. The messaging system module 111 sends an associate (file, message) message to the medical file module 112, that causes the messaging system module 111 to create a class instance that includes an association between a message object and a file object. The medical file module 112 sends an updateFile(file, message) message to the data store 125, which updates the class instance. Then the data store 125 responds with a task object instance, record. ID, and other metadata about that task. The messaging system module 111 sends a sendMessage(message, participant) message to the message bus 109, which in turn, sends it over the network to the client device 103. In addition, the messaging system module 111 sends a processTaggedMsg(message, REFERRAL_TAG, participants) message to the intelligent tagging system 114, which The intelligent tagging system module 114 sends a processRULES(REFERRAL_TAG, message) message to the rules block 118, which The rules block 114 sends a creatTask (participants, message) message to the task module 113, which The task block 114 executes an addReminder(task, user) method. Also, the rules block 118 sends a newTaskNotification(message, participant) message to the messaging system block 111, which in turn, sends it over the network to the client application 103. Additionally, the intelligent tagging block 114 sends a reminderNotification (message, participant) message to the messaging system 111, which in turn sends a task(ReminderNotification(message, participant) message to the message bus 109, which in turn, sends it over the network to the client application 103.

Still referring to FIG. 27, the user 101/102 of client application 103 sends a postFileTask(fileid, tasked) message over a network to the messaging bus 109, which in turn, sends it to the messaging system block 111. The messaging file block 111 sends an associate(file, task) message to the task module 113, which The task block 113 sends an updateFile(file, task) message to the medical file block 112, which The medical file block 112 sends the updateFile(file, task) message to the data storage 125, which In addition, in response to the postFile2Task(fileid, tasked) message, the messaging system block 11 executes a buildMsgForParticipants(message) method, which The messaging system block 111 sends a sendNotification(message, tasksParticipants) message to the message bus 109. The sendNotification (message, tasksParticipants) message. The message bus 109 sends a sendNotification(message) to the client application.

System Module Configuration Algorithms to Use Class Structure

The system modules are configured to implement algorithms that utilize the class structure 1900 to achieve collaboration such as through association of messages, files and tags. The modules are configured to implement algorithms that utilize the class structure 1900 to achieve contextual action such as posting a comment on a file or a message or posting a task on a file or a message. The modules are configured to implement algorithms that allow application users to collaborate over a network through communication of messages among users at a user level or among organizations at an organization level or among user and organization, for example. The modules are configured to implement algorithms to automate work flow through intelligent tagging, for example. The modules are configured to implement algorithms to allow tight coupling of data and tasks. For example, a message can be tagged so as to couple a work flow with a message that provides explanation. For example, a message can be associated with a file. The following sections describe algorithms associated with modules.

Message Bus Module

The message bus 109 is configured to implement the following algorithm. The message bus 109 receives messages from a client application 103 on an outside network and from other system modules (e.g., data storage 125, message system module 111, task module 113, file manager module 112, provider file directory module 122, intelligent tagging system module 114, and rules module 118). The message bus 109 is configured to parse and format the received information to comply with the format requirements of other system modules and to route the message to the message system module 111, which in turn routes messages to other system modules. Once messages are processed by the relevant system modules, these messages are routed to the Messaging System Module 111, which will then send the messages to the Message Bus 109 so that it can be routed to the client application instances 103.

Data Storage

The data storage module 125 acts as a persistent, secure storage to store data, files and metadata. Most of the system modules have direct access to the data storage module 125. The data storage module 125 is configured to implement and perform the following algorithm. The data storage module 125 accepts the incoming data to permanently persist it. Once data is saved, the data storage module 125 creates metadata such as File ID and timestamp which it sends back to the relevant system module.

Messaging System Module

The messaging system module 111 is responsible for properly interpreting and routing messages into the backend system from message bus 109. The messaging system module 111 is configured to implement the following algorithm. The messaging system module 111 receives and processes incoming messages to determine source, destination, and required action and then routes them to the appropriate system module. The messaging system module 111 also can perform the association of a message with an existing object—e.g., post message to a task. Once messages are processed by one or more requesting system modules, the messaging system module 111 receives the processed messages and forwards them to the message bus 109 to be sent over a network to a client application 103.

Task Module

The task module 113 is configured to implement the following algorithm. The task module 113 receives and processes message/requests related to tasks from other modules (such as retrieve task, update task, create task, associate task with other objects—e.g., post files to a task, post messages to a task). Once a message is processes the task module 113 routes the message to the data storage module 125 to persist the request. The task module 113 receives corresponding metadata from the data storage module 125 and routes the message with the posted task to a requesting system module.

File Manager Module

The file manager module 112 is configured to implement the following algorithm. The file manager 112 receives and processes messages/requests related to files from other modules (such as retrieve file, update file, create file, or associate file with other objects—e.g., post task to a file, post messages to a file). The file manager module 112 communicates with the data storage module 125 to perform actions on a file (e.g., create file, update file, delete file). The file manager module 112 receives corresponding metadata and acknowledgment from the data storage module 125 and routes the message with the posted file to a requesting system module.

Provider Profile and Directory Module

The provider profile and directory module 122 is configured to implement the following algorithm. The module 122 receives and processes messages/requests related to the users of the system. The module has the ability to create new user, update user, associate user with an existing object—e. g., associate user with a file). Once a message is processed the module 122 routes the message to the data storage module 125 to persist the request Intelligent Tagging System The intelligent tagging module 114 is configured to implement the following algorithm. The tagging module 114 stores rules to help manage and automate various workflows and processes (e.g., referral workflow). For example, the rules may involve configuring a hardware processor within the system 126 to send and receive a sequences of messages that prompt or that are contingent upon client user actions such as responding to a message or sending a message, starting a user activity or completing a user activity. The tagging module 114 receives and processes requests to tag an existing object. The tagging module 114 applies the rules on incoming objects based on the tag by communicating with the rules module 118.

Rules Module

The rules module 114 is configured to implement the following algorithm. The rules module stores and configures a hardware processor within the system 126 to execute a set of predefined rules, or steps, for various system modules. The rules module 114 processes incoming requests and applies rules based on the incoming data. Based on the request and the data, the rules module 114 forwards requests to the other modules as needed to fulfill the rule to be applied—e.g., Create a task based on the REFERRAL tag applied on a message.

Work Flow Use Cases

Tagging a message, file, or task associates the tagged message, tagged file, or tagged task with a work flow. The system 126 is configured through one or more algorithm to implement a work flow associated with a tag. The following are example work flow algorithms.

Admission Tag Work Flow

Assume that a provider from a hospital sends a message with an "ADMISSION" tag to notify a primary care physician at a private practice that her patient has been admitted to the hospital. The system 126, through one or more system modules described above, detects the "ADMISSION" tag and causes the sending of a message to notify the primary care physician and her medical staff members who are designated as such in the system 126. The system 126, through one or more system modules described above, sends notification messages to the hospital provider to request additional information and documentation such as reason for admission and discharge documents. The system 126, through one or more system modules described above, also sends notification messages to the providers at the private practice to follow up with the hospital provider and the patient to discuss transition plan and ongoing care plan.

Urgent Tag Work Flow

Assume that a provider creates a task with an "URGENT" tag and assigns the task to several medical staff members. The system 126, through one or more system modules described above, detects the "URGENT" tag and sends a message to the task assignees with an "URGENT" tag. The system 126, through one or more system modules described above sends reminder messages to the task creator and task assignees to work on the task and close it. The system 126, through one or more system modules described above, marks a task as completed by the task creator, and the system closes the task.

System Hardware Embodiment

Figure 28:
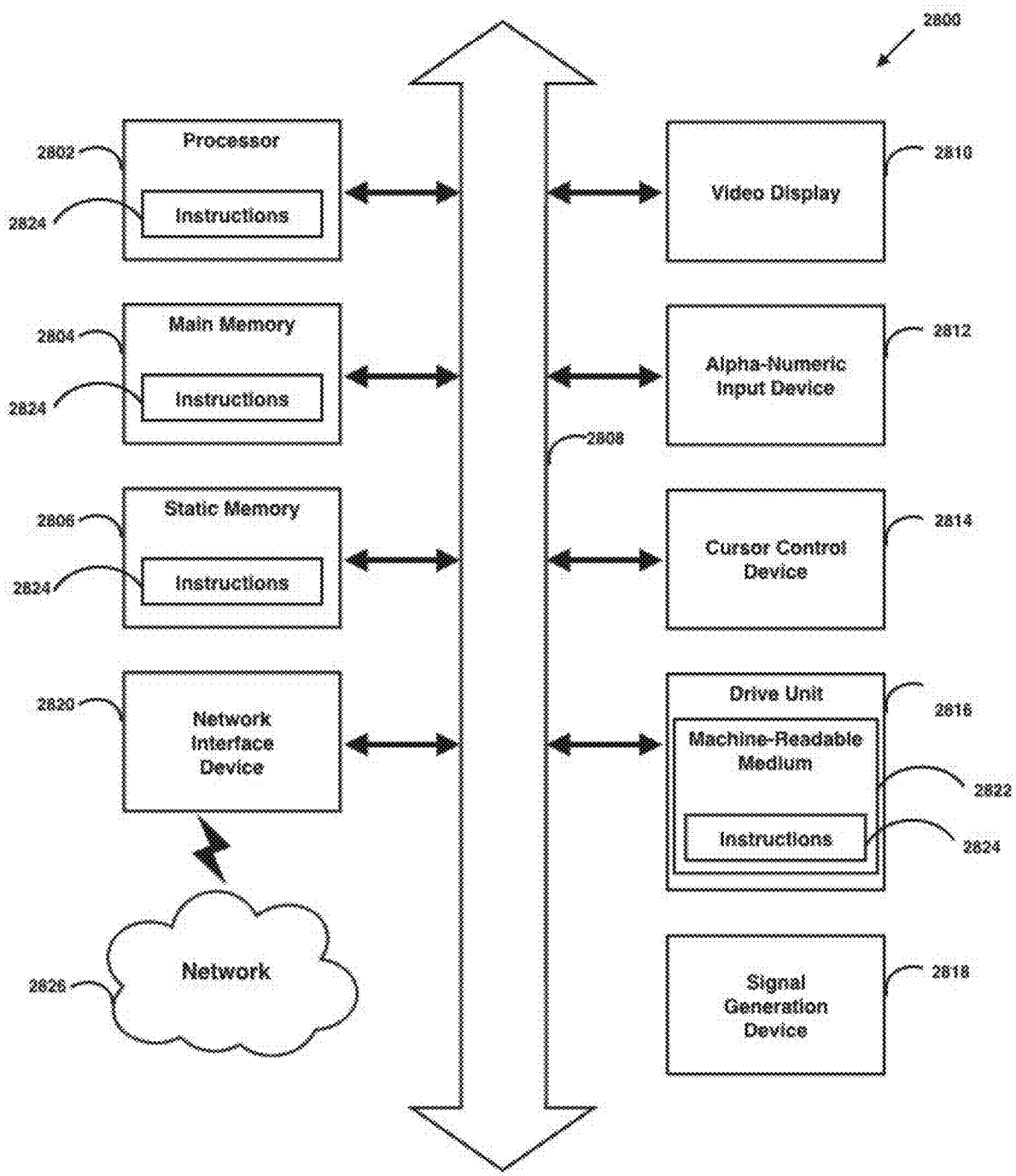
FIG. 28 is an illustrative block diagram of a computer processing system in which to implement the server system of FIG. 1A in accordance with some embodiments.

FIG. 28 is an illustrative block diagram of a computer processing system in which to implement the server system 126 of FIG. 1A in accordance with some embodiments. The computer system, or variations thereof, may be used to implement the contextual collaboration services 110, data services 115 and people and relationship services 121 the server system 126 of FIG. 1A. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment, for example. In a networked deployment, the computer may operate in the capacity of a server or a client computer in a server-client network environment, or as a peer computer in a peer-to-peer (or distributed) network environment, for example.

The example computer processing system 2800 includes a hardware processor 2822 (e.g., a central processing unit (CPU), a graphics processing unit (GPU) or both), main memory 2804 and static memory 2806, which communicate with each other via bus 2808. The processing system 2800 may further include video display unit 2820 (e.g., a plasma display, a liquid crystal display (LCD) or a cathode ray tube (CRT)). The processing system 2800 also includes alphanumeric input device 2822 (e.g., a keyboard), a user interface (UI) navigation device 2814 (e.g., a mouse, touch screen, or the like), a disk drive unit 2816, a signal generation device 2818 (e.g., a speaker), and a network interface device 2820.

The disk drive unit 2826, which can act as data storage 125, includes computer-readable storage device 2822 on which is stored one or more sets of instructions and data structures (e.g., software 2824) embodying or utilized by any one or more of the methodologies or functions described herein. The software 2824 may also reside, completely or at least partially, within a computer readable storage device such as the main memory 2804 and/or within the processor 2822 during execution thereof by the processing system 2800, the main memory 2804 and the processor 2822 also constituting non-transitory computer-readable media. The software 2824 may further be transmitted or received over network 2826 via a network interface device 2820 utilizing any one of a number of well-known transfer protocols (e.g., HTTP).

The disk drive unit 2826 can be configured to store the data structure 1900. The hardware processor 2822 can be configured to implement the contextual post a task processor of FIG. 20. The hardware processor 2822 can be configured to implement the contextual message to file processor of FIG. 21. The hardware processor 2822 can be configured to implement the contextual task to file processor of FIG. 22. The hardware processor 2822 can be configured to implement the contextual file sharing processor of FIG. 23. The hardware processor 2822 can be configured to implement the contextual add message to task processor of FIG. 24. The hardware processor 2822 can be configured to implement the contextual add file to task processor of FIG. 25. The hardware processor 2822 can be configured to implement the contextual task sharing processor of FIG. 26. The hardware processor 2822 can be configured to implement the contextual referral processor of FIG. 27.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A system to support collaboration among users of client systems on a network comprising:
    a server system; and
    multiple client systems including:
    a display screen;
    wherein each client system includes:
    a processor; and a non-transitory computer readable storage device operably coupled thereto, the non-transitory computer readable storage including a plurality of client instructions stored in association therewith that are accessible to, and executable by, the processor, where the plurality of client instructions includes:
instructions that, when executed, cause display on the display screen of a context menu, which includes a files context menu item and a messages context menu item and cause display on the display screen of identifications of multiple user selectable file context items or multiple user selectable message context items corresponding to a user-selected context menu item;
instructions that, when executed, cause display on the display screen in response to user selection of one of the multiple user selectable file context items or one of the multiple user selectable message context items, a contextual activity menu including a contextual activity work flow item and cause display on the display screen of one of the user-selected file context item or the user-selected message context item;
instructions that, when executed, in response to user selection of the contextual activity work flow item, cause the processor to send a first network message over the network to the server indicating the user selected file context item or the user selected message context item and indicating the user-selected contextual activity work flow item;
wherein the server system includes:
a data storage; and
a processor; and a non-transitory computer readable storage device operably coupled thereto, that includes a class data structure to associate object instances in the class data structure, that includes a data storage that stores a plurality of context items, and that includes a plurality of server instructions that are accessible to, and executable by, the processor,
where the plurality of server instructions includes class instance creation instructions that, when executed:
in response to the first network message indicating the user selected file context item and indicating the user-selected contextual activity work flow item, cause creating a class structure instance within the data storage that includes association information within the class structure instance within the data storage, based at least in part upon a post action input to the user interface within the first network message sent over the network that includes an association between a file object instance, within the class structure instance, corresponding to the user-selected file context item stored in the data storage indicated within the first network message, and a at least one workflow object instance, within the class structure instance, corresponding to the user-selected contextual activity work flow item indicated within the first network message; and
in response to the first network message indicating the user selected message context item and indicating the user-selected contextual activity work flow item, cause creating a class structure instance within the data storage that includes association information within the class structure instance within the data storage, based at least in part upon a post action input to the user interface within the first network message sent over the network that includes an association between a message object instance, within the class structure instance, corresponding to the user-selected message context item stored in the data storage indicated within the first network message, and the at least one workflow object instance, within the class structure instance, corresponding to the user-selected contextual activity work flow item indicated within the first network message;
where the plurality of server instructions further include workflow instructions that, when executed:
cause sending one or more workflow messages over the network to indicate a context and to indicate a task to a client system of one or more users;
the indicated context based upon the user-selected context item within the first network message, associated with the at least one of a file object instance and the message object instance within the class structure instance;
the indicated task based upon the contextual activity workflow item, within the first network message, associated with the at least one workflow object instance within the class structure instance.

2. A system to support collaboration among users of client systems on a network comprising:
a first non-transitory computer readable storage device including a plurality of client instructions, executable by a client processor operably coupled to a display screen,
where the plurality of client instructions includes:
instructions that, when executed, cause display on the display screen of a context menu, which includes a files context menu item and a messages context menu item and cause display on the display screen of identifications of multiple user selectable file context items or multiple user selectable message context items corresponding to a user-selected context menu item;
instructions that, when executed, cause display on the display screen in response to user selection of one of the multiple user selectable file context items or one of the multiple user selectable message context items, a contextual activity menu including a contextual activity work flow item and cause display on the display screen of one of the user-selected file context item or the user-selected message context item;
instructions that, when executed, in response to user selection of the contextual activity work flow item, cause the processor to send a first network message over the network to the server indicating the user selected file context item or the user selected message context item and indicating the user-selected contextual activity work flow item;
a second non-transitory computer readable storage device including that includes a class data structure to associate object instances in the class data structure and that includes a plurality of server instructions, executable by a server processor,
where the plurality of server instructions includes class instance creation instructions that, when executed:
in response to the first network message indicating the user selected file context item and indicating the user-selected contextual activity work flow item, cause creating a class structure instance within the data storage that includes association information within the class structure instance within the data storage, based at least in part upon a post action input to the user interface within the first network message sent over the network that includes an association between a file object instance, within the class structure instance, corresponding to the user-selected file context item stored in the data storage indicated within the first network message, and at least one workflow object instance, within the class structure instance, corresponding to the user-selected contextual activity work flow item indicated within the first network message; and in response to the first network message indicating the user selected message context item and indicating the user-selected contextual activity work flow item, cause creating a class structure instance within the data storage that includes association information within the class structure instance within the data storage, based at least in part upon a post action input to the user interface within the first network message sent over the network that includes an association between a message object instance, within the class structure instance, corresponding to the user-selected message context item stored in the data storage indicated within the first network message, and the at least one workflow object instance, within the class structure instance, corresponding to the user-selected contextual activity work flow item indicated within the first network message;

where the plurality of server instructions further include workflow instructions that, when executed:

cause sending one or more workflow messages over the network to indicate a context and to indicate a task to a client system of one or more users;

the indicated context based upon the user-selected context item within the first network message, associated with the at least one of a file object instance and the message object instance within the class structure instance;

the indicated task based upon the contextual activity work flow item, within the first network message, associated with the at least one workflow object instance within the class structure instance.

3. The system of claim 1,
wherein the at least one workflow object instance within the class structure instance in includes a task object instance and a tag object instance and an association between the task object instance and a tag object instance.

4. The system of claim 1,
wherein the class data structure includes a conversation object instance, indicating conversation participants, associated with multiple participant object instances and associated with the file object instance or the message object instance; and
wherein sending the one or more workflow messages includes sending the one or more workflow messages over the network to each user identified as a conversation participant by the conversation object instance.

5. The system of claim 4,
wherein the contextual activity menu includes participant menu item; and wherein the client instructions includes instructions that, when executed, cause a user-selected participant items to be included in the conversation object instance.

6. The system of claim 5,
wherein the conversation object instance is associated with multiple participant object instances, each participant object instance indicating a conversation participant.

7. The system of claim 1,
wherein the client instructions includes instructions that, when executed,
cause display of a contextual activity menu including a user-defined task contextual activity workflow item; and
in response to user selection of the user-defined task contextual activity workflow item, cause display of user-defined task form to receive user input to define the task.

8. The system of claim 1,
wherein the client instructions includes instructions that, when executed,
cause display of one or more task contextual activity menus each including one or both of a user-defined task contextual activity workflow item and a predetermined task tag contextual activity workflow item;
in response to user selection of the user-defined task contextual activity workflow item, cause display of a user-defined task form to receive user input to define the task; and
in response to user selection of the predetermined task tag contextual activity workflow item, to define the task as a predetermined task.

9. The system of claim 5,
wherein the client instructions includes instructions that, when executed,
cause display of a contextual activity menu including a user-defined task contextual activity workflow item; and
in response to user selection of the user-defined task contextual activity workflow item, cause display of user-defined task form to receive user input to define the task.

10. The system of claim 5,
wherein the client instructions includes instructions that, when executed,
cause display of one or more task contextual activity menus each including one or both of a user-defined task contextual activity workflow item and a predetermined task tag contextual activity workflow item;
in response to user selection of the user-defined task contextual activity workflow item, cause display of a user-defined task form to receive user input to define the task; and
in response to user selection of the predetermined task tag contextual activity workflow item, to define the task as a predetermined task.

\* \* \* \* \*